US012628235B2

(12) United States Patent (10) Patent No.: US 12,628,235 B2
Xu et al. (45) Date of Patent: May 12, 2026

(54) COMMUNICATION METHOD, APPARATUS, AND SYSTEM

(71) Applicant: HUAWEI TECHNOLOGIES CO., LTD., Shenzhen (CN)

(72) Inventors: Shengfeng Xu, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 255 days.

(21) Appl. No.: 18/360,837

(22) Filed: Jul. 28, 2023

(65) Prior Publication Data

US 2023/0371111 A1 Nov. 16, 2023

Related U.S. Application Data

(63) Continuation of application No. PCT/CN2022/074817, filed on Jan. 28, 2022.

(30) Foreign Application Priority Data

Feb. 10, 2021 (WO) ................ PCT/CN2021/076527

(51) Int. Cl.
*H04W 76/20* (2018.01)
*H04W 8/22* (2009.01)
(52) U.S. Cl.
CPC ............. *H04W 76/20* (2018.02); *H04W 8/22* (2013.01)
(58) Field of Classification Search
None
See application file for complete search history.

(56) References Cited

U.S. PATENT DOCUMENTS

2021/0219385 A1* 7/2021 Paladugu .............. H04W 8/005
2021/0289391 A1* 9/2021 Paladugu .............. H04W 88/04
(Continued)

FOREIGN PATENT DOCUMENTS

CN 110098858 A 8/2019
CN 111800841 A 10/2020
WO 2017132965 A1 8/2017

OTHER PUBLICATIONS

3rd Generation Partnership Project; Technical Specification Group Services and System Aspects; Study on system enhancement for Proximity based Services (ProSe) in the 5G System (5GS)(Release 17). 3GPP TR 23.752 V1.0.0 (Nov. 2020). total 177 pages.
(Continued)

*Primary Examiner* — Otis L Thompson, Jr.

(57) ABSTRACT

This disclosure provides a communication method, apparatus, and system. The method is performed by a remote terminal, which receives first policy information from a policy control function network element, where the first policy information includes a relay mode corresponding to a first application of the remote terminal, determines a first relay mode based on the first policy information, and transmits data of the first application in the first relay mode to a relay device. In the method, the remote terminal selects a relay mode for individual application and deliver data of the individual application in the selected relay mode such that different relay modes can be applied to different applications. In this way, requirements of different applications are met, and collaboration between different relay modes is enabled.

11 Claims, 20 Drawing Sheets

(56) References Cited

U.S. PATENT DOCUMENTS

| | | | |
|---|---|---|---|
| 2021/0289392 A1* | 9/2021 | Paladugu .............. | H04W 76/14 |
| 2021/0297992 A1* | 9/2021 | He ...................... | H04W 72/566 |
| 2021/0298034 A1* | 9/2021 | He ........................ | H04W 72/56 |
| 2022/0272577 A1* | 8/2022 | Xu ........................ | H04W 48/18 |
| 2023/0370839 A1* | 11/2023 | Wifvesson .......... | H04W 12/041 |

OTHER PUBLICATIONS

Qualcomm Incorporated: "KI#3, Sol#23: Update N31WF selection for Layer-3 UE-to-Network Relay", 3GPP Draft; S2-2007689, 3rd Generation Partnership Project (3GPP), vol. SA WG2, No. E (e-meeting); Aug. 19, 2020-Sep. 1, 2020 Oct. 2, 2020 (Oct. 2, 2020), XP051938719, total 8 pages.
Intel: "KI#3, Sol#23 and 26 alignment on N31WF identifier provisioning", 3GPP Draft; S2-2008371, 3rd Generation Partnership Project (3GPP), vol. SA WG2, No. Elbonia; Nov. 16, 2020-Nov. 20, 2020 Nov. 9, 2020 (Nov. 9, 2020), XP052465364, total 8 pages.

* cited by examiner

COMMUNICATION METHOD, APPARATUS, AND SYSTEM

CROSS-REFERENCE TO RELATED APPLICATIONS

This application is a continuation of International Application No. PCT/CN2022/074817, filed on Jan. 28, 2022, which claims priority to International Application No. PCT/CN2021/076527, filed Feb. 10, 2021. The disclosures of the aforementioned applications are hereby incorporated by reference in their entireties.

TECHNICAL FIELD

This application relates to the field of communication technologies, and in particular, to a communication method, apparatus, and system.

BACKGROUND

Currently, device-to-device (D2D) communication allows direct communication between user equipments (UE). For example, when a user equipment (for example, remote UE) is outside coverage of a communication network, or quality of communication between the user equipment and an access network device in the communication network is poor, the user equipment may indirectly communicate with the communication network based on D2D communication, in other words, through a relay (for example, relay UE), and the relay forwards data transmitted between the remote UE and the network. For another example, when a user equipment (for example, source UE) cannot directly communicate with another user equipment (for example, target UE), the source UE may communicate with the target UE in a relay mode. To be specific, a relay UE forwards data between the source UE and the target UE.

Currently, there may be two modes of indirect communication (to be specific, the remote UE accesses the network through the relay UE for communication or the source UE communicates with the target UE through the relay UE), and the modes include: a layer-2 relay (L2 relay) mode and a layer-3 relay (L3 relay) mode. That the remote UE accesses the network through the relay UE for communication is used as an example. The layer-2 relay mode means that the relay UE forwards uplink and downlink data and signaling between the remote UE and the access network device through a layer 2 (for example, an adaptation layer), and the network may directly control the remote UE. The layer-3 relay mode means that the relay UE forwards uplink and downlink data of the remote UE through internet protocol (TP) routing. The layer-2 relay mode and the layer-3 relay mode are different in terms of data security, service continuity, quality of service, and the like. That is, the layer-2 relay mode and the layer-3 relay mode can provide different service performance.

Further, in the case of coexistence of the layer-2 relay mode and the layer-3 relay mode, how to select a relay mode becomes an urgent problem to be resolved.

SUMMARY

This application provides a communication method, apparatus, and system, to select a relay mode for indirect communication in the case of coexistence of a layer-2 relay mode and a layer-3 relay mode.

According to a first aspect, embodiments of this application provide a communication method. The method is applied to a scenario (a user equipment-to-network relay (U2N relay) scenario) in which a remote terminal communicates with a network via a relay terminal. The method may be applied to the remote terminal or a chip in the remote terminal. That the method is performed by the remote terminal is used as an example, and the method includes: The remote terminal receives first policy information from a policy control function network element, where the first policy information includes a relay mode corresponding to a first application of the remote terminal; the remote terminal determines a first relay mode based on the first policy information; and the remote terminal transmits data of the first application in the first relay mode.

In the foregoing manner, the remote terminal may obtain, based on the first policy information determined by the policy control function network element, the relay mode corresponding to the first application of the remote terminal. For example, the relay mode corresponding to the first application of the remote terminal may include at least one relay mode. Therefore, the remote terminal may determine, based on the first policy information, a corresponding relay mode, namely, the first relay mode, when the remote terminal transmits the data of the first application. In the case of coexistence of a layer-2 relay mode and a layer-3 relay mode, relay modes selected by the remote terminal for different applications are controlled or recommended based on the first policy information delivered by the policy control function network element, and the remote terminal selects the relay modes for indirect communication. In this way, requirements of different applications are met, and collaboration between different relay modes is enabled.

In a possible implementation, the remote terminal may determine, based on the relay mode corresponding to the first application of the remote terminal, the first relay mode in the relay mode corresponding to the first application. This helps reduce complexity of determining a first relay mode by the remote terminal, and improves efficiency of determining the first relay mode.

In a possible implementation, the first policy information further includes: a priority of the relay mode corresponding to the first application of the remote terminal. That the remote terminal determines a first relay mode based on the first policy information includes: determining the first relay mode based on the relay mode corresponding to the first application of the remote terminal and the priority of the relay mode corresponding to the first application of the remote terminal.

For example, the remote terminal may preferentially select a relay mode with a high priority as the first relay mode based on the relay mode corresponding to the first application of the remote terminal and the priority of the relay mode corresponding to the first application of the remote terminal. This helps improve transmission performance of transmitting the data of the first application by the remote terminal.

In a possible implementation, before the remote terminal receives the first policy information from the policy control function network element, the remote terminal may further send, to the policy control function network element, a relay mode supported by the remote terminal.

According to the foregoing method, the remote terminal may send, to the policy control function network element, the relay mode supported by the remote terminal, so that the first policy information determined by the policy control function network element is determined based on the relay mode supported by the remote terminal. When the remote terminal determines the first relay mode based on the first policy information and the relay mode supported by the remote terminal, complexity of determining the first relay mode by the remote terminal may be reduced. In addition, the first policy information determined by the policy control function network element may be further enabled to better match the remote terminal, configuring the first policy information for the remote terminal by the policy control function network element is optimized, and overheads of sending the first policy information to the remote terminal by the policy control function network element may be further reduced.

In a possible implementation, the remote terminal may determine, based on a capability of the remote terminal, the first relay mode in the relay mode supported by the remote terminal and the first policy information. The relay mode supported by the remote terminal includes: a layer-2 relay mode or a layer-3 relay mode.

According to the foregoing method, the remote terminal selects, based on the capability of the remote terminal, the first relay mode from the relay mode supported by the remote terminal and the first policy information, to better match the capability of the remote terminal, and improve performance of transmitting the data of the first application by the remote terminal in the first relay mode.

In a possible implementation, the relay mode corresponding to the first application of the remote terminal includes: at least one of the layer-2 relay mode or the layer-3 relay mode.

The foregoing method is applicable to a scenario in which different relay modes exist, for example, a scenario in which the layer-2 relay mode and the layer-3 relay mode coexist. In addition, the method is applicable to a scenario in which the layer-2 relay mode, a first layer-3 relay mode, and a second layer-3 relay mode coexist, and the PCF does not distinguish between the first layer-3 relay mode and the second layer-3 relay mode, to reduce overheads of sending the first policy information by the PCF to the remote terminal, and reduce complexity of determining the first relay mode by the remote terminal.

In a possible implementation, the relay mode corresponding to the first application of the remote terminal includes: at least one of the layer-2 relay mode, a first layer-3 relay mode, or a second layer-3 relay mode, where the first layer-3 relay mode is a layer-3 relay mode with a non-3GPP interworking function network element, and the second layer-3 relay mode is a layer-3 relay mode without a non-3GPP interworking function network element.

The foregoing method is applicable to a scenario in which different relay modes exist, for example, a scenario in which the layer-2 relay mode, the first layer-3 relay mode, and the second layer-3 relay mode coexist. Therefore, in the scenario in which different relay modes exist, the remote terminal may determine the first relay mode based on the relay mode corresponding to the first application of the remote terminal in the first policy information, to improve flexibility of determining the first relay mode by the remote terminal.

In a possible implementation, the first relay mode is:
the layer-2 relay mode or the layer-3 relay mode; or
the layer-2 relay mode, the first layer-3 relay mode, or the second layer-3 relay mode.

The foregoing method is applicable to a scenario in which different relay modes exist. The first relay mode determined by the remote terminal based on the first policy information is unique, and the remote terminal directly determines the first relay mode used to transmit the data of the first application. Therefore, overheads of using the relay mode through negotiation between the remote terminal and the relay terminal can be reduced.

In a possible implementation, the remote terminal may further send a first message, where the first message includes information about the first relay mode.

The remote terminal may send the first message in a broadcast manner, a multicast manner, a unicast manner, or the like, so that the relay terminal can obtain the information about the first relay mode by using the received first message, and prepare for transmitting the data of the first application between the remote terminal and the relay terminal in the first relay mode.

In a possible implementation, the information about the first relay mode includes at least one of the following:
a relay service code (RSC) corresponding to the first relay mode; or first indication information indicating the first relay mode.

According to the foregoing method, the remote terminal may more flexibly choose to send the information about the first relay mode. For example, when the RSC exists in the first relay mode, the remote terminal may send the RSC corresponding to the first relay mode, or the remote terminal may further determine the first indication information corresponding to the first relay mode. Therefore, the remote terminal may indicate the first relay mode to the relay terminal by sending the first indication information.

In a possible implementation, the remote terminal may further receive a first response message from the relay terminal, where the first response message is a response to the first message, the first response message includes second indication information, and the second indication information indicates that the relay terminal supports the first relay mode.

According to the foregoing method, the remote terminal may determine, based on the received first response message, whether the relay terminal supports the first relay mode. Therefore, the remote terminal may determine, based on a relay terminal that supports the first relay mode, a relay terminal that provides a relay service for transmitting the data of the first application, and prepare for transmitting the data of the first application between the remote terminal and the relay terminal in the first relay mode.

In a possible implementation, the remote terminal may further determine a seventh relay mode based on the first policy information. The remote terminal sends a third message, where the third message includes information about the seventh relay mode. After receiving a fourth response message from the relay terminal, the remote terminal determines the first relay mode based on the first policy information and the seventh relay mode. The fourth response message is a response to the third message, and the fourth response message indicates that the relay terminal does not support the seventh relay mode.

In a possible implementation, the remote terminal may further determine a seventh relay mode based on the first policy information. The remote terminal sends a third message. After determining that no response message for the third message is received within third preset duration, the remote terminal determines the first relay mode based on the first policy information and the seventh relay mode.

In the foregoing technical solution, the remote terminal may determine a relay mode based on the first policy information, but the relay terminal may not support the relay mode (the seventh relay mode). The remote terminal may determine the first relay mode based on the first policy information and the seventh relay mode again, that is, determine a relay mode supported by the relay terminal, so that the remote terminal performs relay communication via the relay terminal in the first relay mode.

In a possible implementation, the first relay mode is the layer-2 relay mode, the remote terminal may send a second message, the second message includes no RSC, and the second message is a discovery message or a direct communication request (DCR) message.

According to the foregoing method, when no RSC exists in the first relay mode, the remote terminal may implicitly indicate the first relay mode in a manner of including no RSC in the sent second message. For example, when the first relay mode is the layer-2 relay mode, and the layer-2 relay mode has no corresponding RSC, the remote terminal may implicitly indicate, in a manner of including no RSC in the discovery message or the DCR message, that the first relay mode is the layer-2 relay mode. In this way, flexibility of transmitting the information of the first relay mode by the remote terminal is improved.

In a possible implementation, the remote terminal may further determine a second relay mode based on the first policy information, where the second relay mode includes one or more relay modes in the relay mode corresponding to the first application of the remote terminal. Then, the remote terminal determines the first relay mode based on the second relay mode.

For example, the second relay mode that may be used to transmit the data of the first application may be first determined, so that the first relay mode for transmitting the data of the first application is determined based on the second relay mode. For example, the first relay mode for transmitting the data of the first application may be determined based on a relay terminal that supports the second relay mode. According to the method, a success rate of transmitting the data of the first application in the first relay mode determined by the remote terminal can be effectively increased. In addition, when a plurality of relay terminals support the second relay mode, the remote terminal may further optimize selection of the first relay mode based on that the plurality of relay terminals support the second relay mode, and improve performance of transmitting the data of the first application.

In a possible implementation, the remote terminal may send a second discovery message, where the second discovery message includes information about the second relay mode. The remote terminal may further receive a second response message from the relay terminal, where the second response message is a response to the second discovery message, the second response message includes information about a third relay mode, the third relay mode includes at least one relay mode in the second relay mode, and the relay terminal supports the third relay mode.

According to the foregoing method, the remote terminal may send the information about the second relay mode by using the second discovery message, so that the relay terminal can determine whether to support the second relay mode. In addition, the remote terminal may further determine, based on the second response message sent by the relay terminal, the third relay mode supported by the relay terminal, and prepare for determining the first relay mode by the remote terminal based on the second response message.

In a possible implementation, the remote terminal may determine the first relay mode based on the information about the third relay mode.

According to the foregoing method, the remote terminal may determine the first relay mode based on the third relay mode supported by the relay terminal, to ensure that the first relay mode determined by the remote terminal can transmit the data of the first application via the relay terminal. In addition, selection of the first relay mode by the remote terminal may be further optimized.

In a possible implementation, the information about the second relay mode includes at least one of the following: an RSC corresponding to the second relay mode; or third indication information indicating the second relay mode.

According to the foregoing method, the remote terminal may flexibly send the information about the second relay mode to the relay terminal.

In a possible implementation, the second response message further includes: trust information of the relay terminal, where the trust information indicates whether the relay terminal is trusted to the remote terminal. In this case, when the third relay mode is the layer-3 relay mode, the remote terminal may determine, based on the trust information of the relay terminal, that the first relay mode is the first layer-3 relay mode or the second layer-3 relay mode.

In the first layer-3 relay mode, when the data of the first application of the remote terminal is transmitted via the relay terminal, the relay terminal cannot obtain content of the data of the first application transmitted by the remote terminal, so that security of transmitting the data of the first application can be ensured. When the remote terminal has a security requirement for transmitting the data of the first application, the remote terminal may determine that the first relay mode is the first layer-3 relay mode when the relay terminal is untrusted. When the relay terminal is trusted, the second layer-3 relay mode may be selected to reduce relay complexity. According to the foregoing method, in the case of coexistence of the first layer-3 relay mode and the second layer-3 relay mode, the remote terminal may flexibly choose the first relay mode to perform relay, to improve transmission performance of transmitting the data of the first application, and meet a requirement for transmitting the data of the first application.

In a possible implementation, the relay mode corresponding to the first application of the remote terminal may further include: a correspondence between the relay mode and an RSC and a correspondence between an RSC and the first application.

According to the foregoing method, when a correspondence exists between the relay mode and the RSC, more manners of indicating the relay mode corresponding to the first application of the remote terminal in the first policy information may be provided, thereby improving indication flexibility of the first policy information. Correspondingly, the remote terminal may further determine the information about the first relay mode based on the correspondence between the relay mode and an RSC and the correspondence between an RSC and the first application that are in the first policy information, to improve flexibility of the information about the first relay mode. The remote terminal may further determine the information about the second relay mode based on the correspondence between the relay mode and an RSC and the correspondence between an RSC and the first application that are in the first policy information, to improve flexibility of the information about the second relay mode.

According to a second aspect, this application provides a communication method. The method is applied to a scenario (a U2N relay scenario) in which a remote terminal communicates with a network via a relay terminal. The method may be applied to the relay terminal or a chip in the relay terminal. That the method is performed by the relay terminal is used as an example, and the method includes: The relay terminal obtains information about a first relay mode, where the first relay mode is used by the remote terminal to transmit data of a first application. Therefore, the relay terminal transmits the data of the first application for the remote terminal in the first relay mode.

According to the foregoing method, the relay terminal may determine the first relay mode based on the obtained information about the first relay mode. Therefore, the relay terminal may determine that the remote terminal transmits the data of the first application based on the first relay mode. In this case, the relay terminal may transmit the data of the first application for the remote terminal based on the first relay mode. Therefore, the relay terminal may cooperate with the remote terminal to transmit the data of the first application for the remote terminal in the first relay mode based on the first relay mode determined by the remote terminal, so that in the case of coexistence of a plurality of relay modes, a relay service is provided for the remote terminal in the first relay mode used by the remote terminal.

In a possible implementation, the first relay mode is: a layer-2 relay mode or a layer-3 relay mode; or a layer-2 relay mode, a first layer-3 relay mode, or a second layer-3 relay mode.

According to the foregoing method, the first relay mode is a unique relay mode, and the relay terminal does not need to determine the first relay mode when the plurality of relay modes coexist. Therefore, in the case of coexistence plurality of relay modes, complexity of providing the relay service for the remote terminal by the relay terminal can be reduced.

In a possible implementation, the relay terminal may receive a first message from the remote terminal, where the first message includes the information about the first relay mode.

According to the foregoing method, the relay terminal may obtain the information about the first relay mode by receiving the first message from the remote terminal. For example, the first message may be a discovery message or a direct communication connection message.

There may be a plurality of implementations of the information about the first relay mode. In a possible implementation, the information about the first relay mode may include: an RSC corresponding to the first relay mode; or first indication information indicating the first relay mode.

In a possible implementation, the relay terminal may send a first response message to the remote terminal, where the first response message is a response to the first message, the first response message includes second indication information, and the second indication information indicates that the relay terminal supports the first relay mode.

According to the foregoing method, when determining, based on the first message, to support the first relay mode, the relay terminal may send the first response message to the remote terminal, so that the remote terminal determines that the relay terminal supports the first relay mode, and prepares for the remote terminal to transmit the data of the first application in the first relay mode, to increase a success rate of transmitting the data of the first application by the remote terminal in the first relay mode.

In a possible implementation, before the relay device transmits the data of the first application for the remote terminal in the first relay mode, the method further includes: The relay device receives a third message from the remote terminal, where the third message includes information about a seventh relay mode; and the relay device sends a fourth response message to the remote terminal, where the fourth response message is a response to the third message, and the fourth response message indicates that the relay terminal does not support the seventh relay mode.

In the foregoing technical solution, when determining that the relay terminal does not support a relay mode (the seventh relay mode) selected by the remote terminal, the relay terminal may feed back the fourth response message to the remote terminal, to indicate that the relay terminal does not support the seventh relay mode, so that the remote terminal determines again, based on first policy information and the seventh relay mode, a relay mode that can be supported by the relay terminal. In this way, the remote terminal performs relay communication via the relay terminal in the first relay mode.

In a possible implementation, when the first relay mode is the layer-2 relay mode, the relay terminal may receive a second message from the remote terminal, where the second message includes no RSC, and the second message is a discovery message or a DCR message.

According to the foregoing method, the relay terminal may determine, based on that the discovery message or the DCR message includes no RSC, that the first relay mode is the layer-2 relay mode, and obtain the information about the first relay mode without changing signaling.

In a possible implementation, the relay terminal may receive second policy information from a policy control function network element, where the second policy information includes a relay mode of the relay terminal. The relay mode of the relay terminal includes the first relay mode.

In a possible implementation, the relay mode of the relay terminal is a relay mode allowed to be used by the relay terminal, or a relay mode authorized to be used by the relay terminal.

In a possible implementation, the relay terminal may determine, based on a relay mode supported by the relay terminal, that the relay terminal supports the first relay mode.

According to the foregoing method, the relay terminal may determine, based on the relay mode supported by the relay terminal, whether to support the first relay mode. A determining manner is simple, and may reduce complexity of determining, by the relay terminal, whether to support the first relay mode. Optionally, the relay terminal may further determine, based on whether to support the first relay mode, whether to provide a relay service for the remote terminal.

In a possible implementation, before obtaining the information about the first relay mode, the relay terminal may receive second policy information from a policy control function network element, where the second policy information includes a relay mode of the relay terminal; receive a second discovery message of the remote terminal, where the second discovery message carries information about a second relay mode; and send information about a third relay mode to the remote terminal based on the second policy information and the information about the second relay mode, where the third relay mode includes at least one relay mode in the second relay mode, and the relay terminal supports the third relay mode.

According to the foregoing method, the relay terminal may determine, based on the second policy information configured by the policy control function network element for the relay terminal, whether to support the second relay mode sent by the remote terminal, and control or coordinate the relay mode of the relay terminal by using a network device. For example, the relay terminal may determine the supported third relay mode in the second relay mode. In this case, the relay terminal may send the information about the third relay mode to the remote terminal, so that the remote terminal can determine the first relay mode based on the third relay mode of the relay terminal, to improve flexibility and increase a success rate of determining the first relay mode by the remote terminal.

In a possible implementation, before receiving the second policy information, the relay terminal may send, to the policy control function network element, a relay mode supported by the relay terminal.

According to the foregoing method, before the policy control function network element sends the second policy information, the relay terminal may report the relay mode supported by the relay terminal, so that the policy control function network element can determine the second policy information based on the relay mode supported by the relay terminal. Therefore, when the relay terminal determines whether to support the first relay mode or whether to support the second relay mode, an operation of determining whether the first relay mode is the relay mode supported by the relay terminal may be omitted, to reduce complexity of determining whether to support the first relay mode or whether to support the second relay mode. In addition, overheads of the second policy information may be reduced, and overheads of receiving the second policy information by the relay terminal may be reduced.

In a possible implementation, after determining, based on the information about the second relay mode, the second policy information, and a capability of the relay terminal, to support the third relay mode, the relay terminal may send the information about the third relay mode to the remote terminal.

According to the foregoing method, the relay terminal may further determine the supported third relay mode in the second relay mode based on the information about the second relay mode, the second policy information, and the capability of the relay terminal, so that the remote terminal can determine the first relay mode based on the third relay mode, to better match the capability of the relay terminal, and improve performance of transmitting the data of the first application by the remote terminal via the relay terminal in the first relay mode.

In a possible implementation, the relay terminal may send the trust information of the relay terminal to the remote terminal when the second relay mode includes the layer-3 relay mode, and the relay device supports the layer-3 relay mode, where the trust information of the relay terminal indicates whether the relay terminal is trusted to the remote terminal.

In a possible implementation, the second relay mode includes: at least one of the layer-2 relay mode or the layer-3 relay mode; or at least one of the layer-2 relay mode, the first layer-3 relay mode, or the second layer-3 relay mode.

In a possible implementation, the information about the second relay mode may include at least one of the following: an RSC corresponding to the second relay mode; or third indication information indicating the second relay mode.

In a possible implementation, the relay mode corresponding to the first application of the remote terminal may further include: a correspondence between the relay mode and an RSC and a correspondence between an RSC and the first application.

In a possible implementation, the relay mode of the relay terminal may further include: a correspondence between the relay mode and an RSC.

According to the foregoing method, when a correspondence exists between the relay mode and the RSC, the relay terminal may provide more manners of indicating the relay mode corresponding to the first application of the remote terminal in the first policy information, to improve indication flexibility of the first policy information. In some embodiments, the relay terminal may further receive the information (for example, the RSC corresponding to the first relay mode) about the first relay mode determined by the remote terminal based on the correspondence between the relay mode and an RSC and the correspondence between an RSC and the first application that are in the first policy information. The relay terminal may determine, based on a direct correspondence between the relay mode and an RSC in the second policy information, whether the RSC corresponding to the first relay mode exists in the second policy information, to determine whether to support the first relay mode, thereby improving flexibility of determining the first relay mode. In some other embodiments, the information about the second relay mode sent by the remote terminal may alternatively be an RSC corresponding to the second relay mode. Therefore, the relay terminal determines, based on the information about the second relay mode, to support the third relay mode, or may determine, in the foregoing manner, to support the third relay mode. Details are not described herein again.

According to a third aspect, this application provides a communication method. The method is applied to a scenario (a U2N relay scenario) in which a remote terminal communicates with a network via a relay terminal. The method may be applied to a policy control function network element or a chip in the policy control function network element. The policy control function network element corresponds to the remote terminal, and is, for example, a policy control function network element that is responsible for providing a policy for the remote terminal during registration of the remote terminal.

The policy control function network element is used as an example, and the method includes: The policy control function network element obtains a fourth relay mode, where the fourth relay mode includes at least one of the following: a relay mode corresponding to a first application, a relay mode supported by the remote terminal, or a relay mode authorized by the remote terminal. Therefore, the policy control function network element sends first policy information to the remote terminal based on the fourth relay mode. The first policy information includes a relay mode corresponding to a first application of the remote terminal, and the relay mode corresponding to the first application of the remote terminal is used by the remote terminal to transmit data of the first application.

According to the foregoing method, the policy control function network element may determine, based on at least one of the obtained relay mode corresponding to the first application, the obtained relay mode supported by the remote terminal, or the obtained relay mode authorized by the remote terminal, the relay mode corresponding to the first application of the remote terminal, include, in the first policy information, the relay mode corresponding to the first application of the remote terminal, and send the first policy information to the remote terminal, so that the remote terminal can determine, based on the first policy information, a relay mode used by the remote terminal to transmit the data of the first application. In other words, the policy control function network element may control or recommend, by using the first policy information, relay modes selected by the remote terminal for different applications, to meet requirements of different applications and enable collaboration between different relay modes.

In a possible implementation, before sending the first policy information to the remote terminal, the policy control function network element may further receive the relay mode that is supported by the remote terminal and that is sent by the remote terminal, and/or receive the relay mode that is authorized by the remote terminal and that is sent by a unified data repository UDR network element.

According to the foregoing method, the policy control function network element may obtain the relay mode supported by the remote terminal and/or the relay mode authorized by the remote terminal.

In a possible implementation, the policy control function network element may determine, based on the relay mode supported by the remote terminal and/or the relay mode authorized by the remote terminal, the relay mode corresponding to the first application of the remote terminal.

According to the foregoing method, the policy control function network element may determine, based on the obtained relay mode supported by the remote terminal and/or the obtained relay mode authorized by the remote terminal, relay modes suitable for the remote terminal in different applications, namely, relay modes corresponding to first applications of the remote terminal. In this way, flexibility of controlling or recommending, by using the first policy information, the relay modes selected by the remote terminal for different applications is improved.

In a possible implementation, the first policy information further includes: a priority of the relay mode corresponding to the first application of the remote terminal.

According to the foregoing method, the policy control function network element may configure a preferentially selected relay mode for the remote terminal, to improve flexibility of controlling or recommending the relay mode of the remote terminal.

In a possible implementation, the relay mode corresponding to the first application of the remote terminal includes: at least one of a layer-2 relay mode or a layer-3 relay mode; or at least one of a layer-2 relay mode, a first layer-3 relay mode, or a second layer-3 relay mode, where the first layer-3 relay mode is a layer-3 relay mode with a non-3GPP interworking function network element, and the second layer-3 relay mode is a layer-3 relay mode without a non-3GPP interworking function network element.

In a possible implementation, the policy control function network element obtains a fifth relay mode, and sends second policy information to the relay terminal based on the fifth relay mode, where the second policy information includes a relay mode of the relay terminal. The fifth relay mode includes at least one of the following: a relay mode supported by the relay terminal, or a relay mode authorized by the relay terminal.

According to the foregoing method, the policy control function network element may further determine the relay mode of the relay terminal based on at least one of the relay mode supported by the relay terminal or the relay mode authorized by the relay terminal, to send the second policy information to the relay terminal, and indicate the relay mode of the relay terminal to the relay terminal. The policy control function network element controls or recommends the relay mode of the relay terminal.

According to a fourth aspect, this application provides a communication method. The method is applied to a scenario (a U2N relay scenario) in which a remote terminal communicates with a network via a relay terminal. The method may be applied to a policy control function network element or a chip in the policy control function network element. The policy control function network element corresponds to the relay terminal, and is, for example, a policy control function network element that is responsible for providing a policy for the relay terminal during registration of the relay terminal.

The policy control function network element is used as an example, and the method includes: The policy control function network element obtains a fifth relay mode, where the fifth relay mode includes at least one of the following: a relay mode supported by the relay terminal, or a relay mode authorized by the relay terminal; and the policy control function network element sends second policy information to the relay terminal based on the fifth relay mode, where the second policy information includes a relay mode of the relay terminal.

According to the foregoing method, the policy control function network element may further determine the relay mode of the relay terminal based on at least one of the relay mode supported by the relay terminal or the relay mode authorized by the relay terminal, to send the second policy information to the relay terminal, and indicate the relay mode of the relay terminal to the relay terminal. The policy control function network element controls or recommends the relay mode of the relay terminal.

With reference to any one of the possible implementations of the third aspect and the fourth aspect, in a possible implementation, the policy control function network element receives, from the relay terminal, the relay mode supported by the relay terminal, and/or receives, from a unified data repository network element, the relay mode authorized by the relay terminal.

According to the foregoing method, the policy control function network element may obtain the relay mode supported by the relay terminal, and/or the policy control function network element may obtain the relay mode authorized by the relay terminal.

With reference to any one of the possible implementations of the third aspect and the fourth aspect, in a possible implementation, the policy control function network element determines the relay mode of the relay terminal based on the relay mode supported by the relay terminal and/or the relay mode authorized by the relay terminal.

With reference to any one of the possible implementations of the third aspect and the fourth aspect, in a possible implementation, the second policy information further includes: a priority of the relay mode of the relay terminal.

According to the foregoing method, the policy control function network element may configure, for the relay terminal, a relay mode that is preferentially supported, to improve flexibility of controlling or recommending the relay mode of the relay terminal.

With reference to any one of the possible implementations of the third aspect and the fourth aspect, in a possible implementation, the relay mode of the relay terminal includes: at least one of the layer-2 relay mode or the layer-3 relay mode; or at least one of the layer-2 relay mode, the first layer-3 relay mode, or the second layer-3 relay mode.

With reference to any one of the possible implementations of the third aspect and the fourth aspect, in a possible implementation, the relay mode corresponding to the first application of the remote terminal may further include: a correspondence between the relay mode and an RSC and a correspondence between an RSC and the first application.

In a possible implementation, the relay mode of the relay terminal may further include: a correspondence between the relay mode and an RSC.

It should be noted that, the methods described in the first aspect, the second aspect, the third aspect, and the fourth aspect correspond to each other. Therefore, for advantageous effects of related technical features in the methods described in the aspects, refer to each other. Details are not described again.

According to a fifth aspect, embodiments of this application provide a communication method. The method is applied to a scenario (a user equipment-to-user equipment relay (U2U relay) scenario) in which a source terminal communicates with a target terminal via a relay terminal. The method may be applied to the source terminal or a chip in the source terminal. That the method is performed by the source terminal is used as an example, and the method includes: The source terminal receives first policy information from a policy control function network element, where the first policy information includes a relay mode corresponding to a first application of the source terminal; and the source terminal determines a first relay mode based on the first policy information, and transmits data of the first application with the target terminal in the first relay mode.

In the foregoing manner, the source terminal may obtain, based on the first policy information determined by the policy control function network element, the relay mode corresponding to the first application of the source terminal. Further, the source terminal may determine, based on the first policy information, a corresponding relay mode, namely, the first relay mode, when the source terminal transmits the data of the first application. In this way, when a layer-2 relay mode and a layer-3 relay mode coexist, relay modes selected by the source terminal for different applications are controlled or recommended based on the first policy information delivered by the policy control function network element, and the source terminal selects the relay modes for indirect communication. In this way, requirements of different applications are met, and collaboration between different relay modes is enabled.

In a possible implementation, the source terminal may determine, based on the relay mode corresponding to the first application of the source terminal, the first relay mode in the relay mode corresponding to the first application. This helps reduce complexity of determining a first relay mode by the source terminal, and improves efficiency of determining the first relay mode.

In a possible implementation, the first policy information further includes: a priority of the relay mode corresponding to the first application of the source terminal. The source terminal may determine the first relay mode based on the relay mode corresponding to the first application of the source terminal and the priority of the relay mode corresponding to the first application of the source terminal.

In a possible implementation, before receiving the first policy information from the policy control function network element, the source terminal may first send, to the policy control function network element, a relay mode supported by the source terminal.

In a possible implementation, the source terminal may determine, based on a capability of the source terminal, the first relay mode in the relay mode supported by the source terminal and the first policy information. The relay mode supported by the source terminal includes: a layer-2 relay mode or a layer-3 relay mode.

In a possible implementation, the relay mode corresponding to the first application of the source terminal includes: at least one of the layer-2 relay mode or the layer-3 relay mode.

In a possible implementation, the first relay mode is: the layer-2 relay mode or the layer-3 relay mode.

In a possible implementation, the method further includes: sending a first message, where the first message includes information about the first relay mode.

In a possible implementation, the information about the first relay mode includes at least one of the following: a relay service code RSC corresponding to the first relay mode; or first indication information indicating the first relay mode.

In a possible implementation, the source terminal may further receive a third response message from the relay terminal, where the third response message is a response to the first message, and the third response message indicates that the relay terminal supports the source terminal in communicating with the target terminal in the first relay mode.

In a possible implementation, the source terminal may further determine a seventh relay mode based on the first policy information, and send a third message, where the third message includes information about the seventh relay mode. After receiving a fifth response message from the relay terminal, the source terminal may further determine the first relay mode based on the first policy information and the seventh relay mode. The fifth response message is a response to the third message, and the fifth response message indicates that the relay terminal or the target terminal does not support the seventh relay mode.

In the foregoing technical solution, the source terminal may determine a relay mode based on the first policy information, but the relay terminal or the target terminal may not support the relay mode (the seventh relay mode). In this case, the source terminal may determine the first relay mode based on the first policy information and the seventh relay mode again, to determine a relay mode supported by both the relay terminal and the target terminal, so that the source terminal performs relay communication with the target terminal via the relay terminal in the first relay mode.

In a possible implementation, the source terminal may determine a second relay mode based on the first policy information, where the second relay mode includes one or more relay modes in the relay mode corresponding to the first application of the source terminal. Then, the source terminal determines the first relay mode based on the second relay mode.

In a possible implementation, the source terminal may further send a second discovery message, where the second discovery message includes information about the second relay mode. Correspondingly, the relay terminal receives the second discovery message, and sends a third discovery message, where the third discovery message includes information about a third relay mode, the third relay mode includes one or more relay modes in the second relay mode, and the relay terminal supports the third relay mode. Further, the target terminal receives the third discovery message, and sends a sixth response message, where the sixth response message includes information about an eighth relay mode, the eighth relay mode includes one or more relay modes in the third relay mode, and the target terminal supports the third relay mode. Correspondingly, the relay terminal receives the sixth response message, and sends a second response message to the source terminal, where the second response message includes the information about the eighth relay mode. The source terminal receives the second response message from the relay terminal, and determines the first relay mode based on the information about the eighth relay mode.

According to the foregoing method, the source terminal may directly determine the first relay mode supported by all of the source terminal, the relay terminal, and the target terminal. A case in which after the source terminal determines a relay mode, the relay terminal and/or the target terminal do/does not support the relay mode, consequently, the source terminal needs to update the relay mode and initiates a relay terminal discovery process again to discover the relay terminal, and the relay terminal further initiates a target terminal discovery process to discover the target terminal is avoided, thereby helping increase a success rate of selecting an appropriate relay mode.

In a possible implementation, the information about the second relay mode includes at least one of the following: an RSC corresponding to the second relay mode; or third indication information indicating the second relay mode.

For technical effects achieved by any one of the possible implementations of the fifth aspect, refer to the descriptions of advantageous effects in the first aspect. It may be understood that the remote terminal is replaced with the source terminal. Details are not described herein again.

According to a sixth aspect, embodiments of this application provide a communication method. The method is applied to a scenario (a U2U relay scenario) in which a source terminal communicates with a target terminal via a relay terminal. The method may be applied to the relay terminal or a chip in the relay terminal. That the method is performed by the relay terminal is used as an example, and the method includes: obtaining information about a first relay mode, where the first relay mode is used by a source terminal to transmit data of a first application; and transmitting the data of the first application for the source terminal in the first relay mode.

According to the foregoing method, the relay terminal may determine the first relay mode based on the information about the first relay mode. Therefore, the relay terminal may determine that the source terminal transmits the data of the first application based on the first relay mode. In this case, the relay terminal may transmit the data of the first application for the source terminal and the target terminal based on the first relay mode. Therefore, the relay terminal may collaborate with the source terminal and the target terminal to transmit the data of the first application in the first relay mode based on the first relay mode determined by the source terminal, and in the case of coexistence of a plurality of relay modes, provide a relay service in the first relay mode.

In a possible implementation, the first relay mode is: a layer-2 relay mode or a layer-3 relay mode.

In a possible implementation, that the relay terminal obtains information about a first relay mode includes: receiving a first message from the source terminal, where the first message includes the information about the first relay mode.

In a possible implementation, the information about the first relay mode includes: an RSC corresponding to the first relay mode; or first indication information indicating the first relay mode.

In a possible implementation, the relay terminal may further send a third response message to the source terminal, where the third response message is a response to the first message, and the third response message indicates that the relay terminal supports the source terminal in communicating with the target terminal in the first relay mode. It may also be understood that the third response message indicates that the relay terminal and the target terminal support the first relay mode.

In a possible implementation, when determining that the relay terminal supports the first relay mode, the relay terminal may further send a fourth message, where the fourth message includes the information about the first relay mode.

Correspondingly, the relay terminal may receive a response message for the fourth message from the target terminal, and determine, based on the response message for the fourth message, that the target terminal supports the first relay mode.

According to the foregoing method, when determining that the relay terminal supports the first relay mode, the relay terminal may send the information about the first relay mode, so that the target terminal obtains the information about the first relay mode, and the relay terminal transmits the data of the first application for the source terminal and the target terminal based on the first relay mode.

In a possible implementation, before transmitting the data of the first application for the source terminal in the first relay mode, the relay terminal may further receive a third message from the source terminal, where the third message includes information about a seventh relay mode. The relay terminal determines that the relay terminal does not support the seventh relay mode, and sends a fifth response message to the source terminal, where the fifth response message is a response to the third message, and the fifth response message indicates that the relay terminal or the target terminal does not support the seventh relay mode.

In a possible implementation, when determining that the relay terminal supports the seventh relay mode, the relay terminal sends a fifth message, where the fifth message includes the information about the seventh relay mode. The relay terminal may further receive a response message for the fifth message from the target terminal, determine, based on the response message for the fifth message, that the target terminal does not support the seventh relay mode, and then send the fifth response message to the source terminal, where the fifth response message indicates that the relay terminal or the target terminal does not support the seventh relay mode.

In the foregoing technical solution, after receiving the third message from the source terminal, the relay terminal may first determine whether the relay terminal supports the seventh relay mode indicated by the third message. If the relay terminal does not support the seventh relay mode, the relay terminal directly sends the fifth response message to the source terminal. If the relay terminal determines that the relay terminal supports the seventh relay mode, the relay terminal may send the fifth message to the target terminal in a broadcast manner, where the fifth message includes the information about the seventh relay mode. Then, the relay terminal may determine, based on a response of the target terminal, whether the target terminal supports the seventh relay mode, and send the fifth response message to the source terminal after determining that the target terminal does not support the seventh relay mode. In this way, the relay terminal may indicate, to the source terminal by using the fifth response message, that the relay terminal or the target terminal does not support the seventh relay mode, so that the source terminal determines again, based on the first policy information and the seventh relay mode, the first relay mode supported by both the relay terminal and the target terminal. In this way, the relay terminal transmits the data of the first application for the source terminal and the target terminal.

In a possible implementation, the relay terminal may further receive second policy information from a policy control function network element, where the second policy information includes a relay mode of the relay terminal. The relay mode of the relay terminal includes the first relay mode.

In a possible implementation, the relay terminal may further determine, based on a relay mode supported by the relay terminal, that the relay terminal supports the first relay mode.

In a possible implementation, before obtaining the information about the first relay mode, the relay terminal may further receive second policy information from a policy control function network element, where the second policy information includes a relay mode of the relay terminal. The relay terminal may further receive a second discovery message of the source terminal, where the second discovery message carries information about a second relay mode. The relay terminal sends a third discovery message Based on the second policy information and the information about the second relay mode, where the third discovery message includes information about a third relay mode, the third relay mode includes at least one relay mode in the second relay mode, and the relay terminal supports the third relay mode. In a possible implementation, the relay terminal may further receive information about an eighth relay mode from the target terminal, where the eighth relay mode includes one or more relay modes in the third relay mode, and the target terminal supports the eighth relay mode. The relay terminal sends the information about the eighth relay mode to the source terminal.

In the foregoing technical solution, the relay terminal may determine, based on the second discovery message from the source terminal, the third relay mode that is supported by the relay terminal and that is included in the second relay mode, and broadcast the third relay mode. Correspondingly, the target terminal receives the third discovery message of the relay terminal, and determines the eighth relay mode that is supported by the target terminal and that is included in the third relay mode. The relay terminal may receive the information about the eighth relay mode from the target terminal, and send the information about the eighth relay mode to the source terminal, so that the source terminal can determine the first relay mode based on the eighth relay mode. A case in which after the source terminal determines a relay mode, the relay terminal and/or the target terminal do/does not support the relay mode, consequently, the source terminal needs to update the relay mode and initiates a relay terminal discovery process again to discover the relay terminal, and the relay terminal further initiates a target terminal discovery process to discover the target terminal is avoided, thereby helping increase a success rate of selecting an appropriate relay mode.

In a possible implementation, the second relay mode includes: at least one of the layer-2 relay mode or the layer-3 relay mode.

In a possible implementation, the information about the second relay mode includes at least one of the following: an RSC corresponding to the second relay mode; or third indication information indicating the second relay mode.

In a possible implementation, the relay mode of the relay terminal is a relay mode allowed to be used by the relay terminal, or a relay mode authorized to be used by the relay terminal.

In a possible implementation, before the receiving second policy information from a policy control function network element, the method further includes: sending, to the policy control function network element, a relay mode supported by the relay terminal.

For technical effects achieved by any one of the possible implementations of the sixth aspect, refer to the descriptions of advantageous effects in the second aspect. It may be understood that the remote terminal is replaced with the source terminal. Details are not described herein again.

According to a seventh aspect, embodiments of this application provide a communication method. The method is applied to a scenario (a U2U relay scenario) in which a source terminal communicates with a target terminal via a relay terminal. The method may be applied to the target terminal or a chip in the target terminal. That the method is performed by the target terminal is used as an example, and the method includes: The target terminal receives third policy information from a policy control function network element, where the third policy information includes a relay mode corresponding to a first application of the target terminal; and transmits data of the first application to the source terminal in a first relay mode based on the third policy information.

In a possible implementation, the target terminal may receive a fourth message from the relay terminal, where the fourth message includes information about the first relay mode. The target terminal sends a response message for the fourth message to the relay terminal based on the third policy information, where the response message for the fourth message indicates that the target terminal supports the first relay mode.

In a possible implementation, before transmitting the data of the first application to the source terminal in the first relay mode, the target terminal may further receive a fifth message from the relay terminal, where the fifth message includes information about a seventh relay mode; and send a response message for the fifth message to the relay terminal based on the third policy information, where the response message for the fifth message indicates that the target terminal does not support the seventh relay mode.

In a possible implementation, the target terminal may receive a third discovery message from the relay terminal, where the third discovery message includes information about a third relay mode; and send information about an eighth relay mode to the relay terminal based on the third policy information and the third relay mode, where the eighth relay mode includes one or more relay modes in the third relay mode, and the target terminal supports the eighth relay mode.

In a possible implementation, before sending the information about the eighth relay mode to the relay terminal based on the third policy information and the third relay mode, the target terminal may further determine the eighth relay mode in the third relay mode based on the third policy information and a capability of the target terminal.

According to an eighth aspect, embodiments of this application provide a communication method. The method is applied to a scenario (a U2U relay scenario) in which a source terminal communicates with a target terminal via a relay terminal. The method may be applied to a policy control function network element or a chip in the policy control function network element. The policy control function network element corresponds to the source terminal, and is, for example, a policy control function network element that is responsible for providing a policy for the source terminal during registration of the source terminal.

That the policy control function network element performs the method is used as an example, and the method includes: The policy control function network element obtains a fourth relay mode, where the fourth relay mode includes at least one of the following: a relay mode corresponding to a first application, a relay mode supported by the source terminal, or a relay mode authorized by the source terminal. The policy control function network element sends first policy information to the source terminal based on the fourth relay mode. The first policy information includes a relay mode corresponding to a first application of the source terminal, and the relay mode corresponding to the first application of the source terminal is used by the source terminal to transmit data of the first application with the target terminal.

In a possible implementation, before sending the first policy information to the source terminal, the policy control function network element may further receive the relay mode that is supported by the source terminal and that is sent by the source terminal, and/or receive the relay mode that is authorized by the source terminal and that is sent by a unified data repository network element.

In a possible implementation, the policy control function network element may determine, based on the relay mode supported by the source terminal and/or the relay mode authorized by the source terminal, the relay mode corresponding to the first application of the source terminal.

According to a ninth aspect, embodiments of this application provide a communication method. The method is applied to a scenario (a U2U relay scenario) in which a source terminal communicates with a target terminal via a relay terminal. The method may be applied to a policy control function network element or a chip in the policy control function network element. The policy control function network element corresponds to the relay terminal, and is, for example, a policy control function network element that is responsible for providing a policy for the relay terminal during registration of the relay terminal.

That the policy control function network element performs the method is used as an example, and the method includes: The policy control function network element obtains a fifth relay mode, where the fifth relay mode includes at least one of the following: a relay mode supported by the relay terminal or a relay mode authorized by the relay terminal; and the policy control function network element sends second policy information to the relay terminal based on the fifth relay mode, where the second policy information includes a relay mode of the relay terminal.

In a possible implementation, the policy control function network element receives, from the relay terminal, the relay mode supported by the relay terminal, and/or receives, from a unified data repository network element, the relay mode authorized by the relay terminal.

In a possible implementation, the policy control function network element determines the relay mode of the relay terminal based on the relay mode supported by the relay terminal and/or the relay mode authorized by the relay terminal.

According to a tenth aspect, embodiments of this application provide a communication method. The method is applied to a scenario (a U2U relay scenario) in which a source terminal communicates with a target terminal via a relay terminal. The method may be applied to a policy control function network element or a chip in the policy control function network element. The policy control function network element corresponds to the target terminal, and is, for example, a policy control function network element that is responsible for providing a policy for the target terminal during registration of the target terminal.

That the policy control function network element performs the method is used as an example, and the method includes: The policy control function network element obtains a sixth relay mode, where the sixth relay mode includes at least one of the following: a relay mode corresponding to a first application, a relay mode supported by the target terminal, or a relay mode authorized by the target terminal. Therefore, the policy control function network element sends third policy information to the target terminal based on the sixth relay mode. The third policy information includes a relay mode corresponding to a first application of the target terminal, and the relay mode corresponding to the first application of the target terminal is used by the source terminal to transmit data of the first application with the target terminal.

In a possible implementation, before sending the third policy information to the target terminal, the policy control function network element may further receive the relay mode that is supported by the target terminal and that is sent by the target terminal, and/or receive, from a unified data repository network element, the relay mode authorized by the target terminal.

In a possible implementation, the policy control function network element may determine, based on the relay mode supported by the target terminal and/or the relay mode authorized by the target terminal, the relay mode corresponding to the first application of the target terminal.

In a possible implementation, the relay mode corresponding to the first application of the target terminal includes: at least one of a layer-2 relay mode or a layer-3 relay mode.

It should be noted that, the methods described in the fifth aspect to the tenth aspect correspond to each other. Therefore, for advantageous effects of related technical features in the methods described in the aspects, refer to each other. Details are not described again.

According to an eleventh aspect, embodiments of this application provide a communication apparatus. The communication apparatus may be a terminal device (for example, the remote terminal in the first aspect or the relay terminal in the second aspect) or a chip disposed in the terminal device. The communication apparatus has a function of implementing any one of the first aspect and the second aspect. For example, the communication apparatus includes a corresponding module, unit, or means for performing the step in any one of the first aspect and the second aspect. The function, the unit, or the means may be implemented by using software, implemented by using hardware, or implemented by executing corresponding software by hardware.

In a possible implementation, the communication apparatus includes a processing unit and a communication unit. The communication unit may be configured to: receive and send a signal, to implement communication between the communication apparatus and another apparatus. For example, the communication unit is configured to receive configuration information from the terminal device. The processing unit may be configured to perform some internal operations of the communication apparatus.

In another possible implementation, the communication apparatus includes a processor, and may further include a transceiver. The transceiver is configured to: receive and send a signal. The processor executes program instructions to complete any one of the possible implementations in the first aspect and the second aspect or the method in the possible implementation. The communication apparatus may further include one or more memories. The memory is configured to be coupled to the processor, and the memory may store a necessary computer program or necessary instructions for implementing the function in any one of the first aspect and the second aspect. The processor may execute the computer program or the instructions stored in the memory. When the computer program or the instructions are executed, the communication apparatus is enabled to implement any one of the possible implementations in the first aspect and the second aspect or the method in the possible implementation.

In another possible implementation, the communication apparatus includes a processor, and the processor may be configured to be coupled to a memory. The memory may store a necessary computer program or necessary instructions for implementing the function in any one of the first aspect and the second aspect. The processor may execute the computer program or the instructions stored in the memory. When the computer program or the instructions are executed, the communication apparatus is enabled to implement any one of the possible implementations in the first aspect and the second aspect or the method in the possible implementation.

In another possible implementation, the communication apparatus includes a processor and an interface circuit. The processor is configured to: communicate with another apparatus by using the interface circuit, and perform any one of the possible implementations in the first aspect and the second aspect or the method in the possible implementation.

It may be understood that in the eleventh aspect, the processor may be implemented by using hardware or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. In addition, there may be one or more processors, and one or more memories. The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of this application.

According to a twelfth aspect, embodiments of this application provide a communication apparatus. The communication apparatus may be a network device (for example, the policy control function network element in the third aspect or the policy control function network element in the fourth aspect) or a chip disposed in the network device. The communication apparatus has a function of implementing any one of the third aspect and the fourth aspect. For example, the communication apparatus includes a corresponding module, unit, or means for performing the step in any one of the third aspect and the fourth aspect. The function, the unit, or the means may be implemented by using software, implemented by using hardware, or implemented by executing corresponding software by hardware.

In a possible implementation, the communication apparatus includes a processing unit and a communication unit. The communication unit may be configured to: receive and send a signal, to implement communication between the communication apparatus and another apparatus. For example, the communication unit is configured to receive configuration information from a terminal device. The processing unit may be configured to perform some internal operations of the communication apparatus.

In another possible implementation, the communication apparatus includes a processor, and may further include a transceiver. The transceiver is configured to: receive and send a signal. The processor executes program instructions to complete any one of the possible implementations in the third aspect and the fourth aspect or the method in the possible implementation. The communication apparatus may further include one or more memories. The memory is configured to be coupled to the processor, and the memory may store a necessary computer program or necessary instructions for implementing the function in any one of the third aspect and the fourth aspect. The processor may execute the computer program or the instructions stored in the memory. When the computer program or the instructions are executed, the communication apparatus is enabled to implement any one of the possible implementations in the third aspect and the fourth aspect or the method in the possible implementation.

In another possible implementation, the communication apparatus includes a processor, and the processor may be configured to be coupled to a memory. The memory may store a necessary computer program or necessary instructions for implementing the function in any one of the third aspect and the fourth aspect. The processor may execute the computer program or the instructions stored in the memory. When the computer program or the instructions are executed, the communication apparatus is enabled to implement any one of the possible implementations in the third aspect and the fourth aspect or the method in the possible implementation.

In another possible implementation, the communication apparatus includes a processor and an interface circuit. The processor is configured to: communicate with another apparatus by using the interface circuit, and perform any one of the possible implementations in the third aspect and the fourth aspect or the method in the possible implementation.

It may be understood that in the twelfth aspect, the processor may be implemented by using hardware or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. In addition, there may be one or more processors, and one or more memories. The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of this application.

According to a thirteenth aspect, embodiments of this application provide a communication system. The communication system includes the remote terminal in the first aspect, the relay terminal in the second aspect, and the policy control function network element in the third aspect and/or the fourth aspect.

According to a fourteenth aspect, embodiments of this application provide a communication apparatus. The communication apparatus may be a terminal device (for example, the source terminal in the fifth aspect, the relay terminal in the sixth aspect, or the target terminal in the seventh aspect) or a chip disposed in the terminal device. The communication apparatus has a function of implementing any one of the fifth aspect to the seventh aspect. For example, the communication apparatus includes a corresponding module, unit, or means for performing the step in any one of the fifth aspect to the seventh aspect. The function, the unit, or the means may be implemented by using software, implemented by using hardware, or implemented by executing corresponding software by hardware.

In a possible implementation, the communication apparatus includes a processing unit and a communication unit.

The communication unit may be configured to: receive and send a signal, to implement communication between the communication apparatus and another apparatus. For example, the communication unit is configured to receive configuration information from the terminal device. The processing unit may be configured to perform some internal operations of the communication apparatus.

In another possible implementation, the communication apparatus includes a processor, and may further include a transceiver. The transceiver is configured to: receive and send a signal. The processor executes program instructions to complete any one of the possible implementations in the fifth aspect to the seventh aspect or the method in the possible implementation. The communication apparatus may further include one or more memories. The memory is configured to be coupled to the processor, and the memory may store a necessary computer program or necessary instructions for implementing the function in any one of the fifth aspect to the seventh aspect. The processor may execute the computer program or the instructions stored in the memory. When the computer program or the instructions are executed, the communication apparatus is enabled to implement any one of the possible implementations in the fifth aspect to the seventh aspect or the method in the possible implementation.

In another possible implementation, the communication apparatus includes a processor, and the processor may be configured to be coupled to a memory. The memory may store a necessary computer program or necessary instructions for implementing the function in any one of the fifth aspect to the seventh aspect. The processor may execute the computer program or the instructions stored in the memory. When the computer program or the instructions are executed, the communication apparatus is enabled to implement any one of the possible implementations in the fifth aspect to the seventh aspect or the method in the possible implementation.

In another possible implementation, the communication apparatus includes a processor and an interface circuit. The processor is configured to: communicate with another apparatus by using the interface circuit, and perform any one of the possible implementations in the fifth aspect to the seventh aspect or the method in the possible implementation.

It may be understood that in the fourteenth aspect, the processor may be implemented by using hardware or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. In addition, there may be one or more processors, and one or more memories. The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of this application.

According to a fifteenth aspect, embodiments of this application provide a communication apparatus. The communication apparatus may be a network device (for example, the policy control function network element in the eighth aspect, the policy control function network element in the ninth aspect, or the policy control function network element in the tenth aspect) or a chip disposed in the network device. The communication apparatus has a function of implementing any one of the eighth aspect to the tenth aspect. For example, the communication apparatus includes a corresponding module, unit, or means for performing the step in any one of the eighth aspect to the tenth aspect. The function, the unit, or the means may be implemented by using software, implemented by using hardware, or implemented by executing corresponding software by hardware.

In a possible implementation, the communication apparatus includes a processing unit and a communication unit. The communication unit may be configured to: receive and send a signal, to implement communication between the communication apparatus and another apparatus. For example, the communication unit is configured to receive configuration information from a terminal device. The processing unit may be configured to perform some internal operations of the communication apparatus.

In another possible implementation, the communication apparatus includes a processor, and may further include a transceiver. The transceiver is configured to: receive and send a signal. The processor executes program instructions to complete any one of the possible implementations in the eighth aspect to the tenth aspect or the method in the possible implementation. The communication apparatus may further include one or more memories. The memory is configured to be coupled to the processor, and the memory may store a necessary computer program or necessary instructions for implementing the function in any one of the eighth aspect to the tenth aspect. The processor may execute the computer program or the instructions stored in the memory. When the computer program or the instructions are executed, the communication apparatus is enabled to implement any one of the possible implementations in the eighth aspect to the tenth aspect or the method in the possible implementation.

In another possible implementation, the communication apparatus includes a processor, and the processor may be configured to be coupled to a memory. The memory may store a necessary computer program or necessary instructions for implementing the function in any one of the eighth aspect to the tenth aspect. The processor may execute the computer program or the instructions stored in the memory. When the computer program or the instructions are executed, the communication apparatus is enabled to implement any one of the possible implementations in the eighth aspect to the tenth aspect or the method in the possible implementation.

In another possible implementation, the communication apparatus includes a processor and an interface circuit. The processor is configured to: communicate with another apparatus by using the interface circuit, and perform any one of the possible implementations in the eighth aspect to the tenth aspect or the method in the possible implementation.

It may be understood that in the fifteenth aspect, the processor may be implemented by using hardware or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. In addition, there may be one or more processors, and one or more memories. The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of this application.

According to a sixteenth aspect, embodiments of this application provide a communication system. The communication system includes the source terminal in the fifth aspect, the relay terminal in the sixth aspect, the target terminal in the seventh aspect, and the policy control function network element in one or more of the eighth aspect to the tenth aspect.

According to a seventeenth aspect, this application provides a computer-readable storage medium. The computer storage medium stores computer-readable instructions. When a computer reads and executes the computer-readable instructions, the computer is enabled to perform the method in any one of the possible implementations of the first aspect to the tenth aspect.

According to an eighteenth aspect, this application provides a computer program product. When a computer reads and executes the computer program product, the computer is enabled to perform the method in any one of the possible implementations of the first aspect to the tenth aspect.

According to a nineteenth aspect, this application provides a chip. The chip includes a processor, and the processor is coupled to a memory, and is configured to: read and execute a software program stored in the memory, to implement the method in any one of the possible implementations of the first aspect to the tenth aspect.

DESCRIPTION OF EMBODIMENTS

The following describes in detail embodiments of this application with reference to the accompanying drawings.

Technical solutions provided in embodiments of this application may be applied to a 4th generation (4G) mobile communication system, for example, a long term evolution (LTE) system, may be applied to a 5th generation (5G) mobile communication system, for example, an NR system, or may be applied to a next generation mobile communication system or another similar communication system. This is not limited.

In addition, the technical solutions provided in embodiments of this application may be applied to a device-to-device (D2D) scenario, for example, a new radio (NR) D2D scenario, may be applied to a vehicle-to-everything (V2X) scenario, for example, an NR-V2X scenario, may be applied to an internet of vehicles scenario, for example, a V2X scenario or a vehicle-to-vehicle (V2V) scenario, or may be applied to a field such as intelligent driving, assisted driving, or an intelligent networked vehicle.

D2D communication allows direct communication between UE, and D2D communication may use one-to-many communication or one-to-one communication.

Specifically, one-to-many communication may include multicast or broadcast communication, and one-to-one communication may include unicast communication.

For example, in one-to-one communication, if a transmitting UE and a receiving UE are in a short distance range, the transmitting UE and the receiving UE may directly communicate with each other after mutual discovery. In D2D communication, UEs communicate with each other through a PC5 (ProSe communication 5) interface, and the communication may be used for information transmission on a data plane and a control plane.

When the UE is outside network coverage or a communication signal between the UE and an access network device is poor, a remote terminal (which may also be referred to as a remote UE) may be assisted by a relay terminal (which may also be referred to as a relay UE). Communication between the remote terminal and an application server is implemented based on communication between the remote terminal and the relay terminal and communication between the relay terminal and the application server through a mobile communication network. By establishing a communication manner from the remote terminal to the relay terminal to the network, it may be extended to support communication from a UE that is outside network coverage to the network. The remote terminal may share spectrum resources with a UE (a relay terminal) in a cell under control of a cell network, to effectively improve utilization of the spectrum resource.

Figures 1A, 1B, 1C:
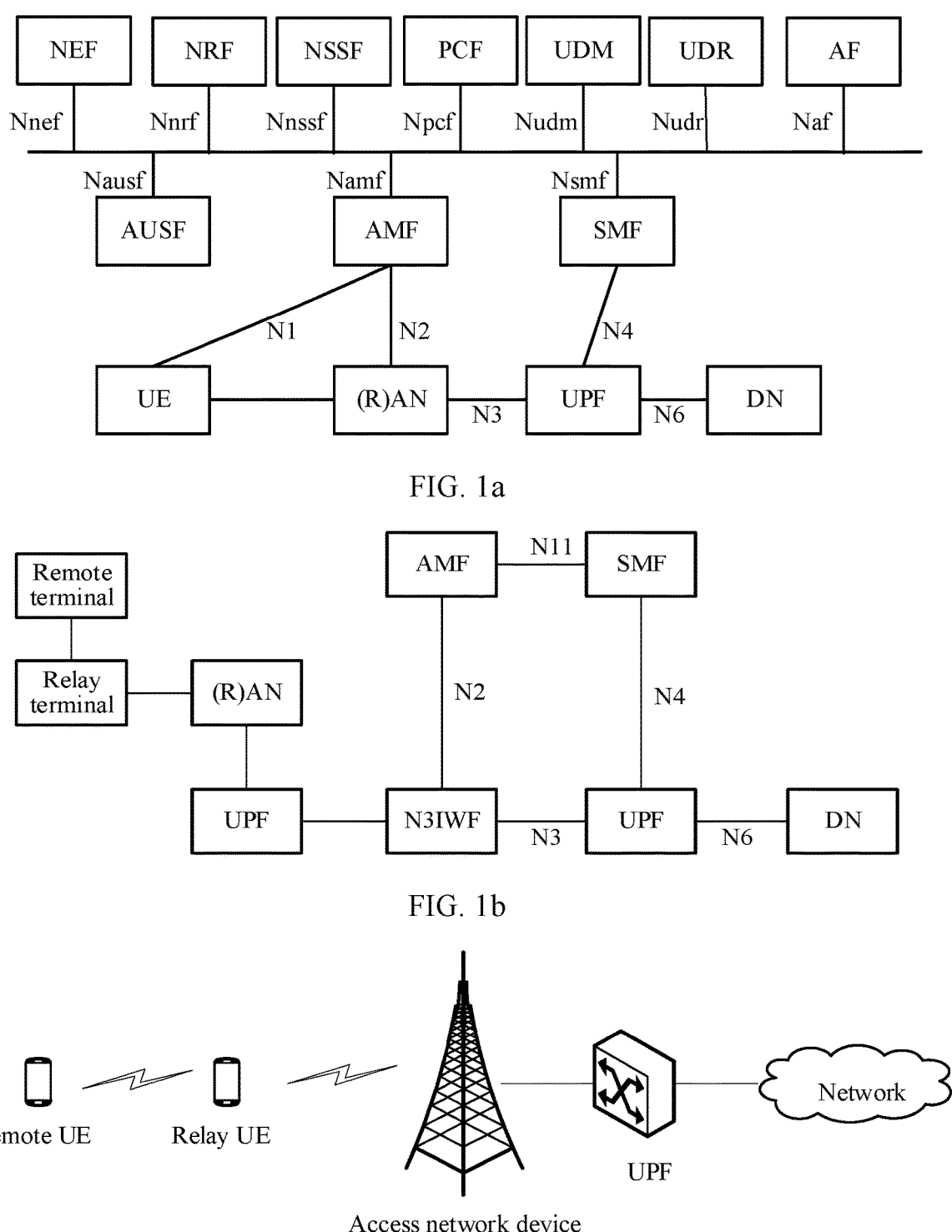
FIG. 1a and FIG. 1b each are a schematic diagram of an architecture of a communication system.
FIG. 1c is a schematic diagram of a U2N relay application scenario.

FIG. 1a shows an architecture of communication system. The communication system may include: a terminal device (shown by an example UE), an access and mobility management function (AMF) network element, a session management function (SMF) network element, a user plane function (UPF) network element, a policy control function (PCF) network element, a unified data management (UDM) function network element, an authentication server function (AUSF) network element, a network exposure function (network exposure function, NEF) network element, an application function (AF) network element, a network slice selection function (NSSF) network element, a (radio) access network ((R)AN) device, a network repository function (NRF) network element, and the like.

The AMF network element may be connected to an access network device through an N2 interface, the access network device may be connected to the UPF through an N3 interface, the SMF may be connected to the UPF through an N4 interface, and the AMF network element may be connected to the UE through an N1 interface, where an interaction message is referred to as an N1 message. Some interfaces are implemented as service-oriented interfaces. The interface names are merely examples, and are not specifically limited.

It should be understood that embodiments of this application are not limited to the communication system shown in FIG. 1a. Names of the network elements shown in FIG. 1a are merely examples for description herein, and are not intended to limit network elements included in a communication system architecture to which a communication method in this application is applicable.

Functions of the network elements or devices in the communication system are described in detail below.

The terminal device may be a UE, a handheld terminal, a notebook computer, a subscriber unit, a cellular phone, a smart phone, a wireless data card, a personal digital assistant (PDA) computer, a tablet computer, a wireless modem, a handheld device, a laptop computer, a cordless phone, a wireless local loop (WLL) station, a machine type communication (MTC) terminal, or another device that can access a network. The terminal device communicates with the access network device by using an air interface technology (for example, new radio (NR) or LTE). In internet of vehicles communication, a communication terminal mounted on a vehicle is a terminal device, and a roadside unit (RSU) may also be used as a terminal device. A communication terminal is mounted on an uncrewed aerial vehicle, and may be regarded as a terminal device.

The (R)AN device is a device that provides access for the terminal device, and includes a RAN device and an AN device. The RAN device is mainly a 3GPP network wireless network device, and the AN device may be an access network device defined in non-3GPP. The RAN device is mainly responsible for functions such as radio resource management, quality of service (QoS) management, and data compression and encryption on an air interface side. The access network device may include base stations in various forms, for example, a macro base station, a micro base station (also referred to as a small cell), a relay station, an access point, and the like. In systems using different radio access technologies, names of devices having a base station function may be different. For example, in a 5G system, the device is referred to as a RAN device or a gNB (5G NodeB) device.

The access and mobility management function network element is mainly responsible for signaling processing, for example, functions such as access control, mobility management, attachment and detachment, and gateway selection. When providing services for sessions in the terminal device, the AMF network element provides control plane storage resources for the sessions, to store session identifiers, SMF network element identifiers associated with the session identifiers, and the like. For example, as shown in FIG. 1a, in 5G, the access and mobility management function network element may be an AMF network element. In future communication, for example, 6G, the access and mobility management function network element may still be an AMF network element or have another name. This is not limited in this application. When the access and mobility management function network element is the AMF network element, the AMF may provide an Namf service.

The session management function network element is mainly responsible for session management in a mobile network, for example, session establishment, modification, and release. Specific functions include, for example, UE IP address allocation for users or selection of a UPF that provides a packet forwarding function. For example, as shown in FIG. 1a, in 5G, the session management function network element may be an SMF network element. In future communication, for example, 6G, the session management function network element may still be an SMF network element or have another name. This is not limited in this application. When the session management function network element is the SMF network element, the SMF may provide an Nsmf service.

The user plane function network element is responsible for user data forwarding and receiving in the terminal device. The user plane function network element may receive user data from a data network, and transmit the user data to the terminal device through the access network device. The UPF network element may further receive the user data from the terminal device through the access network device, and forward the user data to the data network. Transmission resources and scheduling functions that are used by the UPF network element to provide services for the terminal device are managed and controlled by the SMF network element. For example, as shown in FIG. 1a, in 5G, the user plane function network element may be a UPF network element. In future communication, for example, 6G, the user plane function network element may still be a UPF network element or have another name. This is not limited in this application.

The policy control function network element mainly supports providing a unified policy framework to control network behaviors and providing policy rules for a network function at a control layer, and is responsible for obtaining subscription information relevant for policy decisions. For example, as shown in FIG. 1a, in 5G, the policy control function network element may be a PCF network element. In future communication, for example, 6G, the policy control function network element may still be a PCF network element or have another name. This is not limited in this application. When the policy control function network element is the PCF network element, the PCF network element may provide an Npcf service.

Specifically, the PCF network element may be configured to deliver a UE policy and an access control policy in a UE access-related process (for example, a registration procedure). The PCF may be further configured to deliver a session-related policy in a PDU session-related process (for example, a PDU session establishment procedure) of the UE.

A non-3GPP interworking function (N3IWF) network element is an operator-deployed untrusted non-3GPP access gateway. An untrusted non-3GPP access manner is an access manner that is not trusted by operators, and is, for example, a manner of accessing the network via user-deployed wireless fidelity (Wi-Fi). The N3IWF network element may be a signal access point of a UE, and is a first-hop node for the UE to access a 3GPP network. A network topology position of the N3IWF network element may be regarded as an NG-RAN for the UE accessing a 5G network. The NG-RAN supports establishment of an IP security (IPsec) tunnel with the UE, supports N2 and N3 interfaces between the NG-RAN and a 5G core network, and can forward NAS signaling between the UE and the AMF.

The network exposure function network element mainly supports secure interaction between the 3GPP network and a third-party application. For example, as shown in FIG. 1a, in 5G, the network exposure function network element may be an NEF network element. In future communication, for example, 6G, the network exposure function network element may still be an NEF network element or have another name. This is not limited in this application. When the network exposure function network element is the NEF, the NEF may provide an Nnef service for another network function network element.

The application function network element mainly supports interacting with a 3GPP core network to provide services, for example, influence on data routing decision, a policy control function, or some third-party services provided for a network side.

In future communication, for example, 6G, the application function network element may still be an AF network element or have another name. This is not limited. When the application function network element is the AF network element, the AF network element may provide an Naf service.

The network exposure function network element mainly supports secure interaction between the 3GPP network and third-party applications.

The unified data management function network element is configured for generation of authentication credentials, user identification handling (for example, storage and management of permanent user identifiers), access authorization control, subscription data management, and the like. For example, as shown in FIG. 1a, in 5G, the unified data management function network element may be a UDM network element. In future communication, for example, 6G, the unified data management function network element may still be a UDM network element or have another name. This is not limited in this application. When the unified data management function network element is the UDM network element, the UDM network element may provide an Nudm service.

A unified data repository (UDR) network element is configured for storage of user subscription information of a mobile communication network, to be specific, provision of, for a requester that requests to discover a user or a service, user subscription or service information that meets a service requirement of the requester, where the information includes a subscription identifier, user subscription information related to access and mobility management, user subscription information related to session management. In addition, policy data may be provided for the PCF.

The authentication server function network element is configured to: support 3GPP and non-3GPP access authentication, support an authentication function for UE's network accesses, and support a network element slice-specific authentication and authorization procedure. For example, as shown in FIG. 1a, in 5G, the authentication server function network element may be an AUSF network element. In future communication, for example, 6G, the authentication server function network element may still be an AUSF network element or have another name. This is not limited in this application. When the authentication server function network element is the AUSF network element, the AUSF network element may provide an Nausf service.

The network slice selection function network element may be configured for selecting network slices serving the terminal device. For example, as shown in FIG. 1a, in 5G, the network slice selection function network element may be an NSSF network element. In future communication, for example, 6G, the network slice selection function network element may still be an NSSF network element or have another name. This is not limited in this application. When the network slice selection function network element is the NSSF network element, the NSSF network element may provide an Nnssf service.

The network repository function network element may be configured to: provide a network element discovery function and provide, based on requests of other network elements, network element information corresponding to a network element type. The NRF network element further provides network element management services, for example, network element registration, update, and deregistration, and network element status subscription and push. For example, as shown in FIG. 1a, in 5G, the network repository function network element may be an NRF network element. In future communication, for example, 6G, the network repository function network element may still be an NRF network element or have another name. This is not limited in this application. When the network repository function network element is the NRF network element, the NRF network element may provide an Nnrf service.

The data network (DN) is a service network that provides a data transmission service for users, for example, an IP multimedia service (IMS) or the internet.

Users' Data traffic accesses the DN via a protocol data unit (PDU) session established between a UE and the DN. The transmission passes through two network functional entities: the (R)AN and the UPF.

The UE, the (R)AN, the UPF, and the DN are usually referred to as data plane or user plane network functions and entities, and are configured to carry service data. Other network elements are referred to as control plane network functions and entities, and are configured to carry signaling messages. The control plane network functions and entities are mainly responsible for functions such as authentication and authorization, registration management, session management, mobility management, and policy control, to implement reliable and stable transmission of user-layer traffic.

Each network element in the core network may also be referred to as a function entity or device, and may be a network element implemented on dedicated hardware, a software instance running on dedicated hardware, or an instance of a virtualized function on an appropriate platform. For example, the virtualization platform may be a cloud platform.

It should be noted that the architecture of the communication system shown in FIG. 1a is not limited to including only the network elements shown in the figure, and may further include other devices that are not shown in the figure, which are not listed one by one.

Embodiments of this application may be applied to the communication system shown in FIG. 1a, but do not limit a distribution form of each network element. The distribution form shown in FIG. 1a is merely an example. For ease of description, in embodiments of this application, the network elements shown in FIG. 1a are used as an example for description, and an XX network element is briefly referred to as XX.

It should be understood that names of all the network elements in this application are merely examples, and the network elements may have other names in future communication. Alternatively, in future communication, the network element in this application may further be replaced by another entity, device, or the like having a same function. This is not limited in this application. Descriptions are uniformly provided herein, and details are not described below again. The communication system shown in FIG. 1a does not constitute any limitation on a communication system to which embodiments of this application can be applicable. The communication system architecture shown in FIG. 1a is a 5G system architecture. Optionally, embodiments of this application are further applicable to various future communication systems, for example, 6G or other communication networks.

FIG. 1c shows a schematic diagram of an application scenario. The application scenario includes a remote terminal, a relay terminal, an access network device, a UPF, and the like. In the application scenario, the remote terminal accesses a network via the relay terminal.

That the remote terminal accesses the network via the relay terminal for communication may be referred to as indirect network communication or relay communication. That is, relay communication may be understood as indirect network communication, and meanings of relay communication and indirect network communication are the same. Further, a scenario in which the remote terminal communicates with the network via the relay terminal may be referred to as a user equipment-to-network relay (U2N relay) scenario.

It should be noted that the application scenario shown in FIG. 1c is not limited to including only the network elements shown in the figure, and may further include other devices that are not shown in FIG. 1c, for example, an AMF and a PCF, which are not listed one by one herein.

Figure 1D:
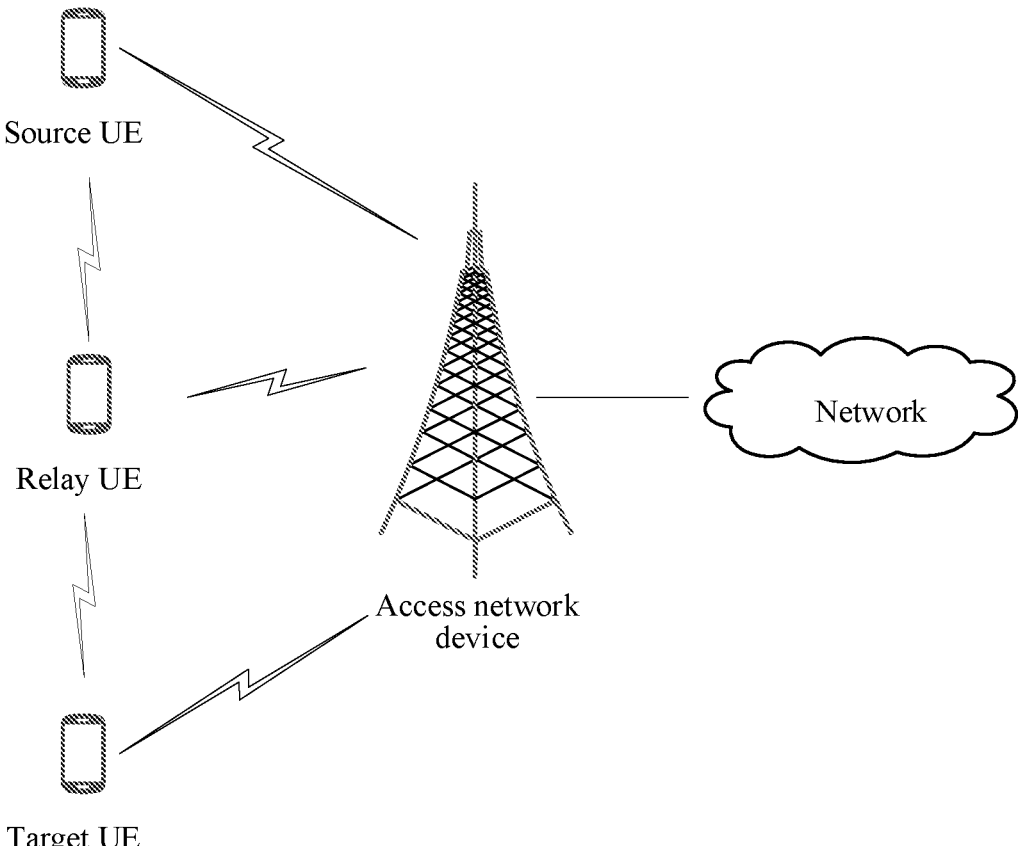
FIG. 1d is a schematic diagram of a U2U relay application scenario.

FIG. 1d is a schematic diagram of another application scenario. The application scenario includes a source terminal, a relay terminal, a target terminal, and the like. In the application scenario, the source terminal communicates with the target terminal via the relay terminal.

That the source terminal communicates with the target terminal via the relay terminal may be referred to as indirect network communication or relay communication. That is, relay communication may be understood as indirect network communication, and meanings of relay communication and indirect network communication are the same.

Further, a scenario in which the source terminal communicates with the target terminal via the relay terminal may be referred to as a user equipment-to-user equipment relay (U2U relay) scenario.

It should be noted that the application scenario shown in FIG. 1d is not limited to including only the network elements shown in the figure, and may further include other devices that are not shown in FIG. 1d, for example, an AF and a PCF, which are not listed one by one herein.

The following describes a relay mode in this application.

Relay modes are different due to different implementations. Therefore, different relay modes can provide different service performance in terms of data security, service continuity, quality of service, and the like. In addition, different relay modes also have different complexity. For ease of description, in the following, a layer-3 relay mode with an N3IWF is referred to as a first layer-3 relay mode, and a layer-3 relay mode without an N3IWF is referred to as a second layer-3 relay mode, as shown in Table 1.

TABLE 1

|  | Layer-2 relay mode | Second layer-3 relay mode | First layer-3 relay mode |
| --- | --- | --- | --- |
| Security | End-to-end security can be ensured. | End-to-end security cannot be ensured. | End-to-end security can be ensured. |
| QoS performance | Can be ensured | Can be ensured | Long transmission path and high transmission delay |
| Service continuity | Can be ensured | Cannot be ensured by a network, and needs to be ensured by an application layer | Can be ensured |
| Complexity | Medium | Low | High |

(1) Layer-2 (Layer 2) Relay Mode:

In a U2N relay scenario, a remote terminal establishes an end-to-end radio resource control (RRC) connection to an access network device via a relay terminal. Specifically, the relay terminal forwards uplink and downlink signaling of the remote terminal based on an access stratum (AS), so that the remote terminal accesses the access network device.

In the layer-2 relay mode, data transmitted between the remote terminal and a base station is encrypted and decrypted at a packet data convergence protocol (PDCP) layer of the remote terminal, and the relay terminal cannot decrypt the data of the remote terminal.

Therefore, the layer-2 relay mode can ensure data security between the remote terminal and a network. In addition, the base station controls a QoS configuration between the remote terminal and the relay terminal and a QoS configuration between the relay terminal and the base station. Therefore, the layer-2 relay mode can ensure QoS service performance between the remote terminal and the network. When the relay terminal changes, or the remote terminal switches from indirect communication to direct communication, the base station controls path switching, so that service continuity of the remote terminal is ensured. Because the layer-2 relay mode requires the relay terminal to support access stratum forwarding, complexity of the layer-2 relay mode is moderate.

In a U2U relay scenario, a source terminal establishes an end-to-end PC5 connection to a target terminal via the relay terminal. Specifically, the relay terminal forwards signaling between the relay terminal and the target terminal based on an access stratum layer (Access Stratum layer, AS layer), so that the source terminal establishes the PC5 connection to the target terminal.

In the layer-2 relay mode, data transmitted between the source terminal and the target terminal is encrypted and decrypted at a PDCP layer of the source terminal/the target terminal, and the relay terminal cannot decrypt the data. Therefore, the layer-2 relay mode can ensure data security between the source terminal and the target terminal.

(2) Layer-3 (Layer 3) Relay Mode:

In a U2N relay scenario, data of a remote terminal is forwarded by using an internet protocol (IP) layer. In other words, the data of the remote terminal is parsed by a relay terminal to the IP layer, and then the data of the remote terminal is forwarded via a PDU session of the relay terminal.

Considering that there may be a plurality of cases for the layer-3 relay mode, the following uses Case 1 and Case 2 as examples for description.

Case 1: The layer-3 relay mode is a second layer-3 relay mode, namely, a layer-3 relay mode without an N3IWF (layer 3 UE-to-network relay without an N3IWF). In this case, data of the remote terminal is forwarded to an application server via a PDU session of the relay terminal.

In this case, a network device may indicate, in a manner of indicating the layer-3 relay mode, that the remote terminal may communicate with the relay terminal in the second layer-3 relay mode.

In the second layer-3 relay mode, the relay terminal may obtain content of a data packet of the remote terminal when forwarding the data packet of the remote terminal. Therefore, end-to-end data security between the remote terminal and an access network device cannot be ensured. In addition, in the second layer-3 relay mode, the relay terminal may establish, based on the remote terminal, a PDU session that meets a QoS requirement. Therefore, QoS performance of the remote terminal can be ensured. When the relay terminal changes, or the remote terminal can be directly connected to a network, the remote terminal needs to re-establish a PDU session with the application server. Consequently, a service needs to be first interrupted and then connected, affecting service continuity. Compared with a layer-2 relay mode, the second layer-3 relay mode does not need to establish an RRC connection between the remote terminal and the access network device, lowering complexity.

Alternatively, the layer-3 relay mode is a first layer-3 relay mode, namely, a layer-3 relay mode with N3IWF (layer-3 UE-to-network relay using N3IWF or layer-3 UE-to-network relay with N3IWF). For example, FIG. 1*b* is a schematic diagram of a communication system architecture. The application scenario includes a remote terminal, a relay terminal, an access network device, core network devices (N3IWF and UPF), and the like. It should be noted that the application scenario shown in FIG. 1*b* is not limited to including only the network elements shown in the figure, and may further include other devices that are not shown in the figure, which are not specifically listed one by one in this application. The communication system architecture includes UE-relay-network communication. To be specific, the remote terminal accesses a network via the relay terminal. Data of the remote terminal is encrypted by the remote terminal and the N3IWF by using an IPsec tunneling protocol layer, and encrypted data is forwarded to N3IWF via a PDU session of the relay terminal. Then, the N3IWF decrypts the data, and forwards the data (signaling corresponding to the remote terminal) to an AMF corresponding to the remote terminal or forwards the data (service data corresponding to the remote terminal) to a UPF corresponding to a PDU session of the remote terminal. Based on a PDU session established by the N3IWF, the UPF corresponding to the PDU session of the remote terminal may remain unchanged, thereby ensuring service continuity between the remote terminal and an application server. The remote terminal and the N3IWF transmit signaling and the data of the remote terminal in an encryption manner by using the IPsec tunneling protocol layer, so that the relay terminal cannot decrypt the transmitted data of the remote terminal. Correspondingly, in a first layer-3 relay mod, because an IPsec tunnel needs to be established, and data needs to be forwarded via the relay terminal and the N3IWF, compared with another relay mode, in the first layer-3 relay mode, complexity is higher, a transmission path is long, QoS performance cannot be ensured, and a transmission delay is higher.

In this case, a network device may indicate, in a manner of indicating a layer-3 relay mode, that the remote terminal may communicate with the relay terminal in the first layer-3 relay mode.

Case 2: The layer-3 relay mode includes two modes: a layer-3 relay mode without N3IWF and a layer-3 relay mode with N3IWF.

In Case 2, there may further be the following two cases.

Case 2-1: A network device indicates, in a manner of distinguishing between a first layer-3 relay mode and a second layer-3 relay mode, whether a relay mode that can be used by the remote terminal is the first layer-3 relay mode or the second layer-3 relay mode, or whether a relay mode that can be used by the relay terminal is the first layer-3 relay mode or the second layer-3 relay mode. The remote terminal may communicate with the relay terminal based on the first layer-3 relay mode or the second layer-3 relay mode indicated by the network device.

Case 2-2: A network device indicates, in a manner of not distinguishing between a first layer-3 relay mode and a second layer-3 relay mode, that the remote terminal may use the layer-3 relay mode, or that the relay terminal may use the layer-3 relay mode. The remote terminal determines whether to use the first layer-3 relay mode or the second layer-3 relay mode for communication.

In a U2U relay scenario, a source terminal establishes a PC5 connection to the relay terminal, and a target terminal establishes a PC5 connection to the relay terminal. Data of the source terminal is forwarded by using an internet protocol (IP) layer. To be specific, the data of the source terminal is parsed by the relay terminal to the IP layer, and then forwarded to the target terminal via the relay terminal.

In this application, for ease of description, two scenarios are used for description. Scenario 1, namely, a U2N relay scenario, is that a remote terminal communicates with a network via a relay terminal. For details, refer to descriptions in FIG. 2 to FIG. 12. Scenario 2, namely, a U2U relay scenario, is that a source terminal communicates with a target terminal via a relay terminal. For details, refer to descriptions in FIG. 13 to FIG. 16.

Figure 2:
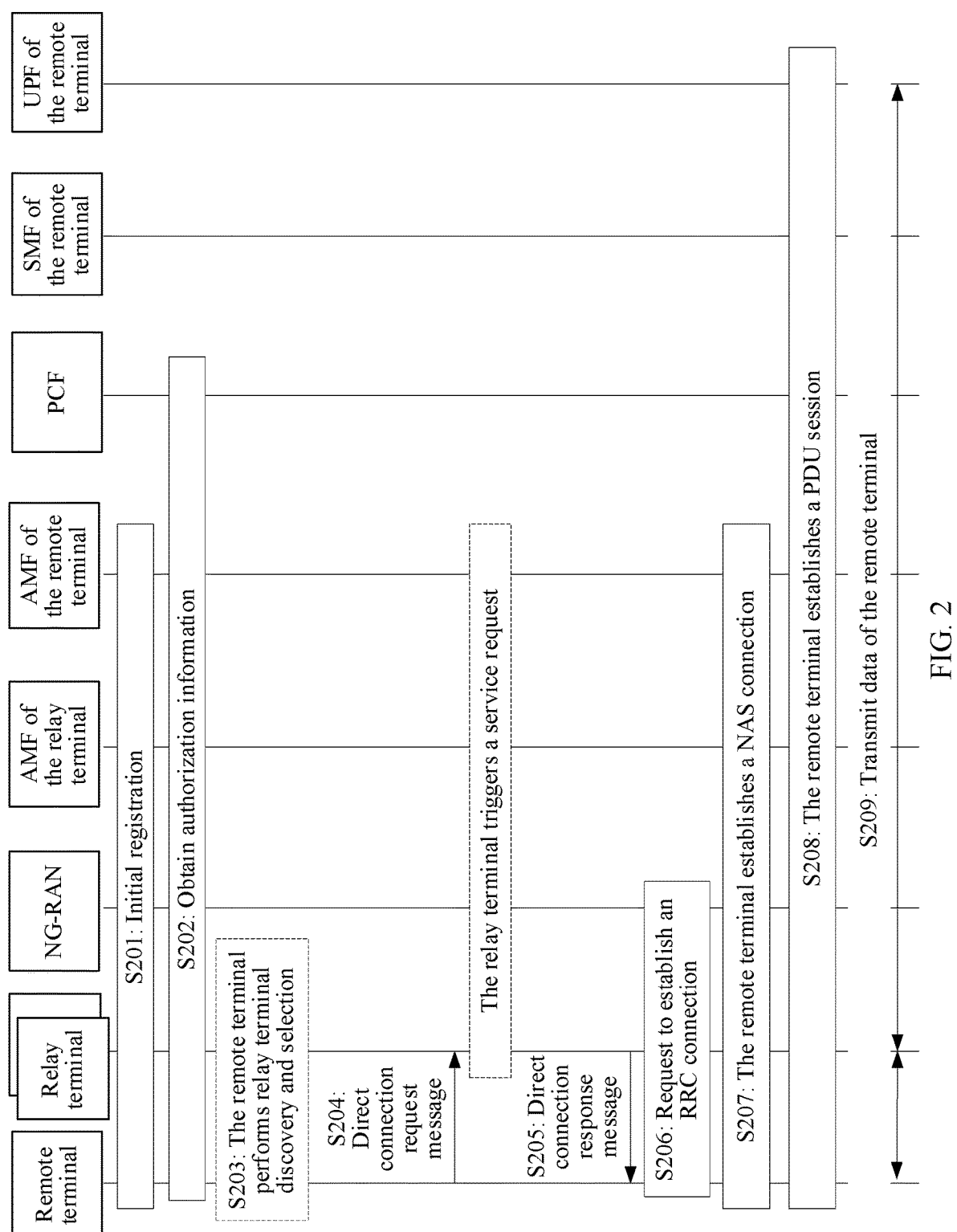
FIG. 2 is a schematic flowchart of establishing a connection in a layer-2 relay mode in a U2N relay scenario.
Figure 3:
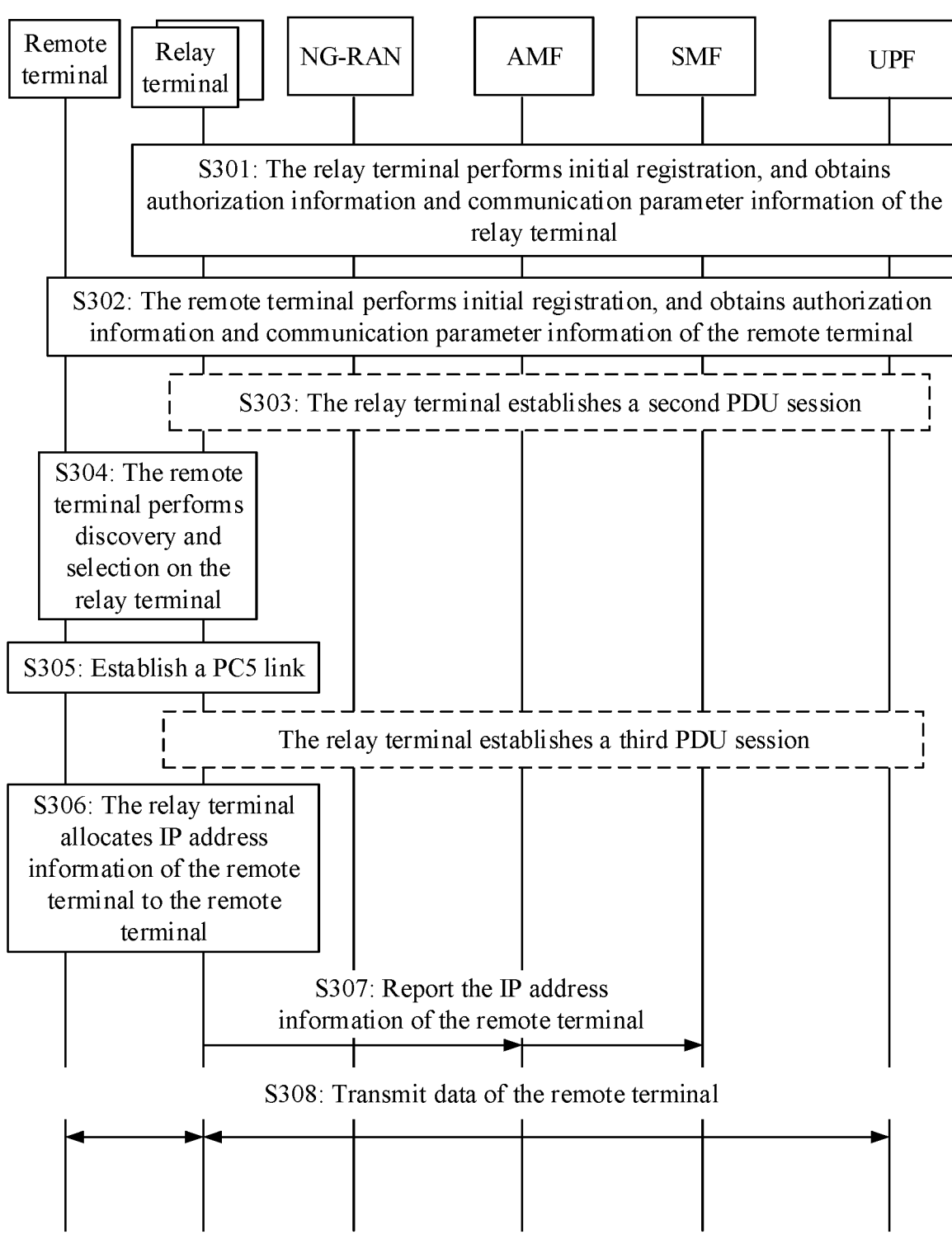
FIG. 3 is a schematic flowchart of establishing a connection in a second layer-3 relay mode in a U2N relay scenario.

Scenario 1:

The following describes, by using the application scenarios in FIG. 1*a* and FIG. 1*c* as examples, connection establishment procedures between a remote terminal and a relay terminal in different relay modes. FIG. 2 shows a connection establishment procedure in a layer-2 relay mode, and FIG. 3 shows a connection establishment procedure in a second layer-3 relay mode.

As shown in FIG. 2, the connection establishment procedure in the layer-2 relay mode is provided.

S201: The remote terminal and the relay terminal are initially registered with a network.

When the remote terminal can be directly connected to the network, the remote terminal may also complete initial registration with the network. Alternatively, when the remote terminal is not directly connected to the network, the remote terminal cannot be registered. In this scenario, registration may be completed by using S2010.

The relay terminal completes initial registration with the network.

S202: The remote terminal and the relay terminal obtain authorization information.

The relay terminal obtains authorization information of the relay terminal from a PCF (a PCF responsible for providing a policy for the relay terminal during registration of the relay terminal) corresponding to the relay terminal, where the authorization information includes information about that the relay terminal is authorized to serve as a relay terminal or can perform indirect communication.

When the remote terminal can be directly connected to the network, the remote terminal may obtain authorization information of the remote terminal from a PCF that is responsible for providing a policy for the remote terminal during registration of the remote terminal, where the authorization information includes information about that the remote terminal is authorized to serve as a remote terminal or can perform indirect communication.

In a scenario in which the remote terminal is not registered with the network, the remote terminal may determine, based on pre-configured authorization information, that the remote terminal may serve as a remote terminal.

S203: Relay terminal discovery and selection procedure.

In the step, the relay terminal and the remote terminal may discover each other.

Discovering each other means that the relay terminal and the remote terminal need to first know existence of each other. For example, the relay terminal (or the remote terminal) sends a broadcast message, where the broadcast message may indicate information about the relay terminal (or the remote terminal). After receiving the broadcast message, other UE may return a message to the relay terminal (or the remote terminal). For example, the remote terminal (or the relay terminal) returns the message to the relay terminal (or the remote terminal), so that a discovery process between the relay terminal and the remote terminal is completed. Alternatively, the relay terminal (or the remote terminal) sends a broadcast message, to search for UE that meets a condition (where for example, the broadcast message may indicate one or more services, and UE that can support the service is the UE that meets the condition). After receiving the broadcast message, if other UE can meet the condition, the other UE may return a message to the relay terminal (or the remote terminal). For example, the remote terminal (or the relay terminal) returns the message to the relay terminal (or the remote terminal), so that a discovery process between the relay terminal and the remote terminal is completed.

Alternatively, the relay terminal and the remote terminal may complete discovery or mutual discover and connection establishment by performing S204, or may not perform S203. Therefore, S203 is an optional step, and is represented by using dashed lines in FIG. 2. For example, the remote terminal sends a direct connection request message, where the direct connection request message is, for example, a broadcast message. In addition to requesting to establish a connection to a peer device, the direct connection request message may further request a relay service. In this case, after receiving the direct connection request message, UE that can provide the relay service may send a response message to the relay terminal. For example, the remote terminal sends the response message to the relay terminal, so that mutual discovery of the relay terminal and the remote terminal is completed.

After a mutual discovery procedure between the relay terminal and the remote terminal is performed, the remote terminal discovers one or more relay terminals, and the remote terminal performs selection from the relay terminals. Specifically, the remote terminal may perform selection based on signal strength between the relay terminal and the remote terminal.

S204: The remote terminal sends a direct communication request message to the relay terminal.

The remote terminal initiates the direct communication request message to the relay terminal, to request to establish a PC5 link with the relay terminal.

Correspondingly, the relay terminal receives the direct communication request message from the remote terminal.

In addition, the direct communication request message may further include relay indication information. The relay indication information is used to request the relay terminal to serve as a relay device of the remote terminal, or indicates that the PC5 link is used by the relay terminal to provide the relay service for the remote terminal, or indicates that the PC5 link is used for indirect communication.

The relay terminal may configure a layer 2 identifier for the remote terminal based on the direct communication request message, to establish the PC5 link between the relay terminal and the remote terminal. Alternatively, the relay terminal sends a service request to a network device, to request the network device to configure configuration information of the PC5 link for the remote terminal, for example, a layer 2 identifier of the remote terminal on the PC5 link.

Optionally, if the relay terminal is in an RRC idle state, the relay terminal needs to enter an RRC connected state based on a communication process of the relay service. For example, the relay terminal may send a service request message to a core network device (for example, an AMF), to enter the RRC connected state. However, if the relay terminal is in an RRC connected state, the relay terminal does not need to send a service request message to a core network device (for example, an AMF). This is represented by using dashed lines in FIG. 2.

S205: The relay terminal returns a direct communication response message.

After step 204 and step 205, the remote terminal establishes the PC5 link with the relay terminal. The PC5 link may be used for direct communication between the relay terminal and the remote terminal, and may be further used by the relay terminal to provide the relay service or indirect communication for the remote terminal. It should be noted that in this application, the PC5 link may also be referred to as a PC5 connection. This is not limited in this application.

In 5G D2D communication, the relay terminal and the remote terminal may establish one or more PC5 links, and each piece of UE allocates a PC5 link identifier to each link to identify the PC5 link.

In a relay communication scenario, the PC5 link between the remote terminal and the relay terminal is referred to as a PC5 link used for relay communication. In a scenario of direct communication between UE, the PC5 link between the relay terminal and the remote terminal is referred to as a PC5 link used for direct communication between the relay terminal and the remote terminal.

S206: The remote terminal requests, via the relay terminal, to establish an RRC connection to a RAN.

Specifically, the relay terminal forwards an RRC connection request of the remote terminal based on an access stratum configuration (for example, configuration information of a radio bearer or the layer 2 identifier of the PC5 link established between the remote terminal and the relay terminal).

S207: The remote terminal initiates, via the relay terminal and an access network device, a non-access stratum (NAS) request to the AMF corresponding to the remote terminal.

The AMF corresponding to the remote terminal may be understood as an AMF that is responsible for mobility management of the remote terminal during registration of the remote terminal. When the remote terminal is not initially registered in S201, the NAS message may be an initial registration message. When the remote terminal has been registered in S201, the NAS message may be a service request message. In the service request message, the remote terminal may choose to activate a PDU session.

S208: The remote terminal initiates a PDU session establishment procedure.

The remote terminal initiates a PDU session request to a first core network device via the relay terminal. The first core network device is, for example, the AMF. The AMF may determine to establish a PDU session for the remote terminal. For example, the PDU session is referred to as a first PDU session.

S209: The remote terminal sends data to the network device via the relay terminal.

The relay terminal may forward uplink and downlink data of the remote terminal to the access network device based on the access stratum configuration (for example, the configuration information of the radio bearer or the layer 2 identifier of the PC5 link established between the remote terminal and the relay terminal).

For downlink transmission, when the core network device (for example, a UPF) has a downlink data packet of the remote terminal, the UPF sends the downlink data packet to the access network device, and the access network device sends the downlink data packet to the relay terminal. Therefore, the relay terminal forwards the downlink data to the remote terminal based on the PC5 connection established to the remote terminal.

As shown in FIG. 3, the connection establishment procedure in the second layer-3 relay mode is provided.

S301: The relay terminal is registered with a network, and obtains authorization information of the relay terminal and communication parameter information of the relay terminal.

The relay terminal obtains the authorization information of the relay terminal and the communication parameter information of the relay terminal from a PCF (a PCF that is responsible for providing a policy for the relay terminal during registration of the relay terminal) corresponding to the relay terminal, where the authorization information includes information about that the relay terminal is authorized to perform indirect communication, and the relay terminal is authorized to serve as a relay terminal to provide a relay service for the remote terminal. The communication parameter information may include a PC5 QoS parameter for authorization.

S302: The remote terminal is registered with the network, and obtains authorization information of the remote terminal and communication parameter information of the remote terminal.

When the remote terminal can be directly connected to the network, the remote terminal obtains the authorization information of the remote terminal and the communication parameter information of the remote terminal from a PCF that is responsible for providing a policy for the remote terminal during registration of the remote terminal, where the authorization information includes information about that the remote terminal is authorized to perform indirect communication. In other words, the remote terminal is authorized to serve as a remote terminal to access the network via the relay terminal.

The D2D communication parameter information may include a PC5 QoS parameter for authorization.

S303: The relay terminal establishes a PDU session.

The PDU session may be a PDU session that is used for the relay service and that is established for the relay terminal.

After the PDU session is established, a second core network device (for example, an SMF) may allocate an IP address of the relay terminal to the relay terminal, so that the relay terminal can transmit data between the relay terminal and a core network device (for example, a UPF) via the PDU session.

S304: The relay terminal and the remote terminal perform a relay discovery procedure.

Specifically, the remote terminal may determine, based on an application and according to a UE route selection policy (URSP) that correspond to the data forwarded via the relay terminal, a PDU session parameter corresponding to the application.

The PDU session parameter may include: a data network name (DNN), single network slice selection assistance information (S-NSSAI), or the like.

The remote terminal determines, based on the PDU session parameter corresponding to the application and a correspondence that is between the PDU session parameter and an RSC and that is configured by the PCF for the remote terminal, an RSC corresponding to the application.

The RSC is used to identify the PDU session parameter. For example, when a PDU session parameter corresponding to a first application includes a first DNN and first S-NSSAI, a first RSC may be correspondingly set.

Therefore, when determining to use the PDU session parameter of the first application, the remote terminal may send a discovery message to the relay terminal, where the discovery message may include the first RSC.

After receiving the discovery message, the relay terminal responds to the discovery message Based on whether the relay terminal supports the first RSC. In this case, the remote terminal may determine that data of the first application can be transmitted via the relay terminal.

The relay terminal may determine, based on whether a correspondence that is between the PDU session parameter and an RSC and that is pre-configured by the PCF for the relay terminal includes the first RSC, whether to support the first RSC. For example, when determining to support the first RSC, the relay terminal may send a discovery response message to the remote terminal, where the discovery response message indicates that the relay terminal supports the first RSC. When determining not to support the first RSC, the relay terminal may send a discovery response message to the remote terminal, where the discovery response message indicates that the relay terminal does not support the first RSC. Alternatively, when determining not to support the first RSC, the relay terminal may not respond to the discovery message, to be specific, not send a discovery response message to the remote terminal.

For a process in which the remote terminal discovers the relay terminal, refer to a manner in which the remote terminal sends the discovery message And receives the discovery response message sent by the relay terminal, and further refer to a discovery manner between the remote terminal and the relay terminal in Scenario 1. Details are not described herein again.

S305: The remote terminal establishes a PC5 link with the relay terminal.

For a manner of establishing the PC5 link with the relay terminal by the remote terminal, refer to S204 and S205.

After the remote terminal establishes the PC5 link with the relay terminal, the relay terminal may determine, based on the first RSC, whether a second PDU session can meet a requirement of the PDU session parameter (a PDU session parameter used by the remote terminal for relay) corresponding to the first RSC. When the relay terminal determines that the established second PDU session cannot meet the requirement of the PDU session parameter corresponding to the first RSC, the relay terminal may request, based on the PDU session parameter corresponding to the first RSC, to establish a third PDU session with the network, where the third PDU session is used to transmit the data of the first application for the remote terminal.

S306: The remote terminal obtains IP address information of the remote terminal via the relay terminal.

In some embodiments, the relay terminal may allocate, to the remote terminal, the IP address information of an IP address used to perform relay with the relay terminal. Specifically, the IP address information may include: an IP address of the PC5 link between the remote terminal and the relay terminal. The IP address information may further include: an IP address identifier (for example, IP info) corresponding to data that is of the remote terminal and that is forwarded by the relay terminal to a network device.

For example, the IP address used on the PC5 link between the remote terminal and the relay terminal is IP1. An IP address corresponding to a PDU session (for example, the second PDU session or the third PDU session) of the relay terminal is IP2, and the IP info allocated by the relay terminal to the remote terminal is IP1-1. For example, when the IP address of the relay terminal is an IPv6 address, the IP address information may be an address of an IP prefix that is longer than an IP prefix of the relay terminal. Therefore, the relay terminal may forward the data of the remote terminal to the network device based on the IP address (with an IPv6 prefix longer than the IP prefix of the relay terminal). For another example, when the IP address of the relay terminal is an IPv4 address, the relay terminal specifies a port number (TCP/UDP ports) of the relay terminal for the remote terminal. Therefore, the relay terminal may forward the data of the remote terminal to the network device based on the IPv4 address and the specified port number.

S307: The relay terminal sends the IP address information of the remote terminal to the network device.

In some embodiments, the relay terminal may include the IP address information of the remote terminal and an identifier of the remote terminal in a PDU session modification request message. Therefore, the network device may transmit the data of the remote terminal to the relay terminal based on the IP address information of the remote terminal. For example, the network device may be an AMF or an SMF.

S308: The relay terminal forwards the data of the remote terminal.

For uplink transmission, when sending an uplink data packet, the remote terminal uses, as a source IP address of the uplink data packet, the IP address (for example, IP1) of the PC5 link for communicating with the relay terminal. After receiving the data packet, the relay terminal modifies the source IP address to IP1-1, sends the data packet to the UPF via the PDU session (for example, the third PDU session) corresponding to the relay terminal, and then sends the data packet to an application server. The relay terminal may transmit data of the relay terminal with the network device by using the second PDU session, and a corresponding IP address is IP2.

For downlink transmission, after receiving a data packet whose destination IP address is IP1-1 from the UPF, the relay terminal determines that the data packet is a data packet of the remote terminal. Therefore, the relay terminal may modify the destination IP address to IP1, and send the data packet to the remote terminal through the PC5 link established with the remote terminal.

In the layer-3 relay mode, because the relay terminal forwards the data of the remote terminal based on the IP address, if the data of the remote terminal is not encrypted at an application layer, the relay terminal may parse the data of the remote terminal, and security is not high. In addition, the remote terminal transmits data between the remote terminal and the application server via the PDU session of the relay terminal. If the relay terminal changes, or the remote terminal can be directly connected to the network as the terminal moves, the remote terminal needs to re-establish a connection to the application server. Consequently, a service needs to be first interrupted and then connected, and service continuity is affected.

Figure 4:
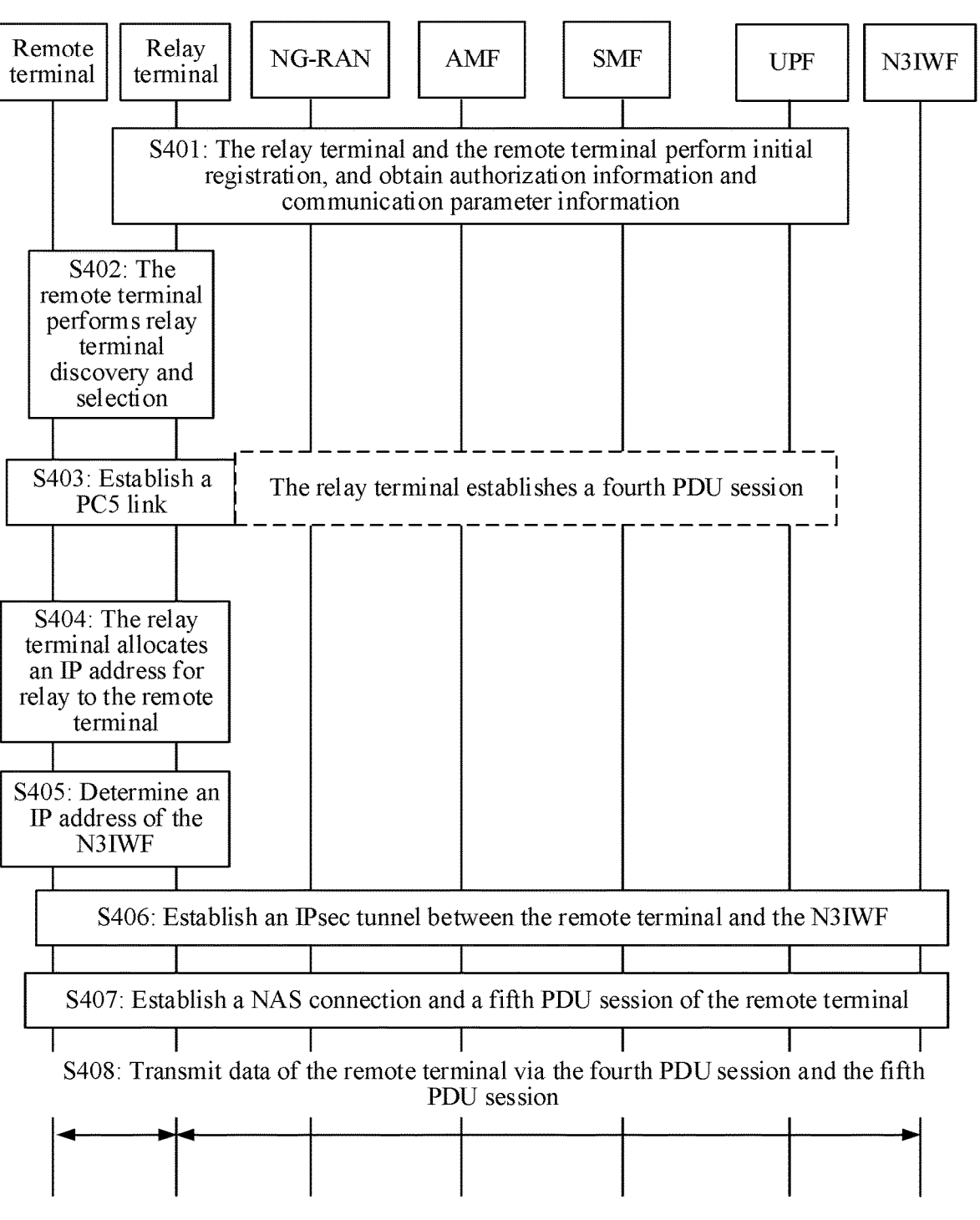
FIG. 4 is a schematic flowchart of establishing a connection in a first layer-3 relay mode in a U2N relay scenario.

In the application scenarios of FIG. 1b and FIG. 1c, as shown in FIG. 4, a connection establishment procedure in a first layer-3 relay mode is provided.

S401: The remote terminal and the relay terminal each are registered with a network, and obtain authorization information and communication parameter information.

For a manner in which the relay terminal is registered with the network, and obtains the authorization information and the communication parameter information, refer to S301. Details are not described herein again.

S402: Discovery and selection between the remote terminal and the relay terminal.

For the step, refer to S303. Details are not described herein again.

S403: The remote terminal establishes a PC5 communication link with the relay terminal.

Optionally, the relay terminal establishes a fourth PDU session for the remote terminal, where the fourth PDU session is used by the relay terminal to transmit signaling or data for the remote terminal.

For the step, refer to S304. Details are not described herein again.

S404: The relay terminal allocates an IP address for relay to the remote terminal.

For the step, refer to S305. Details are not described herein again.

S405: The remote terminal determines an IP address of an N3IWF based on the N3IWF selected for access.

In a possible implementation, the remote terminal may determine, based on identification information of the N3IWF, the IP address of the N3IWF selected for access. The identification information of the N3IWF may be a fully qualified domain name (Fully Qualified Domain Name, FQDN) or an IP address of the N3IWF in an HPLMN.

S406: The remote terminal establishes an IPsec tunnel with the N3IWF by using the PC5 link between the remote terminal and the relay terminal and the fourth PDU session of the relay terminal.

The remote terminal completes an IPsec tunnel establishment process through the N3IWF selected for access.

S407: The remote terminal initiates a NAS registration procedure and a PDU session establishment procedure through the IPsec tunnel.

After the IPsec tunnel is established, the remote terminal and the N3IWF may transmit the signaling of the remote terminal in an encryption manner by using an IPsec tunneling protocol layer. For example, NAS signaling in procedures such as the NAS registration procedure and the PDU session establishment procedure may be transmitted between the remote terminal and the N3IWF through the IPsec tunnel.

The remote terminal first connects to the N3IWF of the remote terminal by using the fourth PDU session of the relay terminal, and then accesses the network by using a fifth PDU session established by the N3IWF.

The remote terminal establishes the fifth PDU session through the N3IWF.

S408: The remote terminal sends the data to a network device through the IPsec tunnel.

The remote terminal and the N3IWF transmit the signaling and the data of the remote terminal in the encryption manner by using the IPsec tunneling protocol layer, so that the relay terminal cannot decrypt the transmitted data of the remote terminal. In addition, regardless of whether the remote terminal performs indirect communication (via relay) or direct communication, the fifth PDU session established by the N3IWF may be used to make a UPF corresponding to the fifth PDU session of the remote terminal remain unchanged. In other words, mutual switching between indirect communication and direct communication may be implemented via the fifth PDU session established by the N3IWF, to maintain service continuity. Security and service continuity problems in the layer-3 relay mode may be resolved.

Figure 5:
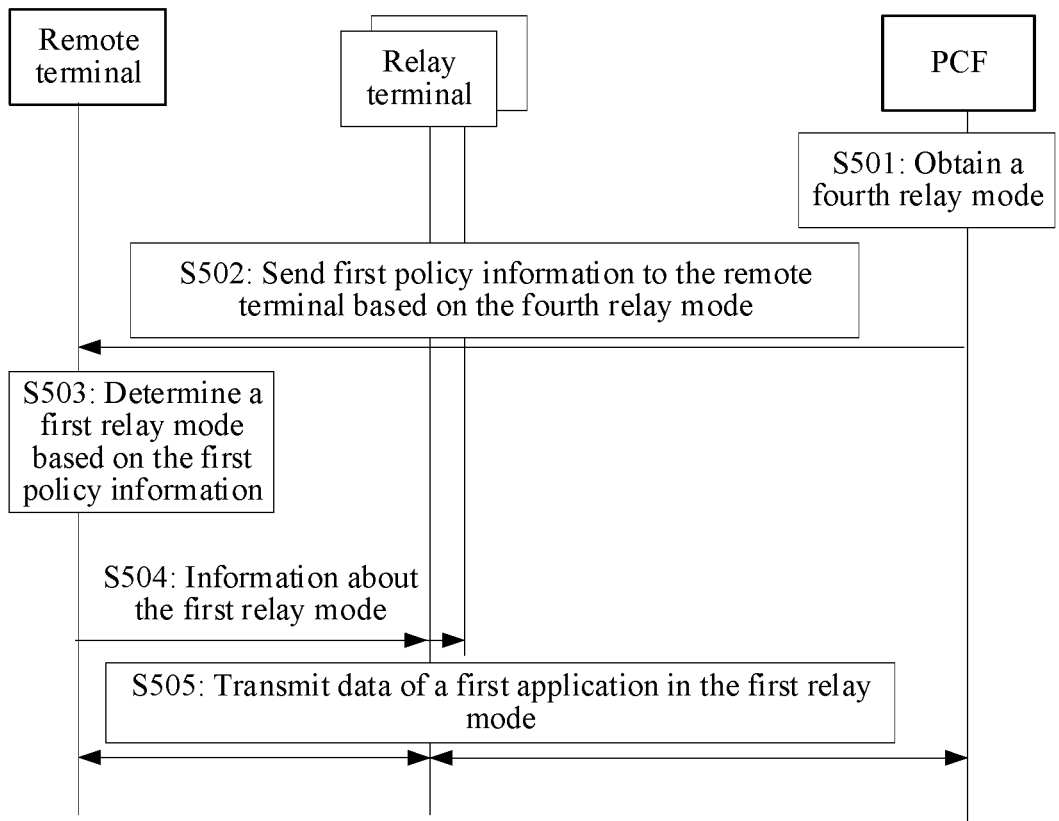
FIG. 5 is a schematic flowchart of a communication method in a U2N relay scenario according to an embodiment of this application.

It is considered that different relay modes have different features and may be suitable for different scenarios. As shown in FIG. 5, an embodiment of this application provides a communication method. That the method is applied to the communication system architectures shown in FIG. 1a to FIG. 1c is used as an example. For example, the method is performed by a network device, a relay terminal, and a remote terminal. The network device may include an access network device and a core network device. For example, the core network device may include a PCF, a UDM, and an AMF. In the method shown in FIG. 5, the PCF sends first policy information for relay mode selection to the remote terminal, and the remote terminal determines the relay mode.

It should be noted that in description processes of FIG. 5 to FIG. 8, the communication method provided in this embodiment of this application is described by using Case 2 in which a layer-2 relay mode, a first layer-3 relay mode, and a second layer-3 relay mode coexist. For a case in which fewer relay modes coexist, for example, a case in which the layer-2 relay mode and the first layer-3 relay mode coexist, a case in which the layer-2 relay mode and the second layer-3 relay mode coexist, or a case in which the first layer-3 relay mode and the second layer-3 relay mode coexist, refer to an implementation, in FIG. 9, of Case 1 in which the relay mode includes the layer-2 relay mode and the layer-3 relay mode.

S501: The PCF obtains a fourth relay mode.

The fourth relay mode may include at least one of the following: a relay mode corresponding to a first application, a relay mode supported by the remote terminal, or a relay mode authorized by the remote terminal.

The first application may be an application corresponding to to-be-transmitted data of the remote terminal.

In S501, the PCF may obtain the relay mode corresponding to the first application. In some embodiments, the PCF may determine, based on a relay mode and a service feature of the first application, the relay mode corresponding to the first application. In some other embodiments, the PCF may alternatively receive, through another core network device, the relay mode corresponding to the first application. For example, the UDM determines, based on a relay mode and a service feature of the first application, the relay mode corresponding to the first application. After determining the relay mode corresponding to the first application, the UDM sends, to the PCF, the relay mode corresponding to the first application.

In S501, the PCF may further obtain the relay mode supported by the remote terminal or the relay mode authorized by the remote terminal.

For example, a NAS message sent by the remote terminal to the AMF includes the relay mode supported by the remote terminal, and the AMF forwards, to the PCF, the relay mode supported by the remote terminal. The NAS message may be a registration request message. The AMF may forward, to the PCF by using a UE policy control create request message, the relay mode supported by the remote terminal.

For another example, when the remote terminal accesses a network, the PCF obtains authorization information of the remote terminal from a UDR.

Specifically, the PCF obtains the authorization information of the remote terminal from the UDR by using a data management query procedure. The authorization information may include related information about that the terminal is authorized to serve as a remote terminal, and may further include a relay mode authorized to be used by the terminal, for example, a layer-2 relay mode authorized to be used by the terminal or a layer-3 relay mode authorized to be used by the terminal. For another example, the relay mode may alternatively be a first layer-3 relay mode authorized to be used by the terminal or a second layer-3 relay mode authorized to be used by the terminal. Certainly, the relay mode authorized to be used may alternatively be a plurality of relay modes in the relay mode. This is not limited herein. Therefore, the UDR may determine, based on the authorization information of the remote terminal, the relay mode authorized by the remote terminal. After determining the relay mode authorized by the remote terminal, the UDR may send, to the PCF, the relay mode authorized by the remote terminal, so that the PCF obtains the relay mode authorized by the remote terminal.

S502: The PCF sends the first policy information to the remote terminal based on the fourth relay mode.

The first policy information may include: a relay mode corresponding to a first application of the remote terminal.

The relay mode corresponding to the first application of the remote terminal is used by the remote terminal to transmit data of the first application.

For example, the PCF sends the first policy information to the remote terminal by using a UE configuration update procedure. Specifically, the PCF includes the first policy information in a UE policy container, and sends the UE policy container to the AMF via an N1 N2 message transfer message. Then, the AMF sends the UE policy container to the remote terminal via the NAS message.

S503: The remote terminal determines a first relay mode based on the first policy information.

The remote terminal may determine, based on a current requirement for transmitting the data of the first application, to select the first relay mode. For example, when an application layer of the remote terminal has a data transmission requirement of the first application, the application layer requests a network layer of the remote terminal to determine the first relay mode.

S504: The relay terminal obtains information about the first relay mode.

To ensure that both the remote terminal and the relay terminal can transmit the data of the first application in the first relay mode, the remote terminal may enable the relay terminal to obtain the information about the first relay mode in a discovery process or a PC5 link establishment process between the remote terminal and the relay terminal. Specifically, the remote terminal sends a discovery message or a direct communication request message to the relay terminal, where the message includes the information about the first relay mode. Optionally, it may be further determined, in the discovery process or the PC5 link establishment process, that the relay terminal supports transmitting the data of the first application in the first relay mode.

S505: The remote terminal transmits the data of the first application in the first relay mode.

Correspondingly, the relay terminal transmits the data of the first application for the remote terminal in the first relay mode.

For example, the first relay mode is the layer-2 relay mode. A PC5 link is established between the remote terminal and the relay terminal (as shown in S204 and S205 in FIG. 2). The remote terminal initiates an RRC connection via the relay terminal (as shown in S206 to S209 in FIG. 2), and performs subsequent steps, to transmit the data of the first application based on the layer-2 relay mode.

For example, the first relay mode is the second layer-3 relay mode. A PC5 link is established between the remote terminal and the relay terminal (as shown in S305 in FIG. 3). The remote terminal and the relay terminal perform IP allocation (as shown in S306 in FIG. 3), and perform subsequent steps, to transmit the data of the first application based on the second layer-3 relay mode. In this case, a second PDU session or a third PDU session established by the relay terminal may be determined based on a PDU session parameter determined by using an RSC corresponding to the first relay mode, in other words, is determined based on a PDU session parameter corresponding to the first application.

For example, the first relay mode is the first layer-3 relay mode. A PC5 link is established between the remote terminal and the relay terminal (as shown in S403 in FIG. 4). The remote terminal and the relay terminal perform IP allocation (as shown in S404 in FIG. 3), and perform subsequent steps, to transmit the data of the first application based on the second layer-3 relay mode. In this case, a fourth PDU session established by the relay terminal may be determined based on a PDU session parameter determined by using an RSC corresponding to the first relay mode, in other words, is determined based on a PDU session parameter corresponding to the first application.

According to the foregoing method, the PCF sends the first policy information for relay mode selection to the remote terminal. The remote terminal determines the first relay mode based on the first policy information, and the relay terminal determines, based on the obtained information about the first relay mode, whether to support the first relay mode, so that the network controls or recommends relay modes selected by the remote terminal for different applications, to meet requirements of different applications and enable collaboration between different relay modes.

The following uses a specific example to describe a manner of determining the relay mode corresponding to the first application in S501.

For example, when the first application has a security requirement, it may be determined, based on Table 1, that the relay mode corresponding to the first application may include at least one of the following: the layer-2 relay mode or the first layer-3 relay mode. The first layer-3 relay mode may be a layer-3 relay mode with an N3IWF. For another example, when the first application has a high QoS requirement, the relay mode corresponding to the first application may include at least one of the following: the layer-2 relay mode or the second layer-3 relay mode. The second layer-3 relay mode is a layer-3 relay mode without an N3IWF. For example, when the first application has a service continuity requirement, the relay mode corresponding to the first application may include at least one of the following: the layer-2 relay mode or the first layer-3 relay mode.

For another example, when the first application has a security requirement and a high QoS requirement, the relay mode corresponding to the first application may be the layer-2 relay mode. When the first application has a security requirement and a high service continuity requirement, the relay mode corresponding to the first application may include at least one of the following: the layer-2 relay mode or the first layer-3 relay mode.

Optionally, the PCF may further determine, based on requirements of the first application for different performance, a priority of the relay mode corresponding to the first application. For example, when the first application has a higher requirement on security, and has a lower requirement on high QoS, the relay mode corresponding to the first application may be set to include: the layer-2 relay mode and the first layer-3 relay mode, where a priority of the layer-2 relay mode is higher than a priority of the first layer-3 relay mode.

The following uses a specific example to describe a manner of determining the relay mode supported by the remote terminal in S501.

Specifically, the remote terminal may determine, based on a capability of the remote terminal, the relay mode supported by the remote terminal. In a possible implementation, considering that different relay modes have different complexity, the remote terminal may determine, based on the processing capability of the remote terminal, the relay mode that can be supported. For example, when the processing capability of the remote terminal is low, it may be determined that the relay mode supported by the remote terminal is the layer-2 relay mode. For example, when the processing capability of the remote terminal is high, it may be determined that the relay mode supported by the remote terminal includes at least one of the following: the layer-2 relay mode, the first layer-3 relay mode, or the second layer-3 relay mode.

In another possible implementation, the remote terminal may further determine, based on a setting of a protocol stack of the remote terminal, the relay mode supported by the remote terminal. For example, when the remote terminal supports an adaptation layer or the protocol stack supports layer 2 forwarding, it may be determined that the remote terminal supports the layer-2 relay mode. For example, when the remote terminal does not support the adaptation layer but supports IP routing, it may be determined that the remote terminal supports the first layer-3 relay mode or the second layer-3 relay mode. For example, when the remote terminal supports establishment of an IPsec tunnel on a PC5 protocol stack, it may be determined that the remote terminal supports the first layer-3 relay mode.

The following uses a specific example to describe a manner in which the PCF determines the relay mode corresponding to the first application of the terminal in S502.

In some embodiments, when determining, based on the authorization information of the remote terminal, for example, whether the remote terminal is authorized to serve as a remote terminal, that the remote terminal is not authorized to serve as a remote terminal, the PCF may determine not to send, to the remote terminal, the relay mode corresponding to the first application of the terminal. When determining that the remote terminal is authorized to serve as a remote terminal, the PCF may send, to the remote terminal, the relay mode corresponding to the first application of the terminal.

In some other embodiments, when the fourth relay mode includes a plurality of relay modes in the relay mode corresponding to the first application, the relay mode supported by the remote terminal, or the relay mode authorized by the remote terminal, the PCF may determine the first policy information based on one or more relay modes in the relay mode corresponding to the first application, the relay mode supported by the remote terminal, or the relay mode authorized by the remote terminal.

In a possible implementation, the relay mode corresponding to the first application of the remote terminal may include: at least one of the layer-2 relay mode or the layer-3 relay mode; or at least one of the layer-2 relay mode, the first layer-3 relay mode, or the second layer-3 relay mode.

Specifically, the PCF may send the first policy information to the remote terminal in a manner of determining whether to distinguish between the first layer-3 relay mode and the second layer-3 relay mode. When the PCF distinguishes between the first layer-3 relay mode and the second layer-3 relay mode (Case 2-1), the relay mode corresponding to the first application of the remote terminal may include: at least one of the layer-2 relay mode, the first layer-3 relay mode, or the second layer-3 relay mode. When the PCF does not distinguish between the first layer-3 relay mode and the second layer-3 relay mode (Case 2-2), the relay mode corresponding to the first application of the remote terminal includes: at least one of the layer-2 relay mode or the layer-3 relay mode.

The following uses an example in which the PCF distinguishes between the first layer-3 relay mode and the second layer-3 relay mode (Case 2-1) for description. For Case 2-2 in which the first layer-3 relay mode and the second layer-3 relay mode are not distinguished, refer to Case 2-1 in which the first layer-3 relay mode and the second layer-3 relay mode are distinguished. Details are not described herein again.

In a possible implementation, when the fourth relay mode includes the relay mode corresponding to the first application, the relay mode supported by the remote terminal, and the relay mode authorized by the remote terminal, the PCF may filter, based on the relay mode supported by the remote terminal and the relay mode authorized by the remote terminal, a plurality of relay modes included in the relay mode corresponding to the first application, to determine the relay mode corresponding to the first application of the remote terminal.

For example, the relay mode corresponding to the first application includes: the layer-2 relay mode or the first layer-3 relay mode. The relay mode supported by the remote terminal includes: the layer-2 relay mode, the first layer-3 relay mode, or the second layer-3 relay mode. The relay mode authorized by the remote terminal includes: the layer-2 relay mode or the second layer-3 relay mode. In this case, it may be determined that the relay mode corresponding to the first application of the remote terminal includes the layer-2 relay mode.

In another possible implementation, the PCF may filter, based on the relay mode supported by the remote terminal or the relay mode authorized by the remote terminal, a plurality of relay modes included in the relay mode corresponding to the first application, to obtain the relay mode included in the first policy information.

For example, the relay mode corresponding to the first application includes: the layer-2 relay mode or the first layer-3 relay mode. The relay mode supported by the remote terminal includes: the layer-2 relay mode, the first layer-3 relay mode, or the second layer-3 relay mode. In this case, it may be determined that the relay mode corresponding to the first application of the remote terminal includes: the layer-2 relay mode or the first layer-3 relay mode.

For another example, the relay mode corresponding to the first application includes: the layer-2 relay mode, the first layer-3 relay mode, or the second layer-3 relay mode. The relay mode authorized by the remote terminal includes: the layer-2 relay mode or the second layer-3 relay mode. In this case, it may be determined that the relay mode corresponding to the first application of the remote terminal includes: the layer-2 relay mode or the second layer-3 relay mode.

Therefore, according to the foregoing method, the PCF may determine the first policy information based on the relay mode corresponding to the first application of the remote terminal. The first policy information may indicate the relay mode corresponding to the first application of the remote terminal, and the relay mode corresponding to the first application of the remote terminal is used by the remote terminal to transmit the data of the first application.

Optionally, when the relay mode corresponding to the first application of the remote terminal includes a plurality of relay modes, the PCF may further determine a priority of a corresponding relay mode. For a specific method for determining a priority of the relay mode corresponding to the first application of the remote terminal, refer to the foregoing method for determining the priority of the relay mode corresponding to the first application. For example, the priority of the relay mode corresponding to the first application of the remote terminal may be determined based on the priority of the relay mode corresponding to the first application, or may be determined in another manner. Details are not described herein again.

The following uses Manner A1 to Manner A3 as examples to describe a manner in which the first policy information carries the relay mode corresponding to the first application of the remote terminal.

Manner A1: The relay mode corresponding to the first application of the remote terminal may be represented as: an identifier of the first application and an identifier of the relay mode corresponding to the first application of the remote terminal.

For example, when the relay mode corresponding to the first application of the remote terminal is the layer-2 relay mode, the relay mode corresponding to the first application of the remote terminal may be represented as: the identifier of the first application and an identifier of the layer-2 relay mode.

The identifier of the relay mode may be a newly set identifier of the relay mode. For example, the newly set identifier may be used for the layer-2 relay mode, to indicate that the identifier is the layer-2 relay mode.

Alternatively, the identifier of the relay mode may be an identifier related to reusing an existing relay mode. For example, in the layer-3 relay mode, the PCF needs to send a correspondence between an RSC and a PDU session parameter to the remote terminal. Therefore, a corresponding RSC may be carried in the first policy information and sent to the remote terminal, to indicate that the relay mode corresponding to the first application of the remote terminal includes a relay mode corresponding to the RSC. For example, if a PDU session parameter corresponding to the RSC is used to establish the first layer-3 relay mode, the relay mode indicated by the RSC is the first layer-3 relay mode. For another example, if a PDU session parameter corresponding to the RSC is used to establish the second layer-3 relay mode, the relay mode indicated by the RSC is the second layer-3 relay mode.

Manner A2: The relay mode corresponding to the first application of the remote terminal may be represented as: a correspondence between the first application and the relay mode.

Optionally, the correspondence between the first application and the relay mode in the first policy information may alternatively be a correspondence obtained after performing filtering based on the relay mode supported or the relay mode authorized by the remote terminal.

For another example, the relay mode corresponding to the first application of the remote terminal may be represented as: a correspondence between the first application and a relay mode of the remote terminal.

For example, when the relay mode corresponding to the first application of the remote terminal includes the layer-2 relay mode and the first layer-3 relay mode, the relay mode corresponding to the first application of the remote terminal may be represented as: a correspondence between the first application and the layer-2 relay mode, and a correspondence between the first application and the first layer-3 relay mode.

For another example, the relay mode corresponding to the first application of the remote terminal may be represented as: a correspondence between the first application and the relay mode. Optionally, the first policy information may further include: a relay mode allowed to be used by the remote terminal or a relay mode authorized to be used by the remote terminal.

For example, it is determined that the relay mode of the first application includes: the layer-2 relay mode, the first layer-3 relay mode, or the second layer-3 relay mode. The relay mode supported or authorized by the remote terminal includes: the layer-2 relay mode and the first layer-3 relay mode. It may be determined that the relay mode allowed (or authorized) to be used by the remote terminal includes: an identifier (including an identifier of the layer-2 relay mode and an identifier of the first layer-3 relay mode) of the relay mode corresponding to the remote terminal.

In this case, the relay mode corresponding to the first application of the remote terminal may be represented as: an identifier (for example, including the identifier of the layer-2 relay mode, the identifier of the first layer-3 relay mode, and an identifier of the second layer-3 relay mode) of the relay mode corresponding to the first application, and a correspondence (for example, including the layer-2 relay mode and the first layer-3 relay mode) between the remote terminal and the relay mode.

Therefore, the remote terminal may determine the relay mode of the first application of the remote terminal based on the relay mode allowed (or authorized) to be used by the remote terminal and the correspondence that is between the first application and the relay mode and that is included in the first policy information.

For example, when the relay mode corresponding to the first application includes the layer-2 relay mode, the second layer-3 relay mode, and the first layer-3 relay mode, and the relay mode corresponding to the first application of the remote terminal includes the layer-2 relay mode and the first layer-3 relay mode, the relay mode corresponding to the first application of the remote terminal may be represented as: a correspondence between the first application, the layer-2 relay mode, the second layer-3 relay mode, and the first layer-3 relay mode and a correspondence between the remote terminal, the layer-2 relay mode, and the first layer-3 relay mode. Therefore, it may be determined that the relay mode corresponding to the first application of the remote terminal includes the layer-2 relay mode and the first layer-3 relay mode.

Manner A3: The relay mode corresponding to the first application of the remote terminal may be represented as: a correspondence between the first application and an RSC and a correspondence between an RSC and the relay mode.

Optionally, the first policy information may further include: a relay mode allowed to be used by the remote terminal or a relay mode authorized to be used by the remote terminal.

For another example, the relay mode corresponding to the first application of the remote terminal may be represented as: a correspondence between the first application and an RSC and a correspondence between an RSC and the relay mode. Optionally, the correspondence between the first application and an RSC may alternatively be a correspondence obtained after performing filtering based on the relay mode supported or the relay mode authorized by the remote terminal.

For another example, the relay mode corresponding to the first application of the remote terminal may be represented as: a correspondence between the first application and an RSC and a correspondence between an RSC and the relay mode. Optionally, the first policy information may further include: a relay mode allowed to be used by the remote terminal or a relay mode authorized to be used by the remote terminal. Therefore, the remote terminal may determine the relay mode of the first application of the remote terminal based on the relay mode allowed (or authorized) to be used by the remote terminal and the correspondence between the first application and an RSC and the correspondence between an RSC and the relay mode that are included in the first policy information.

Considering that in the layer-2 relay mode, there is no correspondence between an RSC and the PDU session parameter, an RSC may be separately set for the layer-2 relay mode, and the RSC may indicate only a correspondence between the RSC and the corresponding layer-2 relay mode. In the layer-3 relay mode, there is a correspondence between an RSC in the layer-3 relay mode and the PDU session parameter. Therefore, the RSC, in the layer-3 relay mode, that has a correspondence with the PDU session parameter may be reused. For example, if a PDU session parameter corresponding to an RSC 1 is used to establish the first layer-3 relay mode, the RSC 1 indicates a correspondence between the RSC 1 and the first layer-3 relay mode. For another example, if a PDU session parameter corresponding to an RSC 2 is used to establish the second layer-3 relay mode, the RSC 2 indicates a correspondence between the RSC 2 and the second layer-3 relay mode.

For example, when the relay mode corresponding to the first application of the remote terminal includes the layer-2 relay mode and the first layer-3 relay mode, the relay mode corresponding to the first application of the remote terminal may be represented as: a correspondence between the first application and a first RSC and a correspondence between a first RSC and the layer-2 relay mode; or a correspondence between the first application and a second RSC and a correspondence between a second RSC and the first layer-3 relay mode.

Optionally, it is considered that when the relay mode corresponding to the first application of the remote terminal includes a plurality of relay modes, the first policy information may further include the priority of the relay mode corresponding to the first application of the remote terminal.

Optionally, the first policy information may further include the correspondence between an RSC and the PDU session parameter.

The following uses an example to describe a manner in which the remote terminal determines the first relay mode based on the first policy information in S503.

With reference to Case 2-1, when different layer-3 relay modes are considered to be not distinguished, the first relay mode may be: the layer-2 relay mode or the layer-3 relay mode. With reference to Case 2-2, when different layer-3 relay modes are considered to be distinguished, the first relay mode may be: the layer-2 relay mode, the first layer-3 relay mode, or the second layer-3 relay mode.

In a possible implementation, the remote terminal may determine the first relay mode based on the relay mode corresponding to the first application of the remote terminal in the first policy information.

For example, when the relay mode corresponding to the first application of the remote terminal includes one relay mode, the relay mode corresponding to the first application of the remote terminal may be determined as the first relay mode. When the relay mode corresponding to the first application of the remote terminal includes a plurality of relay modes, one of the relay modes may be selected as the first relay mode based on a requirement of the remote terminal.

In a possible implementation, the remote terminal determines, based on a capability of the remote terminal, the first relay mode in the relay mode supported by the remote terminal and the first policy information.

For example, before the remote terminal receives the first policy information, if the remote terminal does not send the relay mode supported by the remote terminal, the remote terminal determines, based on the capability of the remote terminal, the first relay mode in the relay mode supported by the remote terminal and the first policy information. Alternatively, when the remote terminal determines that a relay mode not supported by the remote terminal exists in the relay mode corresponding to the first application of the remote terminal included in the first policy information, the remote terminal may determine, based on the capability of the remote terminal, the first relay mode in the relay mode supported by the remote terminal and the first policy information.

It should be noted that before the remote terminal receives the first policy information, if the remote terminal has sent the relay mode supported by the remote terminal, the remote terminal may determine the first relay mode based on the first policy information.

In another possible implementation, the remote terminal may further determine the first relay mode based on a priority of the relay mode corresponding to the first application of the remote terminal. For example, the remote terminal selects a relay mode with a highest priority.

The following uses Manner B1 and Manner B2 as examples to describe a manner in which the remote terminal determines the information about the first relay mode in S504. Considering that implementations of Manner B1 and Manner B2 are also different in different scenarios, the following uses Scenario (1) and Scenario (2) as examples.

Scenario (1): No RSC is correspondingly set for the layer-2 relay mode.

Manner B1: When the first relay mode is the layer-2 relay mode, the information about the first relay mode includes no RSC. Therefore, it is implicitly indicated that the first relay mode is the layer-2 relay mode. When the first relay mode is a relay mode other than the layer-2 relay mode, the information about the first relay mode includes: an RSC corresponding to the first relay mode.

For example, when the first relay mode is the first layer-3 relay mode or the second layer-3 relay mode, the information about the first relay mode may include the RSC.

The RSC may be an RSC correspondingly indicating a PDU session parameter used for the first layer-3 relay mode, or may be an RSC correspondingly indicating a PDU session parameter used for the second layer-3 relay mode.

In this case, the remote terminal may determine the RSC based on the PDU session parameter corresponding to the first application and the correspondence between an RSC and the PDU session parameter, and use the RSC as the information about the first relay mode to indicate the first relay mode. The first relay mode is determined based on the relay mode that is of the first application corresponding to the remote terminal and that is carried in the first policy information.

For another example, the RSC may be a corresponding RSC that indicates the first layer-3 relay mode or the second layer-3 relay mode and that is carried in the first policy information. In this case, after determining, based on the RSC carried in the first policy information, to use the first layer-3 relay mode, the remote terminal may determine the corresponding RSC, and determine, based on the RSC, a PDU session parameter corresponding to the RSC.

Manner B2: The information about the first relay mode includes: first indication information indicating the first relay mode.

In a possible implementation, the first indication information may be an identifier of the first relay mode. For example, when the first relay mode is the layer-2 relay mode, the information about the first relay mode is an identifier of the layer-2 relay mode. When the first relay mode is the layer-3 relay mode, the information about the first relay mode is an identifier of the layer-3 relay mode. When the first relay mode is the first layer-3 relay mode, the information about the first relay mode is an identifier of the first layer-3 relay mode. When the first relay mode is the second layer-3 relay mode, the information about the first relay mode is an identifier of the second layer-3 relay mode.

In another possible implementation, the first indication information may be relay capability information of the relay terminal required by the first relay mode. For example, when the first relay mode is the layer-2 relay mode, the first indication information may be layer-2 relay capability information of the relay terminal, for example, a layer 2 forwarding capability. When the first relay mode is the layer-3 relay mode, the first indication information may be layer-3 relay capability information of the relay terminal, for example, an IP layer forwarding capability. When the first relay mode is the first layer-3 relay mode, the first indication information may be first layer-3 relay capability information of the relay terminal. When the first relay mode is the second layer-3 relay mode, the first indication information may be second layer-3 relay capability information of the relay terminal.

Scenario (2): An RSC is correspondingly set for the layer-2 relay mode.

In this case, the information about the first relay mode may be determined in Manner B1 or Manner B2.

For example, Manner B1 is used as an example. The information about the first relay mode includes: an RSC corresponding to the first relay mode.

In this case, after determining the first relay mode, the remote terminal may determine the information about the first relay mode based on the RSC carried in the first policy information. Alternatively, after determining the first relay mode, for example, determining that the first relay mode is the layer-3 relay mode, the first layer-3 relay mode, or the second layer-3 relay mode, the remote terminal may further determine the RSC based on the PDU session parameter corresponding to the first application and the correspondence between an RSC and the PDU session parameter, and use the RSC as the information about the first relay mode to indicate the first relay mode.

For example, when the first relay mode is the layer-2 relay mode, the information about the first relay mode may include the RSC corresponding to the layer-2 relay mode. When the first relay mode is the first layer-3 relay mode, the information about the first relay mode includes: an RSC corresponding to the first layer-3 relay mode. When the first relay mode is the second layer-3 relay mode, the information about the first relay mode includes: an RSC corresponding to the second layer-3 relay mode. When the first relay mode is the layer-3 relay mode, the information about the first relay mode includes: an RSC corresponding to the layer-3 relay mode.

Manner B2 is used as an example. The information about the first relay mode includes: first indication information indicating the first relay mode. For a specific manner, refer to Scenario (1). Details are not described herein again.

The following uses Manner C1 and Manner C2 as examples to describe a manner in which the relay terminal obtains the information about the first relay mode in S504.

Manner C1: The relay terminal receives a first message from the remote terminal.

The first message includes the information about the first relay mode. The first message may be a discovery message or a direct communication request message. For a manner in which the remote terminal sends the discovery message to the relay terminal, refer to the discovery processes performed by the remote terminal and the relay terminal in FIG. 2, FIG. 3, and FIG. 4. For a manner in which the remote terminal sends the direct communication request message to the relay terminal, refer to the processes in which the remote terminal establishes the PC5 link with the relay terminal in FIG. 2, FIG. 3, and FIG. 4. Details are not described herein again.

With reference to Scenario (1) and Scenario (2), when the first relay mode is the layer-3 relay mode, the first message includes information about the layer-3 relay mode. For example, the first message includes first indication information corresponding to the layer-3 relay mode, or the first message includes an RSC corresponding to the layer-3 relay mode.

With reference to Scenario (1) and Scenario (2), when the first relay mode is the first layer-3 relay mode, the first message includes information about the first layer-3 relay mode. For example, the first message includes first indication information corresponding to the first layer-3 relay mode, or the first message includes an RSC corresponding to the first layer-3 relay mode.

With reference to Scenario (1) and Scenario (2), when the first relay mode is the second layer-3 relay mode, the first message includes information about the second layer-3 relay mode. For example, the first message includes first indication information corresponding to the second layer-3 relay mode, or the first message includes an RSC corresponding to the second layer-3 relay mode.

With reference to Scenario (2) and Manner B2 in Scenario (1), when the first relay mode is the layer-2 relay mode, the first message includes information about the layer-2 relay mode. For example, the first message includes first indication information corresponding to the layer-2 relay mode, or the first message includes an RSC corresponding to the layer-2 relay mode.

Manner C2: The relay terminal receives a second message from the remote terminal, where the second message includes no RSC.

With reference to Manner B1 in Scenario (1), when the first relay mode is the layer-2 relay mode, the second message is a discovery message or a direct communication request message. In this case, the relay terminal may determine, based on the second message, that the first relay mode is the layer-2 relay mode.

In a possible implementation, the relay terminal may further determine, based on the obtained information about the first relay mode, whether to support the first relay mode. The following uses Manner D1 and Manner D2 as examples to describe a manner in which the relay terminal determines whether to support the first relay mode.

Manner D1: The relay terminal determines, based on a relay mode supported by the relay terminal, whether to support the first relay mode.

For example, the relay terminal may determine, based on a capability of the relay terminal, whether to support the first relay mode, or the relay terminal may further determine, based on authorization information obtained by the relay terminal in a registration process, whether to support the first relay mode. For example, the relay terminal may determine, based on whether the relay terminal is authorized to serve as a relay terminal in the authorization information, or whether the relay terminal is authorized to serve as a first relay mode, whether to support the first relay mode.

Manner D2: The relay terminal obtains second policy information, and determines, based on the second policy information, whether to support the first relay mode. Specifically, the following step 1 and step 2 may be included.

Step 1: The PCF obtains a fifth relay mode.

The fifth relay mode includes at least one of the following: a relay mode supported by the relay terminal, or a relay mode authorized by the relay terminal.

In a possible implementation, the PCF receives, from the relay terminal, the relay mode supported by the relay terminal.

For example, the relay terminal sends a NAS message to the AMF, where the NAS message carries the relay mode supported by the relay terminal, and the AMF forwards, to the PCF, the relay mode supported by the relay terminal. The NAS message may be a registration request message. In this case, the PCF may obtain the fifth relay mode or one relay mode in the fifth relay mode based on the relay mode supported by the relay terminal.

In another possible implementation, the PCF receives, from the UDR, the relay mode authorized by the relay terminal. In this case, the PCF may obtain the fifth relay mode or one relay mode in the fifth relay mode based on the relay mode authorized by the relay terminal.

Step 2: The PCF sends the second policy information to the relay terminal based on the fifth relay mode.

The second policy information includes a relay mode of the relay terminal.

For example, the PCF sends the second policy information to the relay terminal by using a UE configuration update procedure. Specifically, the PCF includes the second policy information in a UE policy container, and sends the UE policy container to the AMF via an N1 N2 message transfer message. Then, the AMF sends the UE policy container to the relay terminal via the NAS message.

In Case 2-2 in which the first layer-3 relay mode and the second layer-3 relay mode are not distinguished, the relay mode of the relay terminal may include: at least one of the layer-2 relay mode or the layer-3 relay mode. In Case 2-1 in which the first layer-3 relay mode and the second layer-3 relay mode are distinguished, the relay mode of the relay terminal may include: at least one of the layer-2 relay mode, the first layer-3 relay mode, or the second layer-3 relay mode.

The following uses Case 2-1 in which the first layer-3 relay mode and the second layer-3 relay mode are distinguished for description. For Case 2-2 in which the first layer-3 relay mode and the second layer-3 relay mode are not distinguished, refer to Case 2-1 in which the first layer-3 relay mode and the second layer-3 relay mode are distinguished. Details are not described herein again.

In a possible implementation, the PCF determines the relay mode of the relay terminal based on the relay mode supported by the relay terminal and/or the relay mode authorized by the relay terminal.

For example, the PCF determines the relay mode of the relay terminal based on the relay mode supported by the relay terminal. For example, the relay mode supported by the relay terminal includes: the layer-2 relay mode, the first layer-3 relay mode, or the second layer-3 relay mode. In this case, it may be determined that the relay mode of the relay terminal includes: the layer-2 relay mode, the first layer-3 relay mode, or the second layer-3 relay mode.

For another example, the PCF determines the relay mode of the relay terminal based on the relay mode authorized by the relay terminal. For example, the relay mode authorized by the relay terminal includes: the layer-2 relay mode, the first layer-3 relay mode, or the second layer-3 relay mode. In this case, it may be determined that the relay mode of the relay terminal includes: the layer-2 relay mode, the first layer-3 relay mode, or the second layer-3 relay mode.

For another example, the PCF determines the relay mode of the relay terminal based on the relay mode supported by the relay terminal and the relay mode authorized by the relay terminal. For example, the relay mode supported by the relay terminal includes: the layer-2 relay mode, the first layer-3 relay mode, or the second layer-3 relay mode. The relay mode authorized by the relay terminal includes: the layer-2 relay mode or the second layer-3 relay mode. In this case, it may be determined that the relay mode of the relay terminal includes: the layer-2 relay mode or the second layer-3 relay mode.

Optionally, when the relay mode of the relay terminal includes a plurality of relay modes, the PCF may further determine a priority of a corresponding relay mode, so that the relay terminal can determine, based on the priority of the relay mode, whether to support the first relay mode.

In a possible implementation, the relay terminal may determine, based on whether a relay mode that is of the relay terminal and whose priority is higher than a preset threshold is the first relay mode, whether to support the first relay mode. When a relay mode, with a high priority, of the relay terminal is the first relay mode, it is determined that the first relay mode is supported.

The preset threshold may be determined based on a capability or a power consumption requirement of the relay terminal, or may be determined based on a relay connection case between the relay terminal and the remote terminal. For example, when the relay terminal does not establish a relay with any remote terminal, a lower preset threshold may be set. When the relay terminal establishes a relay with at least one remote terminal, a higher preset threshold may be set. This is not limited herein.

For a specific method for determining the priority of the relay mode of the relay terminal, refer to the foregoing method for determining the priority of the relay mode corresponding to the first application. For example, the priority of the relay mode of the relay terminal may be determined based on a priority of an authorized mode and a priority of the supported relay mode. For example, the priority of the authorized mode is higher than the priority of the supported relay mode. Alternatively, the priority of the relay mode of the relay terminal may be determined in another manner. Details are not described herein again. In this case, the second policy information may further include: the priority of the relay mode of the relay terminal.

The following uses Manner E1 and Manner E2 as examples to describe a manner in which the second policy information carries the relay mode of the relay terminal.

Manner E1: The relay mode of the relay terminal may be represented as: an identifier of the relay mode of the relay terminal.

For example, when the relay mode of the relay terminal is the layer-2 relay mode, the second policy information includes: an identifier of the layer-2 relay mode.

Manner E2: The relay mode of the relay terminal may be represented as: a correspondence between the relay mode of the relay terminal and an RSC.

For example, when the relay mode of the relay terminal is the layer-2 relay mode, the relay mode of the relay terminal may be represented as: an RSC indicating the layer-2 relay mode, where the RSC correspondingly indicates the layer-2 relay mode.

For another example, when the relay mode of the relay terminal is the first layer-3 relay mode, the relay mode of the relay terminal may be represented as: an RSC indicating the first layer-3 relay mode, where the RSC correspondingly indicates the first layer-3 relay mode. Optionally, the RSC may further indicate a PDU session parameter corresponding to the first layer-3 relay mode. This is not limited herein.

Correspondingly, the relay terminal obtains the second policy information.

In a possible implementation, the second policy information is determined after considering the relay mode supported by the relay terminal or the relay mode authorized by the relay terminal. In this case, the relay terminal may determine, based on whether the obtained second policy information includes the first relay mode, whether to support the first relay mode.

For example, the relay terminal determines, based on the obtained second policy information, that the relay mode of the relay terminal in the second policy information includes the layer-2 relay mode and the first layer-3 relay mode. In this case, when the first relay mode is the layer-2 relay mode, it may be determined that the relay terminal supports the first relay mode.

In another possible implementation, the relay terminal may determine, based on the relay mode supported by the relay terminal and based on whether the obtained second policy information includes the first relay mode, whether to support the first relay mode.

For example, the relay terminal determines, based on the obtained second policy information, that the relay mode of the relay terminal in the second policy information includes the layer-2 relay mode and the first layer-3 relay mode. The relay terminal determines that the relay mode supported by the relay terminal includes: the first layer-3 relay mode and the second layer-3 relay mode. In this case, when the first relay mode is the first layer-3 relay mode, it may be determined that the relay terminal supports the first relay mode.

With reference to Manner C1, when determining to support the first relay mode, the relay terminal may further send a first response message to the remote terminal, where the first response message is a response to a first message, the first response message includes second indication information, and the second indication information indicates that the relay terminal supports the first relay mode.

For example, when the first message is a discovery message, the first response message is a discovery response message. When the first message is a direct communication request message, the first response message is a direct communication response message.

With reference to Manner C2, when determining to support the first relay mode, the relay terminal may further send a second response message to the remote terminal, where the second response message is a response to a second message, the second response message includes second indication information, and the second indication information indicates that the relay terminal supports the first relay mode.

For example, when the second message is a discovery message, a response message for the second message is a discovery response message. When the second message is a direct communication request message, a response message for the second message is a direct communication response message.

In addition, before receiving the first message or the second message, the relay terminal may further receive, from the remote terminal, a third message that includes another relay mode (which may be referred to as a seventh relay mode). Further, the relay terminal may determine that the relay terminal does not support the seventh relay mode, and send a response message to the remote terminal, to indicate that the relay terminal does not support the seventh relay mode. Alternatively, the relay terminal may not respond to the message when determining not to determine the seventh relay mode, to implicitly indicate that the relay terminal does not support the seventh relay mode. For details of the manner, refer to the descriptions of the seventh relay mode in Scenario 2.

Figure 6:
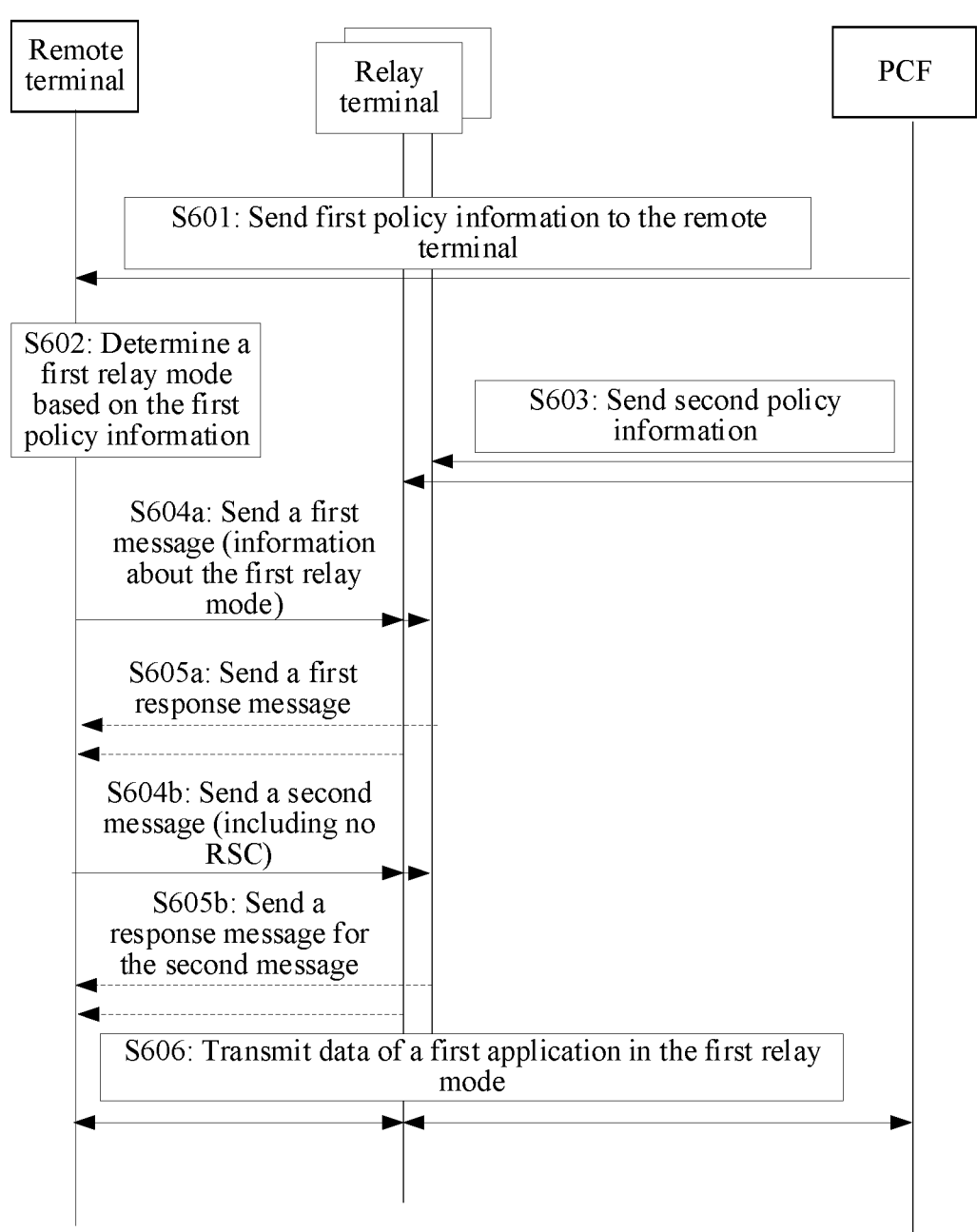
FIG. 6 is a schematic flowchart of a communication method in a U2N relay scenario according to an embodiment of this application.

The following uses a specific example to describe a specific implementation (Scenario (1) in which no RSC is correspondingly set for the layer-2 relay mode and Case 2-1 in which the layer-2 relay mode, the first layer-3 relay mode, and the second layer-3 relay mode coexist) of the foregoing embodiment. As shown in FIG. 6, this application provides a communication method, including the following steps.

S601: A PCF sends first policy information to a remote terminal.

In a possible implementation, the PCF may carry the first policy information in a NAS message sent by an AMF to the remote terminal.

For example, the PCF sends the first policy information to the remote terminal by using a UE configuration update procedure. For details, refer to S502.

Optionally, before the PCF sends the first policy information, the remote terminal may further send, to the PCF through the AMF, a relay mode supported by the remote terminal or a relay capability (for example, whether supporting a layer-2 relay mode or a layer-3 relay mode) of the remote terminal. For example, the NAS message sent by the remote terminal to the AMF includes the relay mode supported by the remote terminal, and the AMF forwards, to the PCF, the relay mode supported by the remote terminal. The NAS message may be a registration request message. The AMF may forward, to the PCF by using a UE policy control create request message, the relay mode supported by the remote terminal. Therefore, the PCF may determine the first policy information based on the relay mode supported by the remote terminal. For a specific manner of determining the first policy information, refer to S501 and S502. Details are not described herein again.

The first policy information indicates a relay mode of a first application of the remote terminal, and the relay mode of the first application of the remote terminal may include at least one of the following: the layer-2 relay mode, a first layer-3 relay mode, or a second layer-3 relay mode.

Optionally, the first policy information may further include: a priority of the relay mode of the first application of the remote terminal.

Optionally, the first policy information may further include a correspondence between an RSC and a PDU session parameter.

Specifically, for a manner in which the first policy information includes the layer-2 relay mode, the first layer-3 relay mode, or the second layer-3 relay mode, refer to Manner A1 and Manner A2. Details are not described herein again.

S602: The remote terminal determines a first relay mode based on the first policy information.

The first relay mode is: the layer-2 relay mode, the first layer-3 relay mode, or the second layer-3 relay mode.

For a specific manner in which the remote terminal determines the first relay mode based on the first policy information, refer to S503.

S603: The PCF sends second policy information to a relay terminal.

In a possible implementation, the PCF may send the second policy information to the relay terminal through the AMF after the relay terminal is registered with a network. For example, the PCF may send the second policy information to the relay terminal by using the UE configuration update procedure. For details, refer to a manner in which the PCF sends the second policy information to the relay terminal in Manner D2.

Optionally, before the PCF sends the second policy information, the relay terminal may further send, to the PCF through the AMF, a relay mode supported by the relay terminal or a relay capability (for example, whether supporting layer-2 relay or layer-3 relay) of the relay terminal. Therefore, the PCF may determine the second policy information based on the relay mode supported by the relay terminal. For example, a NAS message sent by the relay terminal to the AMF includes the relay mode supported by the relay terminal, and the AMF forwards, to the PCF, the relay mode supported by the relay terminal. The NAS message may be a registration request message. The AMF may forward, to the PCF by using the UE policy control create request message, the relay mode supported by the relay terminal. For a specific manner of determining the second policy information, refer to a manner in which the relay terminal obtains the second policy information in Manner D2. Details are not described herein again.

The second policy information may include a relay mode of the relay terminal. The relay mode of the relay terminal is at least one of the following: the layer-2 relay mode, the first layer-3 relay mode, or the second layer-3 relay mode.

For a manner in which the second policy information may include the relay mode of the relay terminal, refer to E1 and E2. Details are not described herein again.

Optionally, the second policy information may further include: a priority of the relay mode of the relay terminal. Optionally, the second policy information may further include the correspondence between an RSC and a PDU session parameter.

S604a: The remote terminal sends a first message.

The first message includes information about the first relay mode.

For example, when the first relay mode is the first layer-3 relay mode or the second layer-3 relay mode, the first message of the remote terminal includes an RSC, and the RSC corresponds to the first layer-3 relay mode or the second layer-3 relay mode. The first message may be a discovery message or a direct communication request message.

Optionally, the first message carries a requirement for a first layer-3 relay capability or a second layer-3 relay capability. For example, the first message carries first indication information, and the first indication information indicates a request for determining whether the relay terminal supports the first layer-3 relay capability or the second layer-3 relay capability.

S604b: The remote terminal sends a second message.

The second message includes no RSC.

The second message of the remote terminal includes no RSC.

For example, when the first relay mode is the layer-2 relay mode, the second message is sent, where the second message may be a discovery message or a direct communication request message.

S605a: The relay terminal sends a first response message to the remote terminal.

The relay terminal may determine whether to support the first layer-3 relay mode or the second layer-3 relay mode.

In a possible implementation, the relay terminal determines, based on the second policy information, whether to support the first layer-3 relay mode or the second layer-3 relay mode.

In another possible implementation, the relay terminal determines, based on the second policy information and a capability of the relay terminal, whether to support the first layer-3 relay mode or the second layer-3 relay mode.

In still another possible implementation, the relay terminal determines, based on the first indication information in the first message and a capability of the relay terminal, whether to support the first layer-3 relay mode or the second layer-3 relay mode.

It should be noted that, that the relay terminal sends the first response message may be optional. For example, when the first message is a discovery message, the first response message is a discovery response message. When the first message is a direct communication request message, the first response message is a direct communication response message. For a specific implementation, refer to Manner C1 and S504.

S605b: The relay terminal sends a response message for the second message to the remote terminal.

The relay terminal may determine whether to support the layer-2 relay mode.

In a possible implementation, the relay terminal determines, based on the second policy information, whether to support the layer-2 relay mode.

In another possible implementation, the relay terminal determines, based on the second policy information and the capability of the relay terminal, whether to support the layer-2 relay mode.

In still another possible implementation, the relay terminal determines, based on the first indication information in the first message and the capability of the relay terminal, whether to support the layer-2 relay mode.

It should be noted that, that the relay terminal sends the response message for the second message may be optional. For example, when the second message is a discovery message, the response message is a discovery response message. When the second message is a direct communication request message, the response message is the direct communication response message. For a specific implementation, refer to Manner C2 and S504.

Optionally, the relay terminal responds to a relay discovery request only when the relay terminal supports the layer-2 relay mode.

S606: The remote terminal transmits data of the first application in the first relay mode.

Correspondingly, the relay terminal transmits the data of the first application for the remote terminal in the first relay mode.

For details, refer to S505. Details are not described herein again.

According to the foregoing method, the PCF sends the first policy information for relay mode selection to the remote terminal, and the PCF may further send the second policy information for relay mode selection to the relay terminal. The remote terminal determines the first relay mode based on the first policy information, and the relay terminal determines, based on the second policy information, whether to support the first relay mode, so that the network controls or recommends relay modes selected by the remote terminal for different applications, to meet requirements of different applications and enable collaboration between different relay modes.

Figure 7:
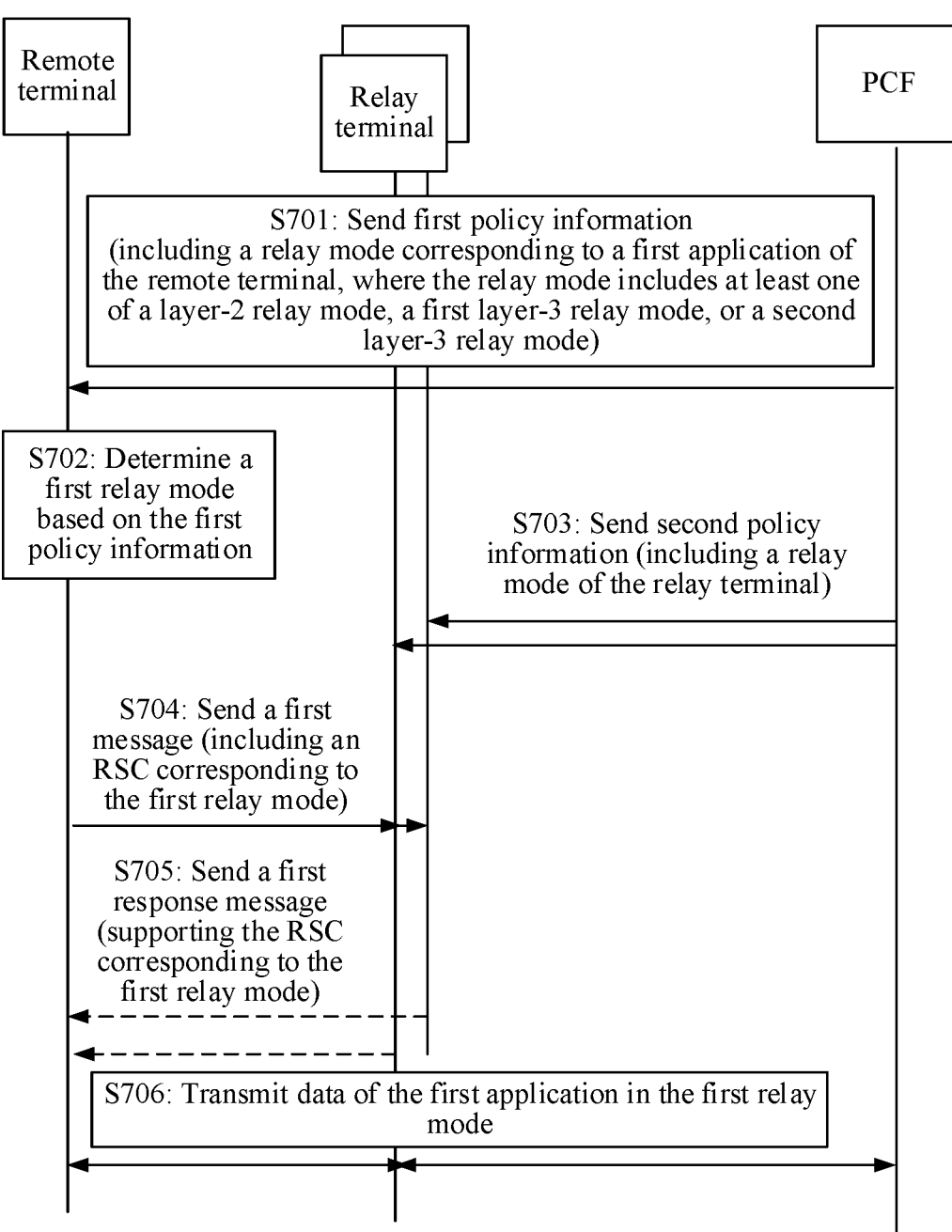
FIG. 7 is a schematic flowchart of a communication method in a U2N relay scenario according to an embodiment of this application.

The following uses a specific example to describe a specific implementation of the foregoing embodiment. Scenario (2) (in which the first policy information may further include an RSC corresponding to the layer-2 relay mode) and Case 2-1 are used as examples. In this case, the information about the first relay mode may include the RSC corresponding to the layer-2 relay mode. As shown in FIG. 7, this application provides a communication method, including the following steps.

S701: A PCF sends first policy information to a remote terminal.

The first policy information may indicate a relay mode of a first application of the remote terminal, and the relay mode of the first application of the remote terminal may include at least one of the following: a layer-2 relay mode, a first layer-3 relay mode, or a second layer-3 relay mode. For details, refer to S501 and S502. For example, the PCF sends the first policy information to the remote terminal by using a UE configuration update procedure.

For a manner of indicating the relay mode of the first application of the remote terminal, refer to an implementation of Case 2-1 in Manner A1 and Manner A2. Details are not described herein again. For example, the first policy information may include: an RSC corresponding to the relay mode of the first application of the remote terminal.

S702: The remote terminal determines a first relay mode based on the first policy information.

The first relay mode may include at least one of the following: the layer-2 relay mode, the first layer-3 relay mode, or the second layer-3 relay mode.

In a specific implementation process, for a manner in which the remote terminal determines the first relay mode based on the first policy information, refer to S503.

S703: The PCF sends second policy information to a relay terminal.

For a manner in which the second policy information may include a relay mode of the relay terminal, refer to E1 and E2. Details are not described herein again. For example, the second policy information may include: an RSC corresponding to the relay mode of the relay terminal.

For a manner in which the PCF sends the second policy information to the relay terminal, refer to S603. For example, the PCF may send the second policy information to the relay terminal by using the UE configuration update procedure.

S704: The remote terminal sends a first message.

The first message includes information about the first relay mode. For example, the first message includes an RSC corresponding to the first relay mode. For a specific implementation, refer to Manner B1 and Manner B2 in Scenario (2). Details are not described herein again.

S705: The relay terminal determines whether to support the first relay mode.

In a possible implementation, the relay terminal determines, based on an RSC in the second policy information, whether to support the RSC.

In another possible implementation, after determining, based on an RSC in the second policy information, whether to support the RSC, the relay terminal may further determine, based on a relay capability of the relay terminal, whether to support the relay mode corresponding to the RSC.

In still another possible implementation, the relay terminal determines, based on first indication information in the first message and a capability of the relay terminal, whether to support the first relay mode.

Optionally, the relay terminal sends a first response message. For a specific implementation, refer to Manner C1 and S504. For example, when the first message is a discovery message, the first response message is a discovery response message. When the first message is a direct communication request message, the first response message is a direct communication response message.

S706: The remote terminal transmits data of the first application in the first relay mode.

Correspondingly, the relay terminal transmits the data of the first application for the remote terminal in the first relay mode.

For details, refer to S505. Details are not described herein again.

According to the foregoing method, the PCF sends the first policy information for relay mode selection to the remote terminal, and the PCF may further send the second policy information for relay mode selection to the relay terminal. The remote terminal determines the first relay mode based on the first policy information, and the relay terminal determines, based on the second policy information, whether to support the first relay mode, so that a network controls or recommends relay modes selected by the remote terminal for different applications, to meet requirements of different applications and enable collaboration between different relay modes. In addition, when different relay modes are indicated, information element consistency can be maintained (where indications are all performed by using the RSC), and signaling overheads can be reduced.

Figure 8:
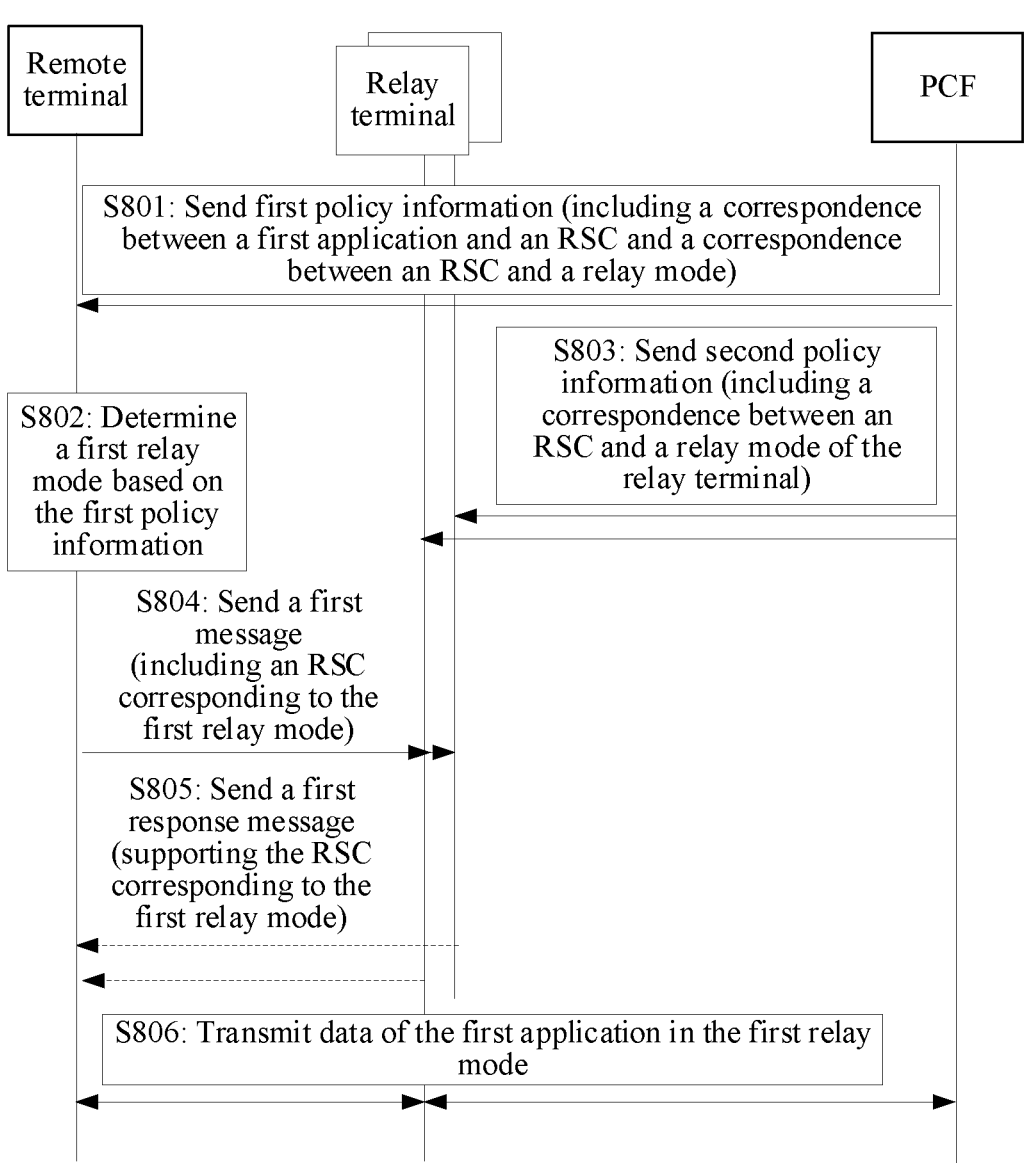
FIG. 8 is a schematic flowchart of a communication method in a U2N relay scenario according to an embodiment of this application.

The following uses a specific example to describe a specific implementation of the foregoing embodiment. A scenario in which there is a correspondence between an application, an RSC, and a relay mode and Case 2-1 are used as examples. In this case, the relay mode corresponding to the first application of the remote terminal in the first policy information may be represented by using a plurality of correspondences. As shown in FIG. 8, this application provides a communication method, including the following steps.

S801: A PCF sends first policy information to a remote terminal.

The first policy information includes: a mapping relationship between a first application and an RSC and a correspondence between an RSC and a relay mode.

The first policy information may indicate a relay mode of a first application of the remote terminal, and the relay mode of the first application of the remote terminal may include at least one of the following: a layer-2 relay mode, a first layer-3 relay mode, or a second layer-3 relay mode. For a manner of indicating the relay mode of the first application of the remote terminal, refer to an implementation in Manner A3. Details are not described herein again. For details, refer to S501 and S502. For example, the PCF sends the first policy information to the remote terminal by using a ULE configuration update procedure.

S802: The remote terminal determines a first relay mode based on the first policy information.

The first relay mode may include at least one of the following: the layer-2 relay mode, the first layer-3 relay mode, or the second layer-3 relay mode. In a specific implementation process, for a manner in which the remote terminal determines the first relay mode based on the first policy information, refer to S503.

For example, the remote terminal determines, based on the first application and the correspondence between a first application and an RSC, an RSC corresponding to the first application, and determines, based on the RSC corresponding to the first application and the correspondence between an RSC and a relay mode, that a relay mode corresponding to the RSC corresponding to the first application is the first relay mode. Optionally, the RSC may be further determined based on a relay capability of the remote terminal and a priority of the RSC, to determine the first relay mode based on the relay mode corresponding to the RSC.

S803: The PCF sends second policy information to a relay terminal.

For a manner in which the second policy information may include a relay mode of the relay terminal, refer to E1 and E2. Details are not described herein again. The second policy information includes: the correspondence between an RSC and a relay mode. Optionally, the second policy information may include: a correspondence between an RSC and a PDU session parameter. For example, the PCF may send the second policy information to the relay terminal by using the UE configuration update procedure. For details, refer to a manner in which the PCF sends the second policy information to the relay terminal in Manner D2.

S804: The remote terminal sends a first message.

The first message includes information about the first relay mode.

For example, the first message may be a discovery message or a direct communication request message. For a specific implementation, refer to Manner B1 and Manner B2 in Scenario (2). Details are not described herein again. For example, the information about the first relay mode is an RSC corresponding to the first relay mode.

S805: The relay terminal determines, based on the first message, whether to support the first relay mode corresponding to the information about the first relay mode.

For example, when the information about the first relay mode is the RSC corresponding to the first relay mode, the relay terminal may determine, based on whether the second policy information includes the RSC, whether to support the RSC.

In another possible implementation, the relay terminal may determine, based on the second policy information, a relay mode (the first relay mode) corresponding to the RSC in the first message, and determine, based on a relay capability of the relay terminal, whether to support the first relay mode.

Optionally, the relay terminal sends a first response message. For a specific implementation, refer to Manner C1 and S504. For example, when the first message is a discovery message, the first response message is a discovery response message. When the first message is a direct communication request message, the first response message is a direct communication response message.

S806: The remote terminal transmits data of the first application in the first relay mode.

Correspondingly, the relay terminal transmits the data of the first application for the remote terminal in the first relay mode.

For details, refer to S505. Details are not described herein again.

According to the foregoing method, the PCF sends the first policy information for relay mode selection to the remote terminal, and the PCF may further send the second policy information for relay mode selection to the relay terminal. The remote terminal determines the first relay mode based on the first policy information, and the relay terminal determines, based on the second policy information, whether to support the first relay mode, so that a network controls or recommends relay modes selected by the remote terminal for different applications, to meet requirements of different applications and enable collaboration between different relay modes. In addition, more layers of correspondences are set in the first policy information, so that the first policy information can be flexibly configured.

Figure 9:
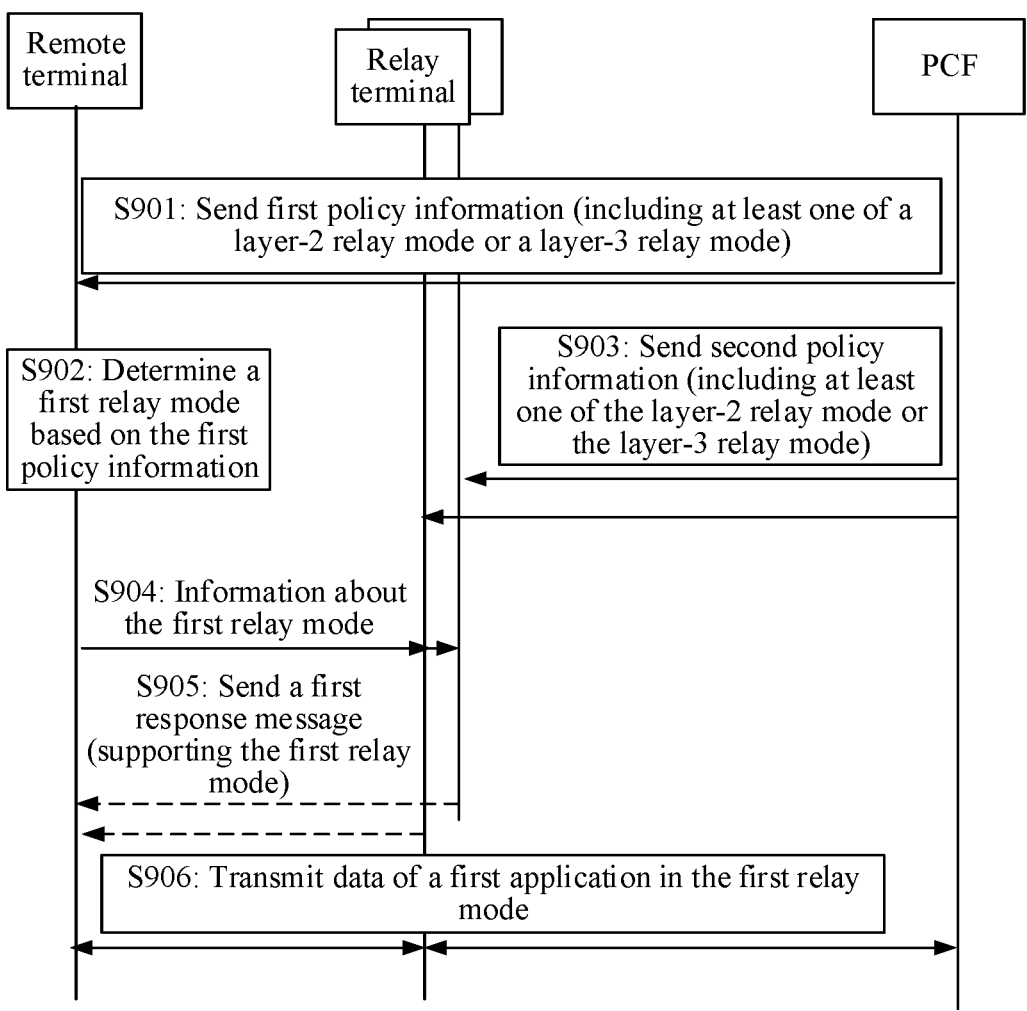
FIG. 9 is a schematic flowchart of a communication method in a U2N relay scenario according to an embodiment of this application.

The following uses a specific example to describe a specific implementation of the foregoing embodiment. Case 1 in which the layer-2 relay mode and the layer-3 relay mode coexist is used as an example. As shown in FIG. 9, this application provides a communication method, including the following steps.

S901: A PCF sends first policy information to a remote terminal.

The first policy information may indicate a relay mode of a first application of the remote terminal, and the relay mode of the first application of the remote terminal may include at least one of the following: a layer-2 relay mode or a layer-3 relay mode. For a manner of indicating the relay mode of the first application of the remote terminal, refer to implementations in Manners A1 to A3. Details are not described herein again. For example, the PCF sends the first policy information to the remote terminal by using a UE configuration update procedure. For details, refer to S501 and S502.

S902: The remote terminal determines a first relay mode based on the first policy information.

The first relay mode may include at least one of the following: the layer-2 relay mode or the layer-3 relay mode. In a specific implementation process, for a manner in which the remote terminal determines the first relay mode based on the first policy information, refer to S503.

S903: The PCF sends second policy information to a relay terminal.

The second policy information may include a relay mode of the relay terminal. The relay mode of the relay terminal is at least one of the following: the layer-2 relay mode or the layer-3 relay mode.

For example, the PCF may send the second policy information to the relay terminal by using the UE configuration update procedure. For details, refer to a manner in which the PCF sends the second policy information to the relay terminal in Manner D2.

S904: The relay terminal obtains information about the first relay mode.

For example, the remote terminal may send a first message. The first message includes the information about the first relay mode. The information about the first relay mode is information about the layer-3 relay mode. Alternatively, the remote terminal may send a second message. The second message includes no RSC, to implicitly indicate information indicating that the first relay mode is the layer-2 relay mode.

For another example, the remote terminal may send a first message. The first message includes the information about the first relay mode. The information about the first relay mode is information about the layer-3 relay mode. Alternatively, the information about the first relay mode is information about the layer-2 relay mode.

For example, the first message may be a discovery message or a direct communication request message. For details, refer to S504.

S905: The relay terminal determines whether to support the first relay mode.

In a possible implementation, the relay terminal determines, based on the relay mode of the relay terminal in the second policy information, whether to support the first relay mode in the first message. In another possible implementation, after determining, based on the second policy information, whether the information about the first relay mode exists, the relay terminal may further determine, based on a relay capability of the relay terminal, whether to support a relay mode corresponding to the information about the first relay mode. In still another possible implementation, the relay terminal determines, based on first indication information in the first message and a capability of the relay terminal, whether to support the first relay mode. Optionally, the relay terminal sends a first response message. For example, when the first message is a discovery message, the first response message is a discovery response message. When the first message is a direct communication request message, the first response message is a direct communication response message. For a specific implementation, refer to Manner C1 in Scenario (2) and S504.

For example, when the first relay mode is the layer-3 relay mode, in a possible implementation, the relay terminal determines, based on the second policy information, whether to support the layer-3 relay mode. In another possible implementation, the relay terminal determines, based on the second policy information and the capability of the relay terminal, whether to support the layer-3 relay mode. Optionally, the relay terminal sends a first response message. For example, when the first message is a discovery message, the first response message is a discovery response message. When the first message is a direct communication request message, the first response message is a direct communication response message. For a specific implementation, refer to Manner C1 in Scenario (1) and S504.

For example, when the first relay mode is the layer-2 relay mode, in a possible implementation, the relay terminal determines, based on the second policy information, whether to support the layer-2 relay mode. In another possible implementation, the relay terminal determines, based on the second policy information and the capability of the relay terminal, whether to support the layer-2 relay mode. In still another possible implementation, the relay terminal determines, based on the first indication information in the first message and the capability of the relay terminal, whether to support the layer-2 relay mode. Optionally, the relay terminal sends a response message for the second message. For example, when the second message is a discovery message, a response message for the second message is a discovery response message. When the second message is a direct communication request message, the response message for the second message is a direct communication response message. For a specific implementation, refer to Manner C2 and S504. Optionally, the relay terminal responds to the second message only after the relay terminal supports the relay mode.

S906: The remote terminal transmits data of the first application in the first relay mode.

Correspondingly, the relay terminal transmits the data of the first application for the remote terminal in the first relay mode.

For details, refer to S505. Details are not described herein again.

According to the foregoing method, a network controls or recommends relay modes selected by the remote terminal for different applications, to meet requirements of different applications and enable collaboration between different relay modes. The first layer-3 relay mode and the second layer-3 relay mode are no longer distinguished, so that the first policy information and the second policy information can be simplified, and signaling overheads can be reduced.

Figure 10:
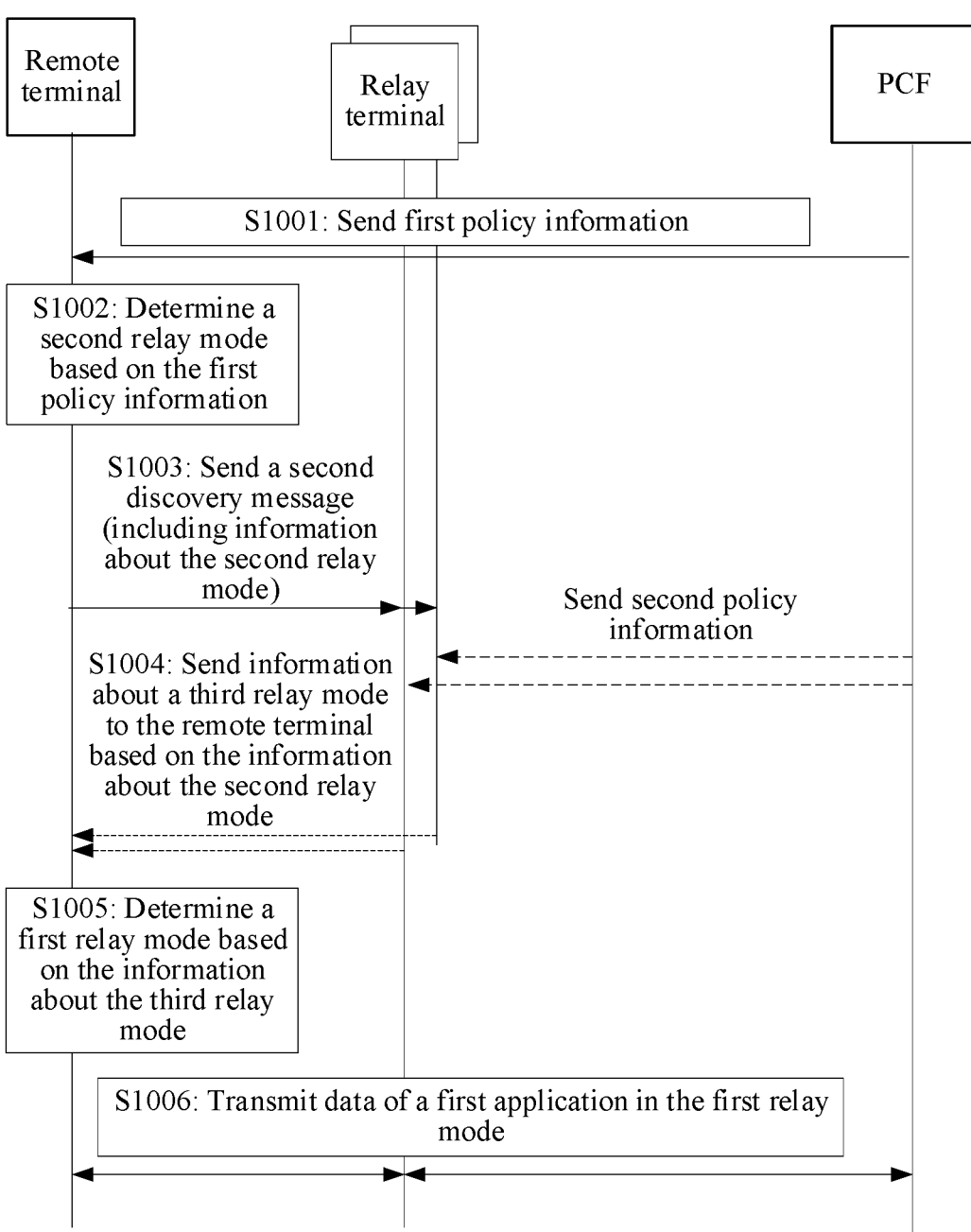
FIG. 10 is a schematic flowchart of a communication method in a U2N relay scenario according to an embodiment of this application.

This application provides a communication method. FIG. 10 is a flowchart of the method. That the method is applied to the communication system architecture shown in FIG. 1a or FIG. 1b or the application scenario shown in FIG. 1c is used as an example. A remote terminal may obtain, by sending a second relay mode, all relay terminals that may support relay modes and the supported relay modes, to increase a success rate of selecting a relay mode by the remote terminal. Compared with Implementation 2, in this implementation, signaling overheads caused by a relay mode determination failure can be reduced.

Figure 11:
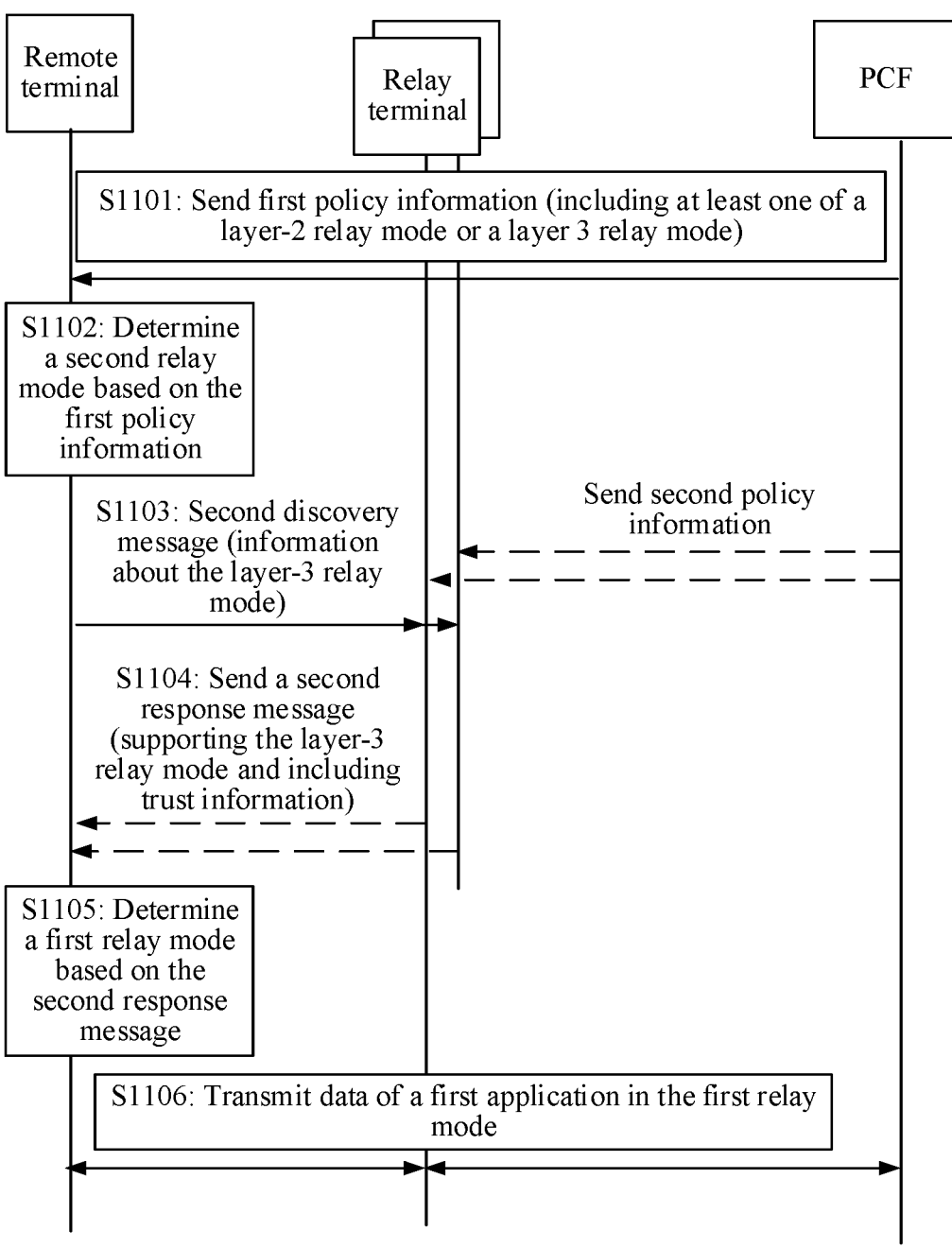
FIG. 11 is a schematic flowchart of a communication method in a U2N relay scenario according to an embodiment of this application.
Figure 12:
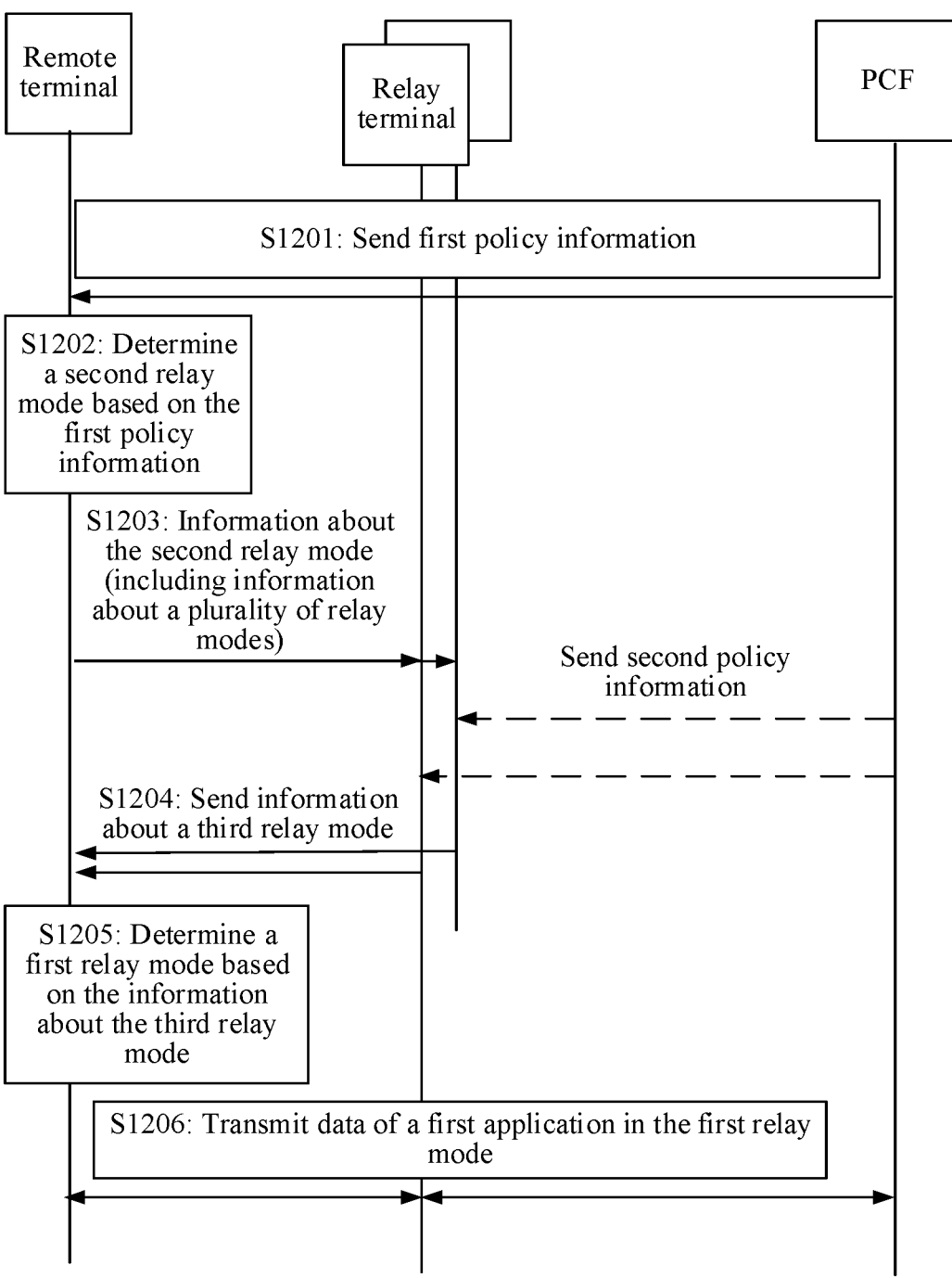
FIG. 12 is a schematic flowchart of a communication method in a U2N relay scenario according to an embodiment of this application.

It should be noted that in description processes of FIG. 10 to FIG. 12, descriptions are provided by using Case 2 in which a layer-2 relay mode, a first layer-3 relay mode, and a second layer-3 relay mode coexist. For a case in which fewer relay modes coexist, for example, a case in which the layer-2 relay mode and the first layer-3 relay mode coexist, a case in which the layer-2 relay mode and the second layer-3 relay mode coexist, or a case in which the first layer-3 relay mode and the second layer-3 relay mode coexist, refer to an implementation of Case 2-2 (to be specific, the relay mode includes the layer-2 relay mode and the layer-3 relay mode), in FIG. 10 to FIG. 12, in which the first layer-3 relay mode and the second layer-3 relay mode are not distinguished. The method includes the following steps.

S1001: A PCF sends first policy information to the remote terminal.

For example, the PCF sends the first policy information to the remote terminal by using a UE configuration update procedure. For a specific implementation, refer to S501 and S502. Details are not described herein again.

S1002: The remote terminal determines the second relay mode based on the first policy information.

In this case, the second relay mode may include one or more relay modes in a relay mode corresponding to a first application of the remote terminal. In other words, the second relay mode includes: at least one of the layer-2 relay mode or the layer-3 relay mode; or at least one of the layer-2 relay mode, the first layer-3 relay mode, or the second layer-3 relay mode.

Therefore, the remote terminal may obtain, by sending the second relay mode, all relay terminals that may support the second relay mode. A case in which after the remote terminal determines a relay mode, a relay terminal that supports the relay mode cannot be obtained, and consequently, the remote terminal needs to update the relay mode, and initiates a relay terminal discovery process again to discover a relay terminal that supports a first relay mode is avoided, thereby helping increase a success rate of selecting an appropriate relay mode.

For a specific manner in which the remote terminal determines the second relay mode, refer to a manner in which the remote terminal determines the first relay mode. A difference between the second relay mode and the first relay mode lies in that the second relay mode may include one or more relay modes. Details are not described herein again.

S1003: The remote terminal sends a second discovery message.

The remote terminal may send the second discovery message in a broadcast manner, or may send the second discovery message in a unicast or multicast manner. This is not limited in this application.

In a possible implementation, the second discovery message includes information about the second relay mode. The information about the second relay mode includes at least one of the following: an RSC corresponding to the second relay mode; or third indication information indicating the second relay mode. Therefore, the relay terminal obtains the information about the second relay mode.

For a specific manner in which the remote terminal determines the information about the second relay mode, refer to a manner in which the remote terminal determines information about the first relay mode. Details are not described herein again.

S1004: The relay terminal sends information about a third relay mode to the remote terminal based on the information about the second relay mode.

The third relay mode includes at least one relay mode in the second relay mode, and the relay terminal supports the third relay mode.

In a possible implementation, the relay terminal may determine, based on the information about the second relay mode, whether to support the second relay mode, to determine the supported second relay mode as the third relay mode. In addition, the relay terminal determines the information about the third relay mode based on the information about the second relay mode corresponding to the supported second relay mode. For example, the information about the second relay mode includes: an RSC corresponding to the layer-2 relay mode. When determining to support the layer-2 relay mode, the relay terminal may use, as the information about the third relay mode, the RSC corresponding to the layer-2 relay mode.

S1005: The remote terminal determines the first relay mode based on the information about the third relay mode.

The remote terminal may determine the third relay mode based on the information about the third relay mode, to determine a relay mode in the third relay mode as the first relay mode, and correspondingly determine a relay terminal corresponding to the first relay mode.

S1006: The remote terminal transmits data of the first application in the first relay mode.

Correspondingly, the relay terminal transmits the data of the first application for the remote terminal in the first relay mode.

For details, refer to S505. Details are not described herein again.

According to the foregoing method, the PCF sends, to the remote terminal, the first policy information for relay mode selection related to the first application. Optionally, the PCF may further send second policy information for relay mode selection to the relay terminal. The remote terminal determines all possible second relay modes based on the first policy information. The remote terminal determines, by using the relay terminal discovery process, a relay terminal that supports at least one relay mode (the third relay mode) in the second relay mode, and determines the first relay mode based on the supported third relay mode. This may avoid a case in which the remote terminal cannot quickly access a network because the first relay mode first determined by the remote terminal may not be supported by a relay terminal, and the relay terminal discovery process needs to be initiated again after the first relay mode is updated. In this implementation, the discovery process needs to be initiated only once, to be specific, the second discovery message needs to be sent once, and a plurality of times of discovery do not need to be performed. This effectively reduces signaling overheads, and effectively improves flexibility of selecting a relay mode by the remote terminal.

In S1002, the remote terminal may determine the second relay mode based on the first policy information in a plurality of manners. The following uses Manner G1 and Manner G2 as examples for description.

Manner G1: With reference to Case 2-2, the second relay mode determined by the remote terminal based on the first policy information may be the first relay mode in FIG. 6 to FIG. 9. In this case, the second relay mode may be a relay mode in the relay mode corresponding to the first application of the remote terminal. For example, when the second relay mode is the layer-3 relay mode, the remote terminal may further determine, based on whether the relay terminal is a trusted terminal, whether the used first relay mode is the first layer-3 relay mode or the second layer-3 relay mode, to transmit the data of the first application.

Manner G2: With reference to Case 1 or Case 2-1, the remote terminal may determine a plurality of relay modes of the first application of the remote terminal based on the first policy information. In this case, the remote terminal may use the plurality of relay modes of the first application of the remote terminal as second relay modes, and determine, by using the relay terminal discovery process, a relay terminal that supports the second relay mode, to select the first relay mode and the relay terminal that supports the first relay mode. This helps the remote terminal discover a better relay terminal, establish a better relay communication link, and improve relay communication performance.

In S1004, the relay terminal may determine the third relay mode in a plurality of manners. The following uses Manner F1 to Manner F3 as examples for description.

Manner F1: The relay terminal determines, based on the information about the second relay mode and a capability of the relay terminal, to support the third relay mode.

Specifically, for a specific manner in which the relay terminal determines, based on the information about the second relay mode and the capability of the relay terminal, to support the third relay mode, refer to a manner of determining to support the first relay mode in Manner D1.

Manner F2: The relay terminal determines, based on the information about the second relay mode and the second policy information, to support the third relay mode.

For a specific manner in which the relay terminal determines, based on the information about the second relay mode and the second policy information, to support the third relay mode, refer to a manner in which the relay terminal determines, based on the information about the first relay mode and the second policy information, to support the first relay mode in Manner D2. Details are not described herein again. For example, the PCF may send the second policy information to the relay terminal by using the UE configuration update procedure.

Manner F3: The relay terminal determines, based on the information about the second relay mode, the second policy information, and a capability of the relay terminal, to support the third relay mode.

For a specific manner in which the relay terminal determines, based on the information about the second relay mode, the second policy information, and the capability of the relay terminal, to support the third relay mode, refer to a manner in which the relay terminal determines, based on the information about the first relay mode, the capability of the relay terminal, and the second policy information, to support the first relay mode in Manner D2. Details are not described herein again.

Optionally, after determining the third relay mode in Manner F1 to Manner F3, the relay terminal may further send a second response message to the remote terminal, where the second response message is a response to the second discovery message, the second response message includes the information about the third relay mode, the third relay mode includes at least one relay mode in the second relay mode, and the relay terminal supports the third relay mode.

For a specific manner in which the relay terminal may send the second response message to the remote terminal, refer to a manner of sending a first response message (with reference to Manner C1) or a response message for a second message (with reference to Manner C2) to the remote terminal. Details are not described herein again.

Optionally, with reference to Manner F1 to Manner F3 and Case 2-2, considering that the layer-3 relay mode may include the first layer-3 relay mode and the second layer-3 relay mode, when security of the data of the first application is considered, whether to select the first layer-3 relay mode or the second layer-3 relay mode may be further determined based on whether the relay terminal is a trusted terminal.

In a possible implementation, the information about the third relay mode sent by the relay terminal to the remote terminal may be carried in the second response message, and the second response message is a response to the second discovery message.

In another possible implementation, when security of the data of the first application is considered, the remote terminal may further request to obtain trust information of the relay terminal from the relay terminal. Therefore, the relay terminal may send the trust information of the relay terminal to the remote terminal based on the request, where the trust information may indicate whether the relay terminal is trusted to the remote terminal.

Alternatively, when the relay terminal determines to support the layer-3 relay mode, the relay terminal may further send the trust information of the relay terminal to the remote terminal, where the trust information may indicate whether the relay terminal is trusted to the remote terminal.

For example, the trust information may be an identifier (for example, a relay terminal ID) of the relay terminal, or may be information such as a digital certificate or a password. In this way, after receiving the trust information, the remote terminal determines, in a pre-agreed manner, whether the relay terminal is a trusted terminal, to determine whether the first layer-3 relay mode or the second layer-3 relay mode is used to transmit the data of the first application.

For example, when the relay terminal is trusted to the remote terminal, the remote terminal may establish a trunk link in the second layer-3 relay mode with the relay terminal, to ensure security of transmitting the data of the first application by the remote terminal via the relay terminal.

When the relay terminal is untrusted to the remote terminal, the remote terminal may establish a trunk link in the first layer-3 relay mode with the relay terminal, to ensure security of transmitting the data of the first application by the remote terminal via the relay terminal.

In another possible implementation, the remote terminal may further determine, based on a list of trusted terminals configured by the remote terminal, whether the relay terminal is a trusted terminal. The list of trusted terminals may be locally generated by the remote terminal or obtained from the PCF in a core network. This is not limited in this application. For example, when it is determined that the relay terminal is in the list of trusted terminals, it may be determined that the relay terminal is a trusted terminal; or when it is determined that the relay terminal is not in the list of trusted terminals, it may be determined that the relay terminal is an untrusted terminal.

In S1005, with reference to Manner F1 to Manner F3, in a possible implementation, when the remote terminal receives the second response message from the relay terminal, the remote terminal may obtain the third relay mode. Therefore, the remote terminal may determine the first relay mode based on the third relay mode. For example, if the remote terminal receives a plurality of second response messages returned by a plurality of relay terminals, the remote terminal determines a relay terminal with a highest priority and a relay mode with a highest priority based on the plurality of second response messages returned by the plurality of relay terminals and a priority of the relay mode corresponding to the first application of the remote terminal, to determine the relay terminal that transmits the data of the first application and the first relay mode.

For example, in Case 2-1, it is determined that a second response message 1 returned by a relay terminal 1 includes indication information indicating to support the layer-2 relay mode. A second response message 2 returned by a relay terminal 2 includes indication information indicating to support the first layer-3 relay mode. A second response message 3 returned by a relay terminal 3 includes indication information indicating to support the first layer-3 relay mode and support the second layer-3 relay mode. In this case, in descending order of priorities, relay modes corresponding to the first application of the remote terminal are sequentially: the layer-2 relay mode, the first layer-3 relay mode, and the second layer-3 relay mode. It may be determined that the relay terminal 1 is selected as the relay terminal for transmitting the data of the first application, and the first relay mode is the layer-2 relay mode.

Certainly, the remote terminal may alternatively determine, based on another condition, the relay terminal that transmits the data of the first application and the first relay mode. This is not limited in this application.

For example, with reference to Case 2-2, after the selected relay terminal is determined, it may be further determined, based on whether the relay terminal is a trusted terminal, that the first relay mode is the first layer-3 relay mode or the second layer-3 relay mode.

For example, it is determined that a second response message 1 returned by a relay terminal 1 includes indication information indicating to support the layer-2 relay mode. A second response message 2 returned by a relay terminal 2 includes indication information indicating to support the first layer-3 relay mode. A second response message 3 returned by a relay terminal 3 includes indication information indicating to support the first layer-3 relay mode and support the second layer-3 relay mode.

For example, the remote terminal selects the relay terminal 3 as the relay terminal for transmitting the data of the first application. In this case, the second response message of the relay terminal 3 further includes: trust information of the relay terminal 3. In this case, the remote terminal may determine, based on the trust information of the relay terminal 3, whether the first relay mode is the first layer-3 relay mode or the second layer-3 relay mode. Alternatively, after selecting the relay terminal 3 as the relay terminal for transmitting the data of the first application, the remote terminal may further determine, based on the list of trusted terminals determined by the remote terminal, whether the relay terminal 3 is a trusted terminal, to determine whether the first relay mode is the first layer-3 relay mode or the second layer-3 relay mode.

In S1005, in another possible implementation, the first relay mode may be first determined based on relay modes supported by a plurality of second response messages, and then the relay terminal corresponding to the first relay mode is determined.

For example, in Case 2-1, if the received plurality of second response messages all indicate supporting the layer-2 relay mode, it is determined that the first relay mode is the layer-2 relay mode. Further, the relay terminal may be selected based on another condition. For example, a relay terminal with best channel quality is selected as the relay terminal for transmitting the data of the first application.

For example, in Case 2-2, if the second response messages all indicate supporting layer-3 relay, the remote terminal may determine that the first relay mode is the layer-3 relay mode. Optionally, the remote terminal may further determine, based on the trust information returned by the relay terminal, whether the first relay mode is the first layer-3 relay mode or the second layer-3 relay mode. Optionally, the remote terminal may preferentially select a trusted relay terminal, and correspondingly select the second layer-3 relay mode, to simplify relay complexity and obtain better service continuity. When there is no trusted relay terminal, the remote terminal may select the first layer-3 relay mode.

For example, the second response message indicates supporting the first layer-3 relay mode and the second layer-3 relay mode. In this case, the remote terminal may determine the first relay mode based on a priority of the layer-3 relay mode in the first policy information or a locally configured priority. For example, if the locally configured priority indicates that the second layer-3 relay mode is preferred, it may be determined that the first relay mode is the second layer-3 relay mode.

The following uses a specific example to describe a specific implementation of the foregoing embodiment. An example in which the first layer-3 relay mode and the second layer-3 relay mode are not distinguished in the first policy information and the second policy information (Case 2-2) is used. After the remote terminal selects the layer-3 relay mode, and the relay terminal supports the layer-3 relay mode, the remote terminal may further select the first layer-3 relay mode or the second layer-3 relay mode based on whether the relay terminal is trusted. As shown in FIG. 11, this application provides a communication method, including the following steps.

S1101: A PCF sends first policy information to a remote terminal.

The first policy information may indicate a relay mode of a first application of the remote terminal, and the relay mode of the first application of the remote terminal may include at least one of the following: a layer-2 relay mode or a layer-3 relay mode. For a manner of indicating the relay mode of the first application of the remote terminal, refer to implementations in Manners A1 to A3. Details are not described herein again. For example, the PCF sends the first policy information to the remote terminal by using a UE configuration update procedure. For details, refer to S501 and S502.

S1102: The remote terminal determines a second relay mode based on the first policy information.

The second relay mode may include at least one of the following: the layer-2 relay mode or the layer-3 relay mode. In a specific implementation process, for a manner in which the remote terminal determines the second relay mode based on the first policy information, refer to S1002.

S1103: The remote terminal sends a second discovery message to a relay terminal.

The relay terminal may obtain information about the second relay mode based on the second discovery message sent by the remote terminal. In other words, the second discovery message includes the information about the second relay mode. The second relay mode includes: at least one of the layer-2 relay mode or the layer-3 relay mode. For details, refer to S1003.

S1104: The relay terminal determines whether to support the second relay mode, and sends a second response message to the remote terminal.

The second response message includes information about a third relay mode. Optionally, the second response message may further include trust information of the relay terminal. For a specific manner of sending the trust information, refer to S1004.

Optionally, the PCF may provide second policy information for the relay terminal.

The second policy information may include a relay mode of the relay terminal. The relay mode of the relay terminal is at least one of the following: the layer-2 relay mode or the layer-3 relay mode. For example, the PCF may send the second policy information to the relay terminal by using the UE configuration update procedure. For details, refer to a manner in which the PCF sends the second policy information to the relay terminal in Manner D2.

In a possible implementation, the relay terminal determines, based on the relay mode of the relay terminal in the second policy information, whether to support a first relay mode in a first message. In another possible implementation, after determining, based on the second policy information, whether information about the first relay mode exists, the relay terminal may further determine, based on a relay capability of the relay terminal, whether to support a relay mode corresponding to the information about the first relay mode. In still another possible implementation, the relay terminal determines, based on first indication information in the first message and a capability of the relay terminal, whether to support the first relay mode. Optionally, the relay terminal sends a first response message. For example, when the first message is a discovery message, the first response message is a discovery response message. When the first message is a direct communication request message, the first response message is a direct communication response message. For a specific implementation, refer to Manner C1 in Scenario (2) and S504.

For example, in a possible implementation, the relay terminal determines, based on the second policy information, whether to support a layer-3 relay mode in the first message. In another possible implementation, the relay terminal determines, based on the second policy information and a capability of the relay terminal, whether to support the layer-3 relay mode in the first message. In still another possible implementation, the relay terminal determines, based on the first indication information in the first message and a capability of the relay terminal, whether to support the layer-3 relay mode. Optionally, the relay terminal sends a first response message. For example, when the first message is a discovery message, the first response message is a discovery response message. When the first message is a direct communication request message, the first response message is a direct communication response message. For a specific implementation, refer to Manner C1 in Scenario (1) and S504.

For example, in a possible implementation, the relay terminal determines, based on the second policy information, whether to support a layer-2 relay mode. In another possible implementation, the relay terminal determines, based on the second policy information and a capability of the relay terminal, whether to support the layer-2 relay mode. In still another possible implementation, the relay terminal determines, based on the first indication information in the first message and a capability of the relay terminal, whether to support the layer-2 relay mode. Optionally, the relay terminal sends a response message for a second message. For example, when the second message is a discovery message, the response message for the second message is a discovery response message. When the second message is a direct communication request message, the response message for the second message is a direct communication response message. For a specific implementation, refer to Manner C2 and S504. Optionally, the relay terminal responds to the second message only after the relay terminal supports the layer-2 relay mode.

S1105: The remote terminal determines the first relay mode based on the third relay mode in the second response message.

When the remote terminal determines that the third relay mode of the relay terminal is the layer-3 relay mode, the remote terminal may further determine, based on the trust information in the second response message, whether the first relay mode is the first layer-3 relay mode or the second layer-3 relay mode. For details, refer to S1005.

S1106: The remote terminal transmits data of the first application in the first relay mode.

Correspondingly, the relay terminal transmits the data of the first application for the remote terminal in the first relay mode.

For details, refer to S505. Details are not described herein again.

According to the foregoing method, relay modes selected by the remote terminal for different applications may be controlled or recommended by a network, and may include the layer-2 relay mode or the layer-3 relay mode, to meet requirements of different applications and enable collaboration between different relay modes. This reduces overheads of the first policy information and the second policy information. In addition, the remote terminal selects the layer-3 relay mode or the second layer-3 relay mode based on whether the relay terminal is trusted. This improves flexibility of determining the relay mode.

The following uses a specific example to describe a specific implementation of the foregoing embodiment. The remote terminal may send a discovery message to a plurality of relay terminals, include the information about the second relay mode in the discovery message, and send the information about the second relay mode to the plurality of relay terminals. The relay terminal determines the supported third relay mode based on the obtained information about the second relay mode, and returns the supported third relay mode to the remote terminal, so that the remote terminal determines the first relay mode based on the third relay mode returned by the relay terminal, to effectively increase a success rate of selecting a relay mode by the remote terminal, and improve flexibility of selecting the relay mode. As shown in FIG. 12, this application provides a communication method, including the following steps.

S1201: A PCF sends first policy information to a remote terminal.

For a specific implementation, refer to S1001. For example, the PCF sends the first policy information to the remote terminal by using a UE configuration update procedure.

S1202: The remote terminal determines a second relay mode based on the first policy information.

For a specific implementation, refer to Manner G2 in S1002. For example, the PCF may send second policy information to a relay terminal by using the UE configuration update procedure.

S1203: The remote terminal sends a second discovery message.

The remote terminal may send the second discovery message in a broadcast manner, or may send the second discovery message in a unicast or multicast manner. This is not limited in this application.

For example, the second discovery message includes at least one of the following: a layer-2 relay capability and a layer-3 relay capability. Alternatively, the second discovery message includes at least one of the following: a layer-2 relay capability, a first layer-3 relay capability, and a second layer-3 relay capability.

For example, the second discovery message includes at least one of the following: an RSC of a layer-3 relay mode and an RSC corresponding to a layer-2 relay mode. Alternatively, the second discovery message includes at least one of the following: an RSC of a first layer-3 relay mode, an RSC of a second layer-3 relay mode, and an RSC corresponding to a layer-2 relay mode.

For example, the second discovery message includes at least one of the following: a layer-2 relay capability and an RSC corresponding to a layer-3 relay mode. Alternatively, the second discovery message includes at least one of the following: a layer-2 relay capability, an RSC corresponding to a first layer-3 relay mode, or an RSC corresponding to a second layer-3 relay mode.

In this way, the remote terminal may simultaneously discover all possible relay terminals that support the second relay mode, and may select a first relay mode and a relay terminal corresponding to the first relay mode more flexibly.

S1204: The remote terminal obtains a plurality of second response messages returned by a plurality of relay terminals.

In a possible implementation, the relay terminal sends information about a third relay mode to the remote terminal based on information about the second relay mode in the second discovery message. The third relay mode includes at least one relay mode in the second relay mode, and the relay terminal supports the third relay mode. Optionally, the second response message may further include trust information of the relay terminal. For details, refer to S1004. Details are not described herein again.

For example, the second response message may include: corresponding third indication information indicating a relay mode supported by the relay terminal. Optionally, when including information indicating that the relay terminal supports the layer-3 relay mode, the second response message may further include trust information.

For example, the second response message may include: an RSC corresponding to the relay mode supported by the relay terminal. Optionally, when including information indicating that the relay terminal supports the layer-3 relay mode, the second response message may further include trust information.

For example, the second response message may include: corresponding third indication information indicating a relay mode supported by the relay terminal and an RSC corresponding to the relay mode supported by the relay terminal. Optionally, when including information indicating that the relay terminal supports the layer-3 relay mode, the second response message may further include trust information.

S1205: The remote terminal determines the first relay mode based on the plurality of second response messages.

For example, if the received plurality of second response messages all indicate supporting the layer-2 relay mode, it is determined that the first relay mode is the layer-2 relay mode. Further, the relay terminal may be selected based on another condition. For example, a relay terminal with best channel quality is selected as the relay terminal for transmitting data of a first application.

For example, the second response message indicates supporting the first layer-3 relay mode and the second layer-3 relay mode. In this case, the remote terminal may determine the first relay mode based on a priority of the layer-3 relay mode in the first policy information or a locally configured priority. For example, if the locally configured priority indicates that the second layer-3 relay mode is preferred, it may be determined that the first relay mode is the second layer-3 relay mode.

For example, when the second response message indicates supporting the layer-2 relay mode and the layer-3 relay mode, the relay mode is selected based on priorities of different relay modes in the first policy information or a locally configured priority. For example, the locally configured priority may indicate that the layer-2 relay mode is preferred.

S1206: The remote terminal transmits the data of the first application in the first relay mode.

Correspondingly, the relay terminal transmits the data of the first application for the remote terminal in the first relay mode.

For details, refer to S505. Details are not described herein again.

According to the foregoing method, the PCF sends, to the remote terminal, the first policy information for relay mode selection. Optionally, the PCF may further send the second policy information for relay mode selection to the relay terminal. The remote terminal may determine the second relay mode based on the first policy information. The remote terminal may determine, by using a relay terminal discovery process carrying the information about the second relay mode, a relay terminal that supports at least one relay mode in the second relay mode. Therefore, the remote terminal then may determine the first relay mode based on the relay terminal that supports the at least one relay mode in the second relay mode, and determine the relay terminal accordingly. While meeting requirements of different applications, a case in which the remote terminal cannot find a corresponding relay terminal after determining a relay mode with a high priority, and then discovers a relay terminal corresponding to a relay mode with a low priority is avoided. In this way, a plurality of times of discovery do not need to be performed based on priorities of relay modes, thereby effectively reducing signaling overheads, and improving flexibility in selecting a relay mode.

Figure 13:
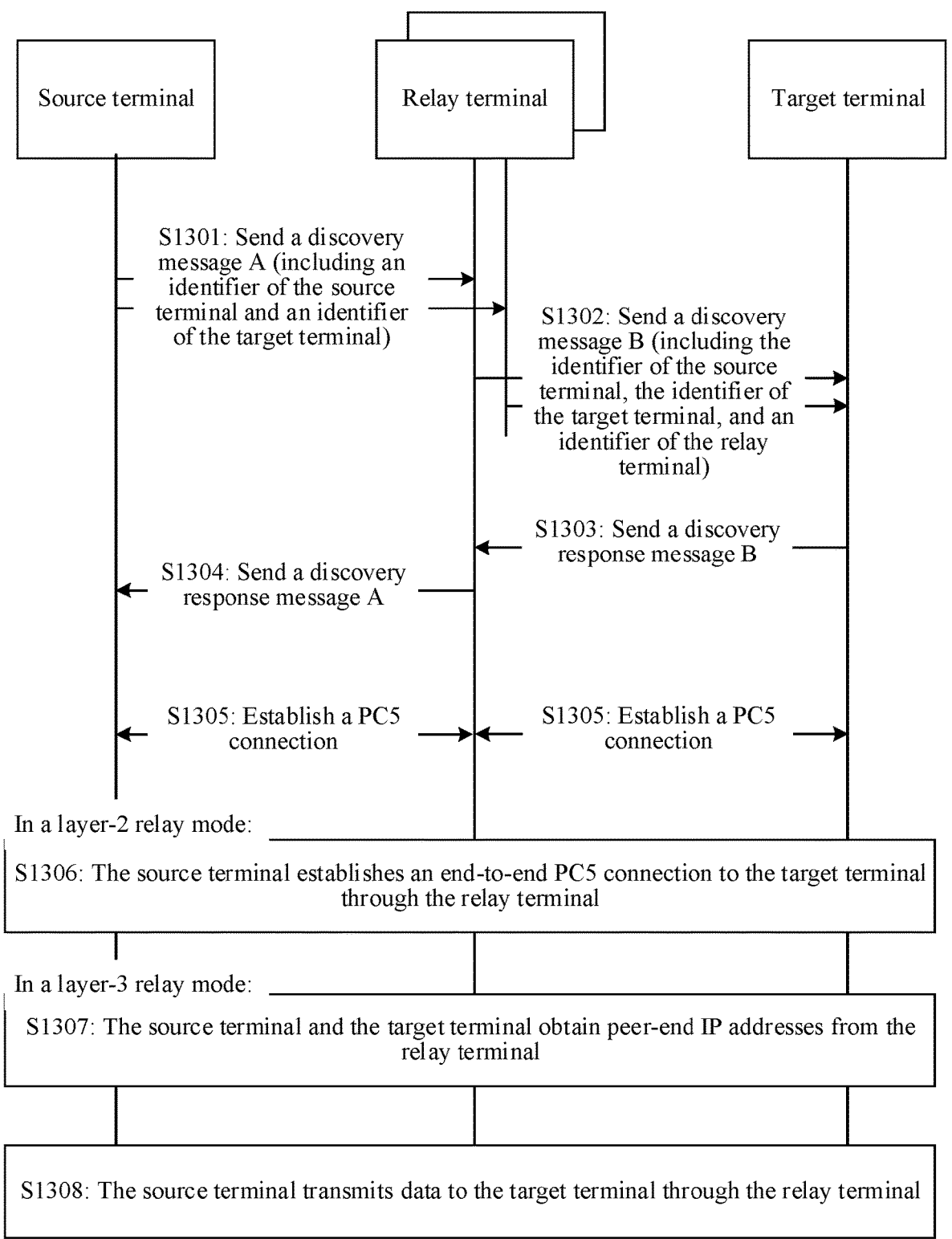
FIG. 13 is a schematic flowchart of establishing a connection between a source terminal and a target terminal in a U2U relay scenario.

Scenario 2: In the U2U relay application scenario in FIG. 1*d*, FIG. 13 is a schematic flowchart of establishing a connection between a source terminal and a target terminal, and may include two parts: relay discovery and connection establishment. For relay discovery, refer to S1301 to S1304, and for connection establishment, refer to S1306 or S1307.

It is noted in advance that, first, the source terminal, a relay terminal, and the target terminal may each be initially registered with a network, and obtain authorization information corresponding to the source terminal, the relay terminal, and the target terminal from the network.

The source terminal may obtain the authorization information of the source terminal from a PCF (a PCF that is responsible for providing a policy for the source terminal during registration of the source terminal) corresponding to the source terminal, where the authorization information of the source terminal includes information about that the source terminal is authorized to serve as a source terminal or can perform indirect communication.

The relay terminal obtains the authorization information of the relay terminal from a PCF (a PCF that is responsible for providing a policy for the relay terminal during registration of the relay terminal) corresponding to the relay terminal, where the authorization information of the relay terminal includes information about that the relay terminal is authorized to serve as a relay terminal or can perform indirect communication.

The target terminal may obtain the authorization information of the target terminal from a PCF (a PCF that is responsible for providing a policy for the target terminal during registration of the target terminal) corresponding to the target terminal, where the authorization information of the target terminal includes information about that the target terminal is authorized to serve as a target terminal or can perform indirect communication.

In addition, when one of the source terminal, the relay terminal, and the target terminal is not directly connected to the network, the terminal may determine, based on pre-configured authorization information, that the terminal may serve as which type of terminal. For example, if the source terminal is not directly connected to the network, the source terminal may determine, by using the pre-configured authorization information, that the source terminal may serve as a source terminal.

S1301: The source terminal sends a discovery message (discovery solicitation).

The discovery message may be represented as a discovery message A.

The discovery message A includes an identifier (which may be represented as Source UE info) of the source terminal and an identifier (which may be represented as Target UE info) of the target terminal, and the discovery message A is used to discover the target terminal.

The discovery message A is a broadcast message. Correspondingly, a relay terminal surrounding the source terminal may receive the discovery message A. Further, there may be one or more relay terminals that receive the discovery message A. When there are a plurality of relay terminals that receive the discovery message A, each relay terminal may perform the following step S1302.

S1302: The relay terminal sends a discovery message B based on the discovery message A.

The discovery message B includes the identifier of the source terminal, the identifier of the target terminal, and an identifier (which may be represented as Relay UE info) of the relay terminal.

Correspondingly, the target terminal may receive the discovery message B.

S1303: The target terminal sends a discovery response message B to the relay terminal.

S1304: The relay terminal sends a discovery response message A to the source terminal.

The discovery response message B is sent to a relay terminal by the target terminal after the target terminal receives the discovery message B of the relay terminal.

For example, the plurality of relay terminals send respective discovery messages B based on the discovery message A. Correspondingly, the target terminal may receive the discovery messages B from the plurality of relay terminals. The target terminal may select a relay terminal from the plurality of relay terminals. For example, the target terminal may select a relay terminal from the plurality of relay terminals based on signal strength between the target terminal and the relay terminals. The target terminal returns the discovery response message B to the selected relay terminal. The relay terminal (the relay terminal selected by the target terminal) that receives the discovery response message B sends the discovery response message A to the source terminal.

S1305: The source terminal establishes a PC5 connection to the relay terminal, and the target terminal establishes a PC5 connection to the relay terminal.

For specific implementations in which the source terminal establishes the PC5 connection to the relay terminal, and the target terminal establishes the PC5 connection to the relay terminal, refer to manners in which the remote terminal establishes the PC5 connection to the relay terminal in S204 and S205 in the foregoing Scenario 1. The remote terminal may be replaced with the source terminal or the target terminal. Details are not described herein again.

In a layer-2 relay mode, step S1306 is performed. In a layer-3 relay mode, step S1307 is performed.

S1306: The source terminal establishes an end-to-end PC5 connection to the target terminal via the relay terminal.

Specifically, the process includes the following two steps.

S1306-1: The source terminal sends a direct communication request message to the target terminal via the relay terminal.

Specifically, after receiving the direct communication request message, the relay terminal forwards the direct communication request message to the target terminal based on an access stratum configuration (for example, configuration information of a radio bearer or configuration information of an adaptation layer).

S1306-2: The target terminal sends a direct communication response message to the source terminal via the relay terminal.

Specifically, after receiving the direct communication response message, the relay terminal forwards the direct communication response message to the source terminal based on the access stratum configuration (for example, the configuration information of the radio bearer or the configuration information of the adaptation layer).

S1307: The source terminal and the target terminal obtain peer-end IP addresses from the relay terminal.

In some embodiments, in a process in which the source terminal establishes a PC5 link with the relay terminal, the relay terminal allocates an IP address to the source terminal, or the relay terminal obtains an IP address of the source terminal from the source terminal, and the relay terminal stores the IP address of the source terminal. Similarly, in a process in which the target terminal establishes a PC5 link with the relay terminal, the relay terminal allocates an IP address to the target terminal, or the relay terminal obtains an IP address of the target terminal from the target terminal, and the relay terminal stores the IP address of the target terminal. The relay terminal may provide the peer-end IP addresses for the source terminal and the target terminal.

S1308: The source terminal transmits data to the target terminal via the relay terminal.

For example, the source terminal may send data of the source terminal to the relay terminal, and the relay terminal forwards the data of the source terminal to the target terminal. Alternatively, the target terminal may send data of the target terminal to the relay terminal, and the relay terminal forwards the data of the target terminal to the source terminal.

It should be noted that in S1304 to S1307, the relay terminal refers to the relay terminal selected by the target terminal in S1303.

In addition, the target terminal may alternatively receive the discovery message A. Correspondingly, the target terminal may directly return, to the source terminal, the discovery response message A corresponding to the discovery message A, so that selection of the relay terminal does not need to be performed. Then, a PC5 link is established between the source terminal and the target terminal.

In the discovery process of S1301 to S1304, the source terminal, the relay terminal, or the target terminal may support one or more of the layer-2 relay mode and the layer-3 relay mode, and relay modes supported by the source terminal, the relay terminal, and the target terminal may be the same or different. For example, the source terminal supports the layer-2 relay mode and the layer-3 relay mode, and the target terminal supports only the layer-2 relay mode. In the discovery process, a relay terminal that supports the layer-2 relay mode needs to be discovered, to implement relay communication between the source terminal and the target terminal, and a relay mode used for relay communication needs to be the layer-2 relay mode.

In this way, in a scenario (the U2U relay scenario) in which the source terminal communicates with the target terminal via the relay terminal, if the layer-2 relay mode and the layer-3 relay mode coexist, how to select a relay mode becomes an urgent problem to be resolved. Therefore, this application provides another communication method to resolve this problem.

That the method is applied to the communication system architecture shown in FIG. 1d or the application scenario shown in FIG. 13 is used as an example. For example, the method is performed by a network device, a relay terminal, a source terminal, and a target terminal. The network device may include an access network device and a core network device. For example, the core network device may include a PCF, a UDM, and an AMF.

Figure 14:
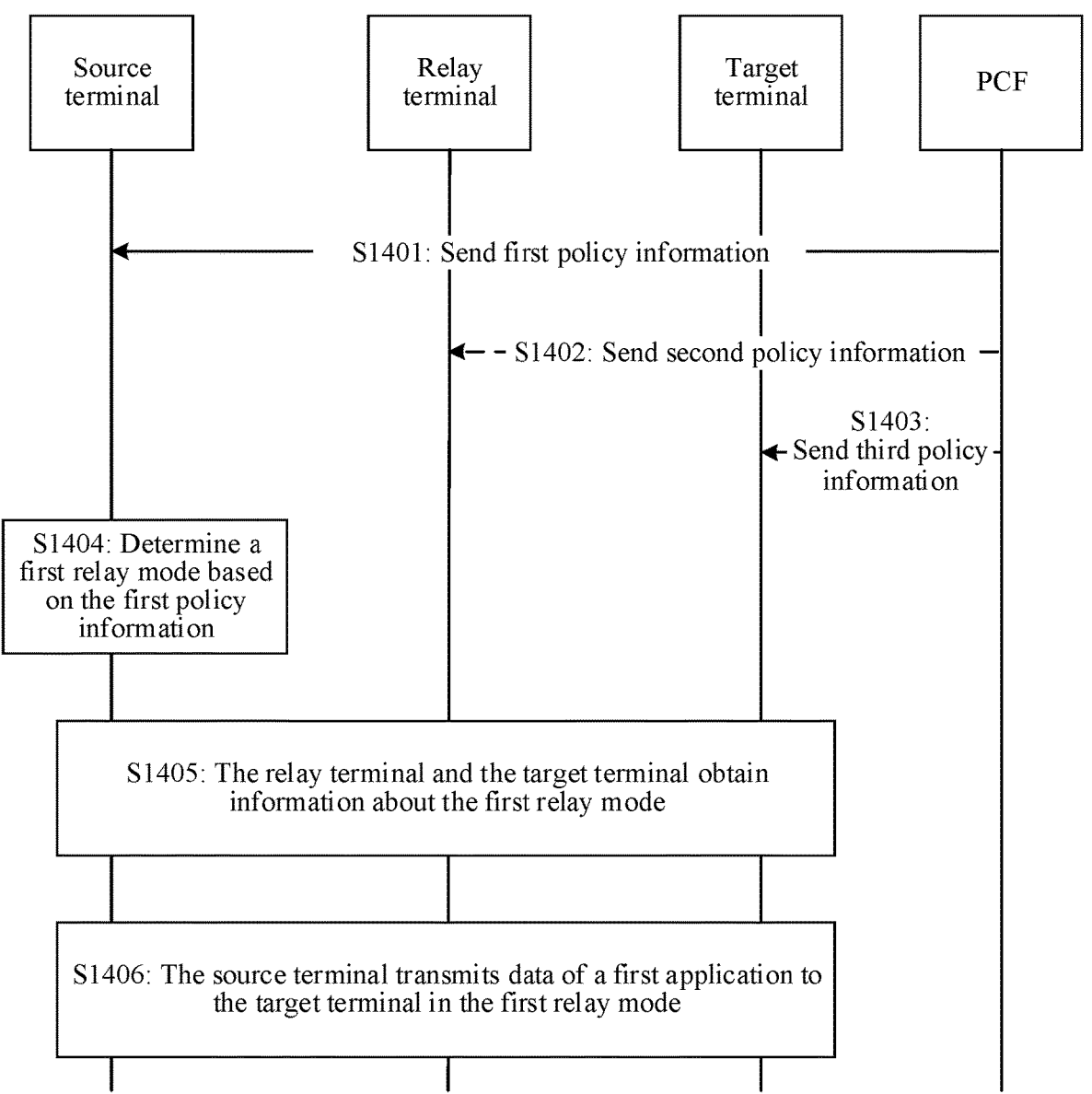
FIG. 14 is a schematic flowchart of a communication method in a U2U relay scenario according to an embodiment of this application.
Figure 15:
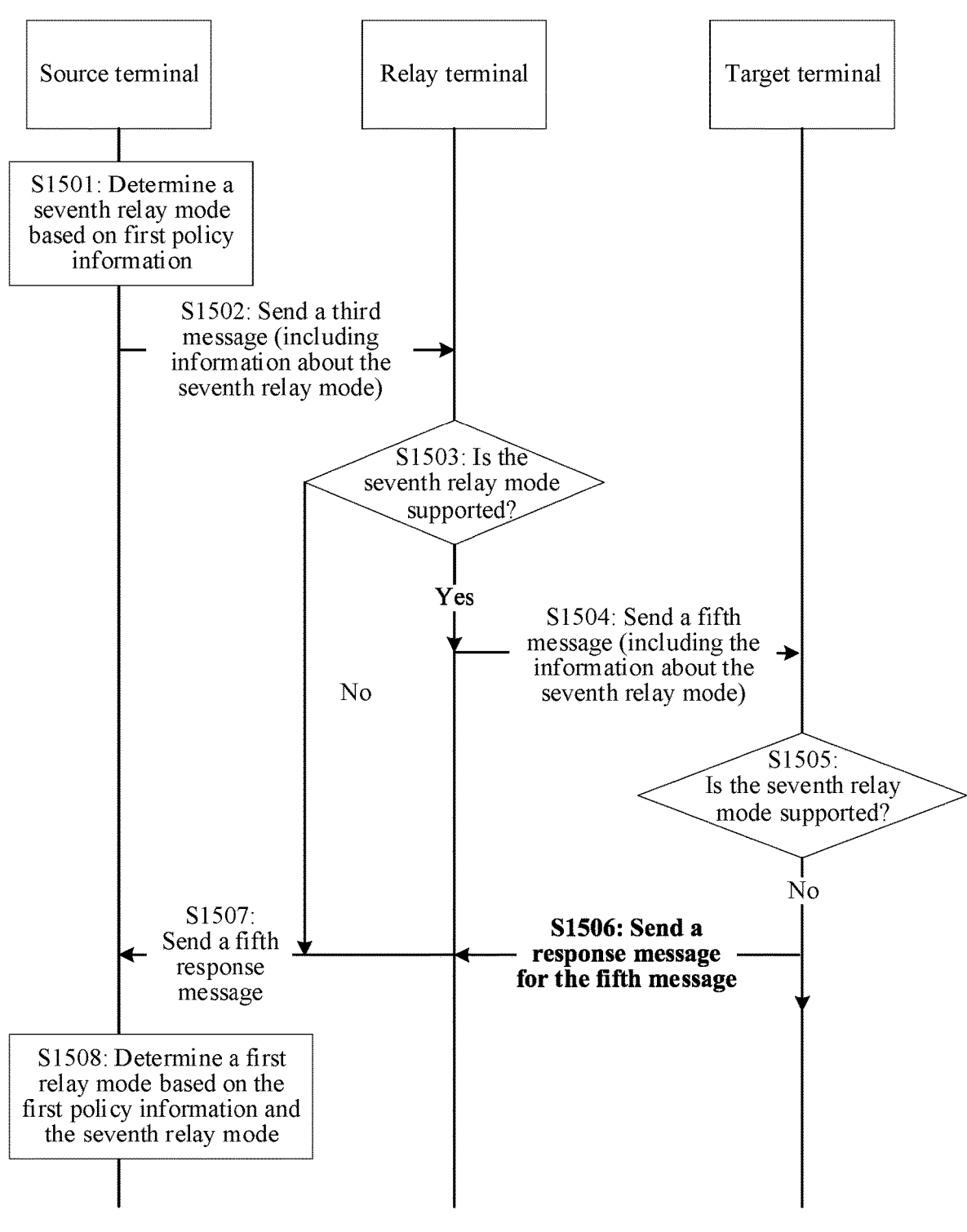
FIG. 15 is a schematic flowchart of a communication method in a U2U relay scenario according to an embodiment of this application.
Figure 16:
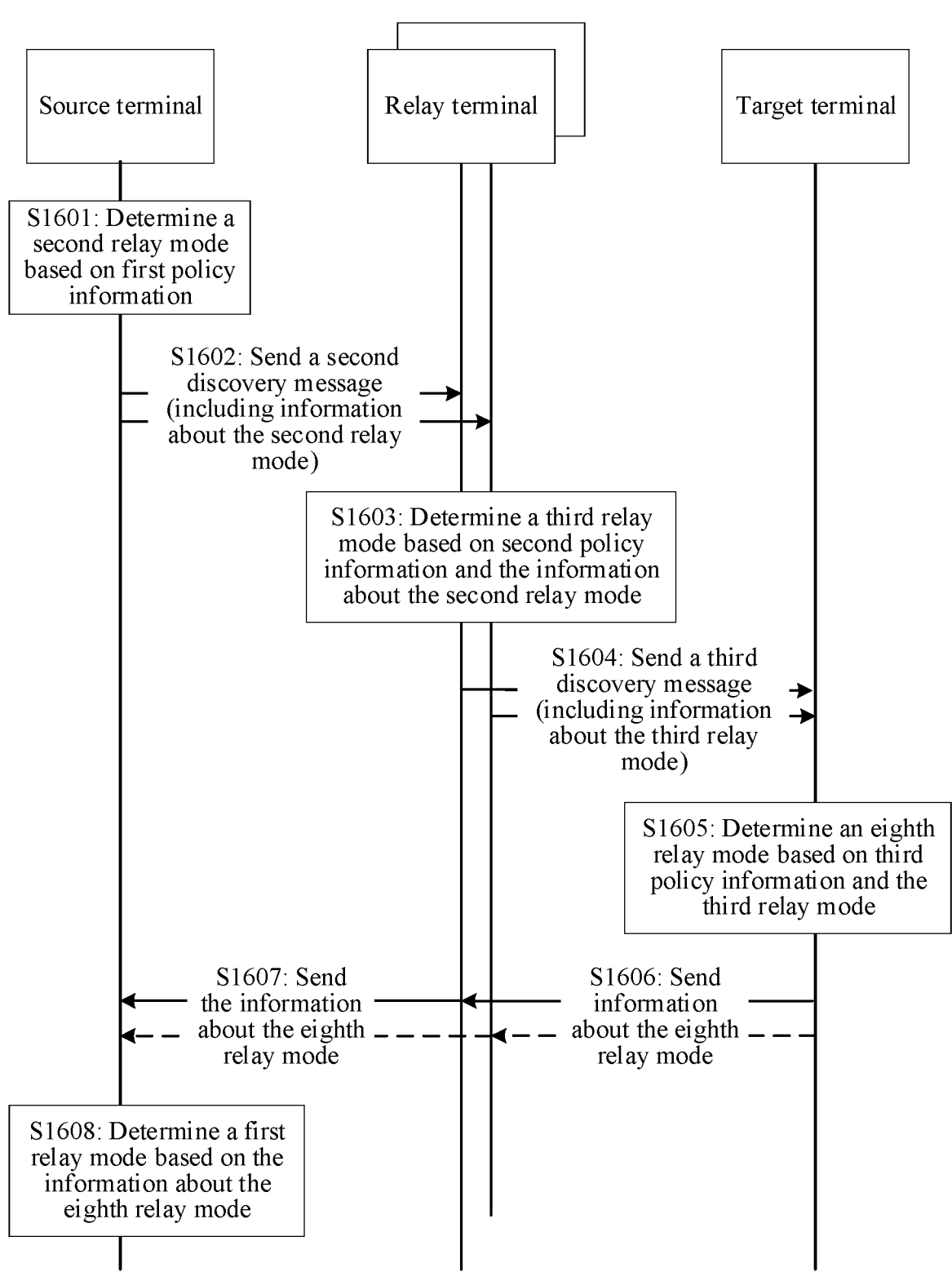
FIG. 16 is a schematic flowchart of a communication method in a U2U relay scenario according to an embodiment of this application.

The following provides explanations with reference to a flowchart shown in FIG. 14.

S1401: The PCF sends first policy information to the source terminal.

Optionally, the PCF first obtains a fourth relay mode, determines the first policy information based on the fourth relay mode, and then sends the first policy information to the source terminal.

The fourth relay mode may include at least one of the following: a relay mode corresponding to a first application, a relay mode supported by the source terminal, or a relay mode authorized by the source terminal. The first application may be an application corresponding to data that is to be transmitted between the source terminal and the target terminal. The first application may also be understood as a first service, and the first service may be a proximity based service.

For an implementation in which the PCF obtains the fourth relay mode, refer to an implementation in which the PCF obtains the fourth relay mode in S501 in Scenario 1. The "remote terminal" may be replaced with the "source terminal".

Further, the PCF determines the first policy information based on the fourth relay mode, and sends the first policy information to the source terminal. The first policy information may include: a relay mode corresponding to a first application of the source terminal. The relay mode corresponding to the first application of the source terminal is used by the source terminal to transmit data of the first application.

For an implementation in which the PCF determines the first policy information based on the fourth relay mode, and sends the first policy information to the source terminal, refer to an implementation in which the PCF determines the first policy information and sends the first policy information to the remote terminal in S502 in Scenario 1, and further refer to the descriptions in which the first policy information carries the relay mode corresponding to the first application in Manner A1 to Manner A3. The "remote terminal" may be replaced with the "source terminal".

S1402: The PCF sends second policy information to the relay terminal.

Optionally, the PCF first obtains a fifth relay mode, determines the second policy information based on the fifth relay mode, and then sends the second policy information to the relay terminal. The fifth relay mode includes at least one of the following: a relay mode supported by the relay terminal, or a relay mode authorized by the relay terminal. The second policy information includes a relay mode of the relay terminal.

For the step, refer to the descriptions of Manner D2 in S504 in Scenario 1.

S1402 is an optional step. The relay terminal may alternatively determine the relay mode (the relay mode of the relay terminal) of the relay terminal based on a capability of the relay terminal or based on authorization information obtained by the relay terminal in a registration process.

S1403: The PCF sends third policy information to the target terminal.

Optionally, the PCF first obtains a sixth relay mode, determines the third policy information based on the sixth relay mode, and then sends the third policy information to the target terminal.

The sixth relay mode may include at least one of the following: a relay mode corresponding to a first application, a relay mode supported by the target terminal, or a relay mode authorized by the target terminal. The first application may be an application corresponding to data that is to be transmitted between the source terminal and the target terminal.

For an implementation in which the PCF obtains the sixth relay mode, refer to an implementation in which the PCF obtains the fourth relay mode in S501 in Scenario 1. The "remote terminal" may be replaced with the "target terminal", and the "fourth relay mode" may be replaced with the "sixth relay mode".

Further, the PCF determines the third policy information based on the sixth relay mode, and sends the third policy information to the target terminal. The third policy information may include: a relay mode corresponding to a first application of the target terminal. The relay mode corresponding to the first application of the target terminal is used by the target terminal to transmit data of the first application.

For an implementation in which the PCF determines the third policy information based on the sixth relay mode, and sends the third policy information to the target terminal, refer to an implementation in which the PCF determines the first policy information, and sends the first policy information to the remote terminal in S502 in Scenario 1. The "remote terminal" may be replaced with the "target terminal", the "fourth relay mode" may be replaced with the "sixth relay mode", and the "first policy information" may be replaced with the "third policy information".

S1404: The source terminal determines a first relay mode based on the first policy information.

The source terminal may determine, based on a current requirement for transmitting the data of the first application, to select the first relay mode. For example, when an application layer of the source terminal has a data transmission requirement of the first application, the application layer requests a network layer of the source terminal to determine the first relay mode.

For an implementation in which the source terminal determines the first relay mode based on the first policy information, refer to a specific manner in which the remote terminal determines the first relay mode in S503 in Scenario 1. The "remote terminal" may be replaced with the "source terminal".

S1405: The relay terminal and the target terminal obtain information about the first relay mode.

To ensure that the source terminal, the relay terminal, and the target terminal each can transmit the data of the first application in the first relay mode, the source terminal may first determine the information about the first relay mode, and then the source terminal sends the information about the first relay mode to the relay terminal in a discovery process or a PC5 link establishment process. Correspondingly, the relay terminal sends the information about the first relay mode to the target terminal, so that the relay terminal and the target terminal obtain the information about the first relay mode.

For an implementation in which the source terminal determines the information about the first relay mode, refer to the descriptions in which the remote terminal determines the information about the first relay mode in S503 in Scenario 1, and further refer to the descriptions in Manner B1 and Manner B2. The "remote terminal" may be replaced with the "source terminal".

Further, an implementation in which the relay terminal and the target terminal obtain the information about the first relay mode may be as follows: The source terminal sends a discovery message (discovery request) to the relay terminal, where the discovery message includes the information about the first relay mode. Correspondingly, the relay terminal obtains the information about the first relay mode, and after determining to support the first relay mode, the relay terminal sends the discovery message including the information about the first relay mode. Correspondingly, the target terminal receives the discovery message from the relay terminal, and obtains the information about the first relay mode from the discovery message.

After determining that the target terminal supports the first relay mode, the target terminal sends a discovery response to the relay terminal, where the discovery response may indicate, to the relay terminal, that the target terminal supports the first relay mode. Correspondingly, the relay terminal receives the discovery response from the target terminal, and sends the discovery response to the source terminal, to indicate, to the source terminal, that the relay terminal may support the source terminal in communicating with the target terminal in the first relay mode. Alternatively, it may be understood that the relay terminal sends the discovery response to the source terminal, to indicate that both the relay terminal and the target terminal can support the first relay mode.

The discovery message may be replaced with a direct communication request (DCR). The discovery response may be replaced with a direct communication accept (DCA).

S1406: The source terminal transmits the data of the first application to the target terminal in the first relay mode.

Specifically, the source terminal sends the data of the first application to the relay terminal in the first relay mode, and the relay terminal sends the data of the first application to the target terminal in the first relay mode. Alternatively, the target terminal sends the data of the first application to the relay terminal in the first relay mode, and the relay terminal sends the data of the first application to the source terminal in the first relay mode.

That the first relay mode is a layer-2 relay mode is used as an example. A PC5 link is established between the source terminal and the relay terminal, and a PC5 link is established between the relay terminal and the target terminal. The source terminal requests, by using the relay terminal, to establish an RRC connection to the target terminal, and performs subsequent steps, to transmit the data of the first application based on the layer-2 relay mode.

That the first relay mode is a layer-3 relay mode is used as an example. A PC5 link is established between the source terminal and the relay terminal, and a PC5 link is established between the relay terminal and the target terminal. The source terminal and the target terminal obtain peer-end IP addresses from the relay terminal, to transmit the data of the first application based on the layer-3 relay mode. In this case, both a PDU session established by the relay terminal with the source terminal and a PDU session established by the relay terminal with the target terminal may be determined based on a PDU session parameter determined by using an RSC corresponding to the first relay mode, in other words, determined based on a PDU session parameter corresponding to the first application.

According to the foregoing method, the PCF sends, to the source terminal, the first policy information for relay mode selection. The source terminal determines the first relay mode based on the first policy information. Correspondingly, the relay terminal determines, based on the obtained information about the first relay mode, whether to support the first relay mode, and the target terminal determines, based on the obtained information about first relay mode, whether to support the first relay mode. Therefore, a network controls or recommends the source terminal to select different relay modes for different applications, to meet requirements of different applications and enable collaboration between different relay modes.

The following describes an implementation of S1405.

For an implementation in which the relay terminal obtains the information about the first relay mode from the source terminal, refer to the descriptions in which the relay terminal obtains the information about the first relay mode from the remote terminal in S504 in Scenario 1, and further refer to the descriptions in Manner C1 or Manner C2 in Scenario 1. The "remote terminal" may be replaced with the "source terminal".

Further, after obtaining the information about the first relay mode, the relay terminal may determine whether the relay terminal supports the first relay mode. For a determining manner, refer to the descriptions in Manner D1 and Manner D2 in Scenario 1.

Further, after determining that the relay terminal supports the first relay mode, the relay terminal sends a fourth message, where the fourth message includes the information about the first relay mode. The fourth message may be a broadcast message, and the broadcast message carries an identifier of the target terminal, an identifier of the source terminal, and an identifier of the relay terminal.

Correspondingly, the target terminal receives the fourth message from the relay terminal, and obtains the identifier of the target terminal from the fourth message, in other words, determines that a receiver of the fourth message is the target terminal. Then, the target terminal obtains the information about the first relay mode from the fourth message, and determines whether the target terminal supports the first relay mode.

The following uses Manner H1 and Manner H2 as examples to describe a manner in which the target terminal determines whether to support the first relay mode.

Manner H1: The target terminal determines, based on the relay mode supported by the target terminal, whether to support the first relay mode.

For example, the target terminal may determine, based on a capability of the target terminal, whether to support the first relay mode, or the target terminal may further determine, based on authorization information obtained by the target terminal in a registration process, whether to support the first relay mode. For example, the target terminal may determine, based on whether the target terminal is authorized to serve as a target terminal in the authorization information, or whether the target terminal is authorized to serve as a first relay mode, whether to support the first relay mode.

Manner H2: The target terminal obtains the third policy information, and determines, based on the third policy information, whether to support the first relay mode. For the third policy information, refer to the descriptions in S1403.

The target terminal obtains, from the third policy information, the relay mode corresponding to the first application of the target terminal, then determines that the relay mode corresponding to the first application of the target terminal includes the first relay mode, and determines that the target terminal supports the first relay mode.

Further, if determining that the target terminal supports the first relay mode, the target terminal sends, to the relay terminal, a response message. Correspondingly, the relay terminal receives the response message from the target terminal, determines that the target terminal supports the first relay mode, and sends a third response message to the source terminal, where the third response message is used by the relay terminal to respond to the source terminal with a first message. The third response message may indicate that the relay terminal supports the source terminal in communicating with the target terminal in the first relay mode. Alternatively, it may be understood that the third response message may indicate that both the relay terminal and the target terminal support the first relay mode.

In addition, it should be added that, before selecting the first relay mode, the source terminal may further select a seventh relay mode, and the source terminal sends information about the seventh relay mode. Correspondingly, the source terminal determines that the relay terminal or the target terminal does not support the seventh relay mode. Then, the source terminal further selects a relay mode other than the seventh relay mode, and determines whether both the relay terminal and the target terminal support the selected relay mode. For details, refer to FIG. 15.

S1501: The source terminal determines the seventh relay mode based on the first policy information.

Example 1: The source terminal may determine the seventh relay mode based on the relay mode corresponding to the first application of the source terminal in the first policy information.

Example 2: The source terminal determines, based on a capability of the source terminal, the seventh relay mode in the relay mode supported by the source terminal and the first policy information.

Example 3: The first policy information may include the relay mode corresponding to the first application of the source terminal, and a priority of the relay mode corresponding to the first application of the source terminal. Correspondingly, the source terminal may determine the seventh relay mode based on the relay mode corresponding to the first application of the source terminal and the priority of the relay mode corresponding to the first application of the source terminal.

For specific implementations in which the source terminal determines the seventh relay mode in Example 1 to Example 3, refer to the descriptions in which the remote terminal determines the first relay mode in S503 in Scenario 1. The "remote terminal" may be replaced with the "source terminal", and the "first relay mode" may be replaced with the "seventh relay mode" for understanding.

S1502: The source terminal sends a third message, where the third message includes the information about the seventh relay mode.

The information about the seventh relay mode may include an RSC corresponding to the seventh relay mode, or fourth indication information indicating the seventh relay mode. The fourth indication information is, for example, an identifier of the seventh relay mode or relay capability information of a relay terminal required by the seventh relay mode.

For an implementation in which the source terminal determines the information about the seventh relay mode, refer to the descriptions in which the remote terminal determines the information about the first relay mode in S503 in Scenario 1, and further refer to the descriptions in Manner B1 and Manner B2 in Scenario 1. The "remote terminal" may be replaced with the "source terminal", the "information about the first relay mode" may be replaced with the "information about the seventh relay mode", and the "first indication information" may be replaced with the "fourth indication information".

Correspondingly, the relay terminal receives the third message, obtains the information about the seventh relay mode from the third message, and determines whether the relay terminal supports the seventh relay mode. For an implementation in which the relay terminal determines whether the relay terminal supports the seventh relay mode, refer to the descriptions in Manner D1 and Manner D2 in Scenario 1. The "first relay mode" is replaced with the "seventh relay mode".

S1503: Whether the relay terminal supports the seventh relay mode.

When the relay terminal supports the seventh relay mode, the following S1504 may continue to be performed.

S1504: The relay terminal sends a fifth message, where the fifth message includes the information about the seventh relay mode.

Further, the fifth message may be a broadcast message, and the fifth message further carries the identifier of the target terminal, the identifier of the source terminal, and the identifier of the relay terminal.

Correspondingly, the target terminal receives the fifth message from the relay terminal, and obtains the identifier of the target terminal from the fifth message, in other words, determines that a receiver of the fifth message is the target terminal.

S1505: The target terminal determines that the target terminal does not support the seventh relay mode.

Specifically, the target terminal obtains the information about the seventh relay mode from the fifth message, and determines, based on the information about the seventh relay mode, whether the target terminal supports the seventh relay mode.

For an implementation in which the target terminal determines whether the target terminal supports the seventh relay mode, refer to Manner H1 and Manner H2 in Scenario 1. After the target terminal determines that the target terminal does not support the seventh relay mode, S1506 is performed.

S1506: The target terminal sends a response message for the fifth message to the relay terminal.

It may also be understood that, in response to the fifth message, the target terminal sends the response message for the fifth message to the relay terminal. Correspondingly, the relay terminal receives the response message for the fifth message from the target terminal.

The response information for the fifth message may indicate that the target terminal does not support the seventh relay mode.

S1507: The relay terminal sends a fifth response message to the source terminal.

Specifically, the relay terminal determines, based on the response message for the fifth message, that the target terminal does not support the seventh relay mode, and sends the fifth response message to the source terminal. The fifth response message may be understood as a response message in response to the third message. Herein, the fifth response message may indicate that the target terminal does not support the seventh relay mode.

In addition, when the relay terminal does not support the seventh relay mode, S1507 may be directly performed.

S1507: The relay terminal sends the fifth response message to the source terminal.

Correspondingly, the source terminal receives the fifth response message from the relay terminal. Herein, the fifth response message may indicate that the relay terminal does not support the seventh relay mode.

It may be understood that, after receiving the fifth response message from the relay terminal, the source terminal may determine, based on the fifth response message, that one or more of the relay terminal and the target terminal do not support the seventh relay mode.

S1508: The source terminal determines the first relay mode based on the first policy information and the seventh relay mode.

With reference to the three examples in which the source terminal determines the seventh relay mode in S1501, the following describes that the source terminal determines the first relay mode based on the first policy information and the seventh relay mode.

Example a: The source terminal determines, in the relay mode corresponding to the first application, a relay mode (for example, a ninth relay mode) other than the seventh relay mode. The source terminal sends information about the ninth relay mode. Correspondingly, the relay terminal receives the information about the ninth relay mode from the source terminal, and determines whether to support the ninth relay mode. When determining that the relay terminal supports the ninth relay mode, the relay terminal sends the information about the ninth relay mode. Correspondingly, the target terminal receives the information about the ninth relay mode from the relay terminal, and determines whether to support the ninth relay mode.

When both the relay terminal and the target terminal support the ninth relay mode, the relay terminal may send a third response message to the source terminal, where the ninth relay mode is the first relay mode.

In addition, when the relay terminal or the target terminal does not support the ninth relay mode, the source terminal may further select a relay mode other than the seventh relay mode and the ninth relay mode from the relay mode corresponding to the first application in the first policy information.

Example b: The source terminal determines, based on the capability of the source terminal, a relay mode other than the seventh relay mode in the relay mode supported by the source terminal and the first policy information. A specific implementation is similar to that in the foregoing Example 1. Details are not described again.

Example c: The source terminal selects, based on a priority of the seventh relay mode, the ninth relay mode from the relay mode corresponding to the first application of the source terminal in the first policy information. Among relay modes in the relay mode corresponding to the first application of the source terminal, in descending order of priorities, the ninth relay mode follows the seventh relay mode.

For example, the first policy information includes the layer-2 relay mode, the layer-3 relay mode, a priority corresponding to the layer-2 relay mode, and a priority corresponding to the layer-3 relay mode. The priority of the layer-3 relay mode is higher than the priority corresponding to the layer-2 relay mode. The source terminal uses the layer-3 relay mode as the seventh relay mode, and when the relay terminal or the target terminal does not support the layer-3 relay mode, the source terminal determines, based on the priority of the layer-3 relay mode in the relay mode corresponding to the first application of the source terminal in the first policy information, that the layer-2 relay mode is the ninth relay mode.

In the foregoing Example a to Example c, an implementation in which the source terminal determines the information about the ninth relay mode, and the source terminal determines whether the relay terminal or the target terminal supports the ninth relay mode is similar to S1502 to S1508. Details are not described again.

In the foregoing embodiment, when determining that the target terminal does not support the seventh relay mode, the target terminal sends a response message to the relay terminal, to indicate that the target terminal does not support the seventh relay mode. In addition, after determining that the target terminal does not support the seventh relay mode, the target terminal may not send the response message to the relay terminal. Correspondingly, the relay terminal may determine, within first preset duration after the fifth message is sent, whether the response message from the target terminal is received, and if no response message is received, determine that the target terminal does not support the seventh relay mode.

Similarly, when the relay terminal determines that the relay terminal does not support the seventh relay mode, or determines that the target terminal does not support the seventh relay mode, the relay terminal may alternatively not send the response message to the source terminal. Correspondingly, the source terminal may determine, within second preset duration after the third message is sent, whether the response message from the relay terminal is received, and if no response message is received, determine that the relay terminal or the target terminal does not support the seventh relay mode.

In the foregoing embodiment, if the source terminal does not receive the response message from the relay terminal within the second preset duration after the third message is sent, the source terminal determines that a relay terminal that supports the seventh relay mode cannot be found, and the source terminal may initiate S1508.

It may be understood that S1508 is an implementation of S1404. After S1508, S1405 may continue to be performed, so that the data of the first application is transmitted between the source terminal and the target terminal in the first relay mode.

It should be added that, in a U2N relay scenario, the remote terminal may alternatively determine the seventh relay mode in the manner in S1501. Correspondingly, the relay terminal may determine that the relay terminal does not support the seventh relay mode, and therefore send a fourth response message to the remote terminal, where the fourth response message indicates that the relay terminal does not support the seventh relay mode. After receiving the fourth response message, the remote terminal may determine the first relay mode based on the seventh relay mode and the first policy information. For a determining manner, refer to descriptions in S1508. In addition, when determining that the relay terminal does not support the seventh relay mode, the relay terminal may alternatively not send the response message to the remote terminal. In the manner, the remote terminal may determine, within third preset duration after the third message is sent, whether the response message from the relay terminal is received, and if no response message is received, determine that the relay terminal or the target terminal does not support the seventh relay mode, to further determine the first relay mode based on the seventh relay mode and the first policy information.

In addition, the source terminal may further obtain the first relay mode in the following manner.

S1601: The source terminal determines a second relay mode based on the first policy information.

The second relay mode includes one or more relay modes in the relay mode corresponding to the first application of the source terminal. The second relay mode is used by the source terminal to determine the first relay mode.

The second relay mode may include one or more relay modes in the relay mode corresponding to the first application of the source terminal. In other words, the second relay mode includes: at least one of the layer-2 relay mode or the layer-3 relay mode.

For a specific implementation in which the source terminal determines the second relay mode, refer to a manner in which the source terminal determines the first relay mode in S1404. A difference between the second relay mode and the first relay mode lies in that the second relay mode may include one or more relay modes.

S1602: The source terminal sends a second discovery message, and correspondingly, the relay terminal receives the second discovery message of the source terminal, where the second discovery message carries information about the second relay mode.

The information about the second relay mode includes at least one of the following: an RSC corresponding to the second relay mode; or third indication information indicating the second relay mode. Specifically, for a manner in which the source terminal determines the information about the second relay mode, refer to a manner in which the source terminal determines the information about the first relay mode in S1405. Details are not described herein again.

S1603: The relay terminal determines a third relay mode based on the second policy information and the information about the second relay mode.

The third relay mode includes at least one relay mode in the second relay mode, and the relay terminal supports the third relay mode. Alternatively, it may be understood that the third relay mode is one or more relay modes in an intersection of the relay mode supported by the relay terminal and the second relay mode.

For an implementation in which the relay terminal determines the third relay mode based on the second policy information and the information about the second relay mode, refer to the descriptions in S1004, Manner F2, and Manner F3 in Scenario 1. In addition, the relay terminal may further determine the third relay mode based on the information about the second relay mode and the capability of the relay terminal. For details, refer to the descriptions in Manner F1.

It may be understood that the second discovery message is a broadcast message, and one or more relay terminals near the source terminal may receive the second discovery message. For each relay terminal, the relay terminal may determine whether the relay terminal supports at least one second relay mode in the second discovery message, and if the relay terminal supports the at least one second relay mode in the second discovery message, the relay terminal may determine the third relay mode. Otherwise, no processing is required.

Example 1: A relay terminal 1 receives a second discovery message from the source terminal, where the relay terminal 1 supports the layer-2 relay mode and the layer-3 relay mode, and the second relay mode includes the layer-2 relay mode and the layer-3 relay mode. The relay terminal 1 may obtain information about the layer-2 relay mode and information about the layer-3 relay mode from the second discovery message, and determine that the third relay mode includes the layer-2 relay mode and the layer-3 relay mode.

Example 2: A relay terminal 2 receives a second discovery message from the source terminal, where the relay terminal 2 supports the layer-2 relay mode, and the second relay mode is the layer-3 relay mode. The relay terminal 2 may obtain information about the layer-3 relay mode from the second discovery message, determine that the relay terminal 2 does not support the layer-3 relay mode, and no processing is required.

Example 3: A relay terminal 3 receives a second discovery message from the source terminal, where the relay terminal 3 supports the layer-2 relay mode, and the second relay mode includes the layer-2 relay mode and the layer-3 relay mode. The relay terminal 3 may obtain information about the layer-2 relay mode and information about the layer-3 relay mode from the second discovery message, and determine that the third relay mode is the layer-2 relay mode.

S1604: The relay terminal sends a third discovery message.

Correspondingly, the target terminal receives the third discovery message from the relay terminal.

The third discovery message includes information about the third relay mode. The information about the third relay mode includes at least one of the following: an RSC corresponding to the third relay mode; or fifth indication information indicating the third relay mode. The fifth indication information is, for example, an identifier of the third relay mode or relay capability information of a relay terminal required by the third relay mode.

Further, the third discovery message includes the identifier of the target terminal, the identifier of the source terminal, and the identifier of the relay terminal. Therefore, after receiving the third discovery message from the relay terminal, the target terminal obtains the identifier of the target terminal from the third discovery message, and determines that a receiver of the third discovery message is the target terminal.

S1605: The target terminal determines an eighth relay mode based on the third policy information and the third relay mode.

The eighth relay mode includes one or more relay modes in the third relay mode, and the target terminal supports the eighth relay mode.

S1606: The target terminal sends information about the eighth relay mode to the relay terminal.

Correspondingly, the relay terminal receives the information about the eighth relay mode from the target terminal.

The information about the eighth relay mode includes at least one of the following: an RSC corresponding to the eighth relay mode; or sixth indication information indicating the eighth relay mode. The sixth indication information is, for example, an identifier of the eighth relay mode or relay capability information of a relay terminal required by the eighth relay mode.

Optionally, the target terminal sends a sixth response message to the relay terminal, where the sixth response message is a response to the third discovery message, and the sixth response message includes the information about the eighth relay mode. In addition, the sixth response message further includes the identifier of the target terminal, the identifier of the source terminal, and the identifier of the relay terminal.

In S1604, the target terminal may receive third discovery messages from one or more relay terminals, and each third discovery message includes a third relay mode supported by a corresponding relay terminal. The following describes S1605 and S1606 by using an example in which the target terminal receives a third discovery message from a relay terminal.

For example, the target terminal obtains the information about the third relay mode from the third discovery message, and determines, based on the third policy information, the relay mode corresponding to the first application of the target terminal. The target terminal determines the eighth relay mode based on the third relay mode and the relay mode corresponding to the first application of the target terminal. Alternatively, it may be understood that the eighth relay mode is one or more relay modes in an intersection of the relay mode supported by the target terminal and the third relay mode.

With reference to the foregoing Example 1, the target terminal receives the third discovery message from the relay terminal 1, where the third discovery message includes the information about the layer-2 relay mode and the information about the layer-3 relay mode. The target terminal determines, based on the third policy information, that the relay mode corresponding to the first application of the target terminal is the layer-2 relay mode. Further, the target terminal determines that the eighth relay mode is the layer-2 relay mode, and the target terminal sends the information about the layer-2 relay mode to the relay terminal 1.

In addition, to better implement relay communication between the source terminal and the target terminal, when determining the eighth relay mode, the target terminal may further determine the eighth relay mode in the third relay mode based on the third policy information and a capability of the target terminal. Still with reference to the foregoing Example 1, it is assumed that the target terminal determines, based on the third policy information, that the relay mode corresponding to the first application of the target terminal includes the layer-2 relay mode and the layer-3 relay mode. The target terminal determines, in the third policy information based on the layer-2 relay mode and the layer-3 relay mode that correspond to the first application of the target terminal and the layer-2 relay mode supported by the capability of the target terminal, that the eighth relay mode is the layer-2 relay mode, and the target terminal sends the information about the layer-2 relay mode to the relay terminal 1.

It should be noted that after receiving a third discovery response of a relay terminal, the target terminal may not be able to determine the eighth relay mode. In this case, the target terminal may not respond to the relay terminal.

With reference to the foregoing Example 3, the relay terminal 3 determines that the third relay mode is the layer-2 relay mode, and the third discovery message sent by the relay terminal 3 carries the information about the layer-2 relay mode. Correspondingly, the target terminal receives the third discovery message from the relay terminal 3. The target terminal further determines, based on the third policy information, that the relay mode corresponding to the first application of the target terminal is the layer-3 relay mode. Therefore, the target terminal cannot determine the eighth relay mode, and the target terminal does not need to respond to the relay terminal 3.

In this application, the target terminal may determine the eighth relay mode based on received third discovery messages of a plurality of relay terminals, and the third policy information and/or the capability of the target terminal. When a plurality of relay terminals support the eighth relay mode, the target terminal may select a relay terminal from the plurality of relay terminals that support the eighth relay mode. In a specific implementation, the target terminal may select a relay terminal from the plurality of relay terminals based on signal strength between the target terminal and the relay terminals. Then, the target terminal may send the information about the eighth relay mode to the selected relay terminal.

For example, the target terminal separately receives the third discovery message of the relay terminal 1, a third discovery message of a relay terminal 4, and a third discovery message of a relay terminal 5, where the third discovery message of the relay terminal 1 includes the information about the layer-2 relay mode, the third discovery message of the relay terminal 4 includes the information about the layer-3 relay mode, and the third discovery message of the relay terminal 5 includes the information about the layer-2 relay mode and the information about the layer-3 relay mode. The target terminal may determine, based on the third policy information and/or the capability of the target terminal, the eighth relay mode in the relay modes respectively indicated by the third discovery messages of the plurality of relay terminals. For example, the eighth relay mode is the layer-3 relay mode. Further, relay terminals that support the layer-3 relay mode include the relay terminal 4 and the relay terminal 5. The target terminal may determine signal strength 1 between the target terminal and the relay terminal 4 and signal strength 2 between the target terminal and the relay terminal 5, where the signal strength 1 is greater than the signal strength 2. The target terminal selects the relay terminal 4. Further, the target terminal sends the information about the layer-3 relay mode to the relay terminal 4, but the relay terminal 1 and the relay terminal 5 do not receive a response from the target terminal.

In addition, in the foregoing example, when only one relay terminal supports the eighth relay mode, the target terminal may directly send the information about the eighth relay mode to the relay terminal.

S1607: The relay terminal sends the information about the eighth relay mode to the source terminal.

Optionally, the relay terminal sends a second response message to the source terminal, where the second response message is a response to the second discovery message, and the second response message includes the information about the eighth relay mode. In addition, the second response message further includes the identifier of the target terminal, the identifier of the source terminal, and the identifier of the relay terminal.

S1608: The source terminal determines the first relay mode based on the information about the eighth relay mode.

When there are a plurality of eighth relay modes, the first relay mode may be one of the eighth relay modes. When there is one eighth relay mode, the first relay mode may be the eighth relay mode.

In addition, in S1606, the target terminal may further send the information about the eighth relay mode to each of the plurality of relay terminals. For example, in the foregoing example, the target terminal separately receives the third discovery message of the relay terminal 1, the third discovery message of the relay terminal 4, and the third discovery message of the relay terminal 5. In addition, the target terminal determines that the target terminal supports the layer-2 relay mode and the layer-3 relay mode. The target terminal may send the information about the layer-2 relay mode to the relay terminal 1, send the information about the layer-3 relay mode to the relay terminal 4, and send the information of the layer-2 relay mode and the information of the layer-3 relay mode to the relay terminal 5. Correspondingly, the source terminal may receive the information about the layer-2 relay mode from the relay terminal 1, the information about the layer-3 relay mode from the relay terminal 4, and the information about the layer-2 relay mode and the information about the layer-3 relay mode from the relay terminal 5. In this case, the source terminal may determine a final relay terminal based on the plurality of eighth relay modes and/or signal strength between the source terminal and the plurality of relay terminals. For example, the source terminal selects the relay terminal 4. Correspondingly, the relay terminal 4 may be used for relay communication between the source terminal and the target terminal.

In this way, the source terminal may obtain, by sending the information about the second relay mode, all relay terminals and target terminals that may support the second relay mode. A case in which after the source terminal selects the seventh relay mode, the relay terminal or the target terminal that supports the seventh relay mode cannot be obtained, consequently, the source terminal determines the first relay mode based on the seventh relay mode and the first policy information, and initiates a relay terminal discovery process again, and the relay terminal initiates a target terminal discovery process again to discover a relay terminal that supports the first relay mode is avoided, thereby increasing a success rate of discovering an appropriate relay mode.

The foregoing mainly describes the solutions provided in embodiments of this application from a perspective of device interaction. It may be understood that, to implement the foregoing functions, each device may include a corresponding hardware structure and/or software module for performing each function. A person skilled in the art should be easily aware that, in embodiments of this application, the units and algorithm steps in the examples described with reference to embodiments disclosed in this specification can be implemented by hardware or a combination of hardware and computer software. Whether a function is performed in a manner of hardware or computer software driving hardware depends on a specific application and an implementation constraint condition of the technical solution. A person skilled in the art may use different methods to implement the described functions of each particular application, but it should not be considered that the implementation goes beyond the scope of this application.

In embodiments of this application, the device may be divided into functional units based on the foregoing method examples. For example, each functional unit may be obtained through division based on a corresponding function, or two or more functions may be integrated into one unit. The integrated unit may be implemented in a form of hardware, or may be implemented in a form of a software functional unit.

Figure 17:
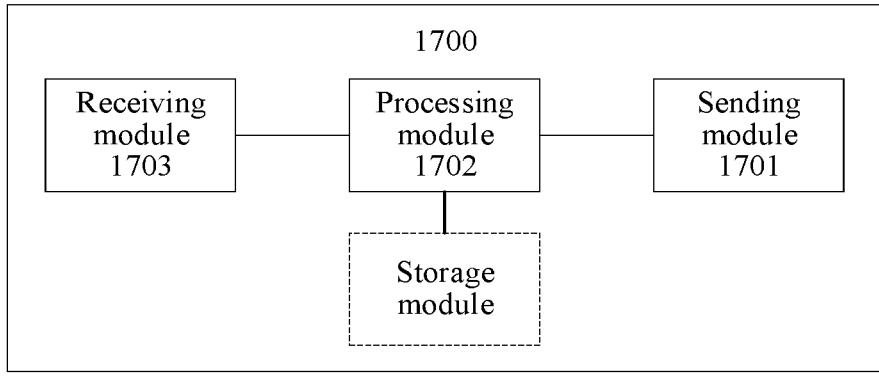
FIG. 17 is a schematic diagram of a structure of a communication apparatus according to an embodiment of this application.

When an integrated unit is used, FIG. 17 is a block diagram of a possible example of an apparatus according to an embodiment of this application. As shown in FIG. 17, the apparatus 1700 may include: a sending module 1701, a processing module 1702, and a receiving module 1703. The processing module 1702 is configured to: control and manage an action of the apparatus 1700. The receiving module 1703 is configured to support the apparatus 1700 in communicating with another device. Optionally, the receiving module 1703 and the sending module 1701 may alternatively be one module (a transceiver module), and the module may be configured to perform receiving and sending operations. Optionally, the apparatus 1700 may further include a storage module, configured to store program code and/or data of the apparatus 1700.

The apparatus 1700 may be a remote terminal in the foregoing U2N relay scenario, or may be a chip disposed in the remote terminal. The processing module 1702 may support the apparatus 1700 in performing actions of the remote terminal in the foregoing method examples. Alternatively, the processing module 1702 mainly performs an internal action of the remote terminal in the method example, and the receiving module 1703 and the sending module 1701 may support the apparatus 1700 in communicating with another device.

Specifically, the receiving module 1703 is configured to receive first policy information from a policy control function network element, where the first policy information includes a relay mode corresponding to a first application of the remote terminal. The processing module 1702 is configured to: determine a first relay mode based on the first policy information, and transmit data of the first application in the first relay mode.

In a possible implementation, the processing module 1702 is configured to: determine the first relay mode based on the relay mode corresponding to the first application of the remote terminal.

In a possible implementation, the first policy information further includes: a priority of the relay mode corresponding to the first application of the remote terminal. The processing module 1702 is configured to: determine the first relay mode based on the relay mode corresponding to the first application of the remote terminal and the priority of the relay mode corresponding to the first application of the remote terminal.

In a possible implementation, before the receiving module 1703 receives the first policy information from the policy control function network element, the sending module 1701 is further configured to send, to the policy control function network element, a relay mode supported by the remote terminal.

In a possible implementation, the processing module 1702 is configured to: determine, based on a capability of the remote terminal, the first relay mode in the relay mode supported by the remote terminal and the first policy information. The relay mode supported by the remote terminal includes: a layer-2 relay mode or a layer-3 relay mode.

In a possible implementation, the relay mode corresponding to the first application of the remote terminal includes: at least one of the layer-2 relay mode or the layer-3 relay mode; or at least one of the layer-2 relay mode, a first layer-3 relay mode, or a second layer-3 relay mode, where the first layer-3 relay mode is a layer-3 relay mode with a non-3GPP interworking function network element, and the second layer-3 relay mode is a layer-3 relay mode without an N3IWF.

In a possible implementation, the first relay mode is: the layer-2 relay mode or the layer-3 relay mode; or the layer-2 relay mode, the first layer-3 relay mode, or the second layer-3 relay mode.

In a possible implementation, the sending module 1701 is further configured to send a first message, where the first message includes information about the first relay mode.

In a possible implementation, the information about the first relay mode includes at least one of the following: an RSC corresponding to the first relay mode; or first indication information indicating the first relay mode.

In a possible implementation, the receiving module 1703 is further configured to receive a first response message from a relay terminal, where the first response message is a response to the first message, the first response message includes second indication information, and the second indication information indicates that the relay terminal supports the first relay mode.

In a possible implementation, the first relay mode is the layer-2 relay mode, and the sending module 1701 is further configured to send a second message, where the second message includes no RSC, and the second message is a discovery message or a direct communication request DCR message.

In a possible implementation, the processing module 1702 is further configured to: determine a seventh relay mode based on the first policy information. The sending module 1701 is further configured to send a third message, where the third message includes information about the seventh relay mode. The processing module 1702 is further configured to: after the receiving module 1703 receives a fourth response message from the relay terminal, determine the first relay mode based on the first policy information and the seventh relay mode. The fourth response message is a response to the third message, and the fourth response message indicates that the relay terminal does not support the seventh relay mode.

In a possible implementation, the processing module 1702 is configured to: determine a second relay mode based on the first policy information, where the second relay mode includes one or more relay modes in the relay mode corresponding to the first application of the remote terminal; and determine the first relay mode based on the second relay mode.

In a possible implementation, the sending module 1701 is further configured to send a second discovery message, where the second discovery message includes information about the second relay mode. The receiving module 1703 is further configured to receive a second response message from a relay terminal, where the second response message is a response to the second discovery message, the second response message includes information about a third relay mode, the third relay mode includes at least one relay mode in the second relay mode, and the relay terminal supports the third relay mode.

In a possible implementation, the information about the second relay mode includes at least one of the following: an RSC corresponding to the second relay mode; or third indication information indicating the second relay mode.

In a possible implementation, the processing module 1702 is configured to: determine the first relay mode based on the information about the third relay mode.

In a possible implementation, the second response message further includes: trust information of the relay terminal, where the trust information indicates whether the relay terminal is trusted to the remote terminal. The processing module 1702 is configured to: when the third relay mode is the layer-3 relay mode, determine, based on the trust information of the relay terminal, that the first relay mode is the first layer-3 relay mode or the second layer-3 relay mode.

In a possible implementation, the relay mode corresponding to the first application of the remote terminal may further include: a correspondence between the relay mode and an RSC and a correspondence between an RSC and the first application.

The apparatus 1700 may further be a source terminal in the foregoing U2U relay scenario, or may further be a chip disposed in the source terminal. The processing module 1702 may support the apparatus 1700 in performing actions of the source terminal in the foregoing method examples. Alternatively, the processing module 1702 mainly performs an internal action of the source terminal in the method example, and the receiving module 1703 and the sending module 1701 may support the apparatus 1700 in communicating with another device.

Specifically, the receiving module 1703 is configured to receive first policy information from a policy control function network element, where the first policy information includes a relay mode corresponding to a first application of the source terminal. The processing module 1702 is configured to: determine a first relay mode based on the first policy information, and transmit data of the first application with a target terminal in the first relay mode.

In a possible implementation, the processing module 1702 is configured to: determine, based on the relay mode corresponding to the first application of the source terminal, the first relay mode in the relay mode corresponding to the first application.

In a possible implementation, the first policy information further includes: a priority of the relay mode corresponding to the first application of the source terminal. The processing module 1702 is configured to: determine the first relay mode based on the relay mode corresponding to the first application of the source terminal and the priority of the relay mode corresponding to the first application of the source terminal.

In a possible implementation, before the receiving module 1703 receives the first policy information from the policy control function network element, the sending module 1701 is configured to first send, to the policy control function network element, a relay mode supported by the source terminal.

In a possible implementation, the processing module 1702 is configured to: determine, based on a capability of the source terminal, the first relay mode in the relay mode supported by the source terminal and the first policy information. The relay mode supported by the source terminal includes: a layer-2 relay mode or a layer-3 relay mode.

In a possible implementation, the relay mode corresponding to the first application of the source terminal includes: at least one of the layer-2 relay mode or the layer-3 relay mode.

In a possible implementation, the first relay mode is: the layer-2 relay mode or the layer-3 relay mode.

In a possible implementation, the sending module 1701 is further configured to send a first message, where the first message includes information about the first relay mode.

In a possible implementation, the information about the first relay mode includes at least one of the following: an RSC corresponding to the first relay mode; or first indication information indicating the first relay mode.

In a possible implementation, the receiving module 1703 is further configured to receive a third response message from a relay terminal, where the third response message is a response to the first message, and the third response message indicates that the relay terminal supports the source terminal in communicating with the target terminal in the first relay mode.

In a possible implementation, the processing module 1702 is further configured to: determine a seventh relay mode based on the first policy information. The sending module 1701 is further configured to send a third message, where the third message includes information about the seventh relay mode. The processing module 1702 is further configured to: after the receiving module 1703 receives a fifth response message from the relay terminal, determine the first relay mode based on the first policy information and the seventh relay mode. The fifth response message is a response to the third message, and the fifth response message indicates that the relay terminal or the target terminal does not support the seventh relay mode.

In a possible implementation, the processing module 1702 is configured to: determine a second relay mode based on the first policy information, where the second relay mode includes one or more relay modes in the relay mode corresponding to the first application of the source terminal; and then determine the first relay mode based on the second relay mode.

In a possible implementation, the sending module 1701 is further configured to send a second discovery message, where the second discovery message includes information about the second relay mode. The receiving module 1703 is further configured to receive a second response message from the relay terminal, where the second response message is a response to the second discovery message, the second response message includes information about an eighth relay mode, the eighth relay mode includes at least one relay mode in the second relay mode, and both the relay terminal and the target terminal support the eighth relay mode. The processing module 1702 is configured to determine the first relay mode based on the information about the eighth relay mode.

In a possible implementation, the information about the second relay mode includes at least one of the following: an RSC corresponding to the second relay mode; or third indication information indicating the second relay mode.

Figure 18:
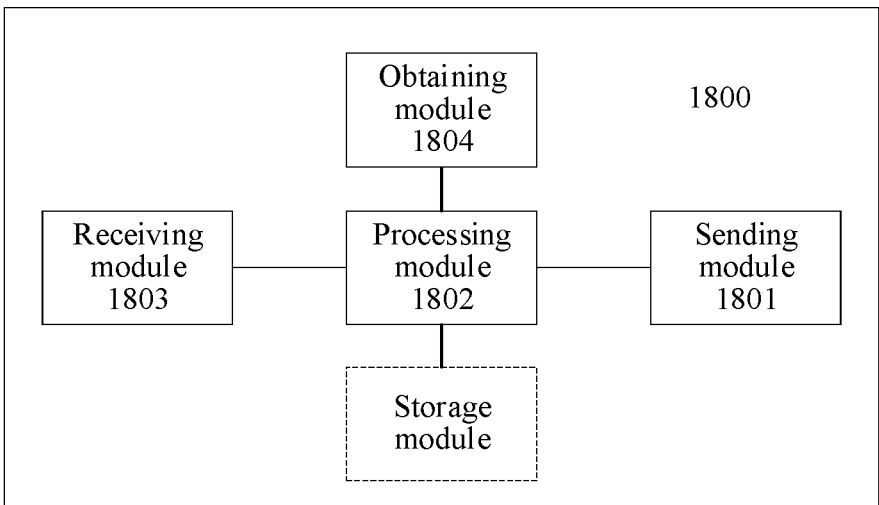
FIG. 18 is a schematic diagram of a structure of a communication apparatus according to an embodiment of this application.

When an integrated unit is used, FIG. 18 is a block diagram of a possible example of an apparatus according to an embodiment of this application. As shown in FIG. 18, the apparatus 1800 may include: an obtaining module 1804, a sending module 1801, a processing module 1802, and a receiving module 1803. The processing module 1802 is configured to: control and manage an action of the apparatus 1800. The receiving module 1803 is configured to support the apparatus 1800 in communicating with another device. Optionally, the receiving module 1803 and the sending module 1801 may alternatively be one module (for example, a transceiver module), and the module may be configured to perform receiving and sending operations. Optionally, the obtaining module 1804 may alternatively be integrated with the transceiver module, or may be separately disposed with the transceiver module, and is configured to perform receiving and sending operations. Optionally, the obtaining module 1804 may be further configured to obtain data of the processing module 1802. Optionally, the apparatus 1800 may further include a storage module, configured to store program code and/or data of the apparatus 1800.

The apparatus 1800 may be a relay terminal in the foregoing U2N relay scenario, or may be a chip disposed in the relay terminal. The processing module 1802 may support the apparatus 1800 in performing actions of the relay terminal in the foregoing method examples. Alternatively, the processing module 1802 mainly performs an internal action of the relay terminal in the method example, and the sending module 1801 and the receiving module 1803 may support the apparatus 1800 in communicating with another device.

In a possible implementation, the obtaining module 1804 is configured to obtain information about a first relay mode, where the first relay mode is used by a remote terminal to transmit data of a first application. The processing module 1802 is configured to transmit the data of the first application to the remote terminal in the first relay mode.

In a possible implementation, the first relay mode is: a layer-2 relay mode or a layer-3 relay mode; or a layer-2 relay mode, a first layer-3 relay mode, or a second layer-3 relay mode, where the first layer-3 relay mode is a layer-3 relay mode with a non-3GPP interworking function network element, and the second layer-3 relay mode is a layer-3 relay mode without a non-3GPP interworking function network element.

In a possible implementation, the obtaining module 1804 is configured to receive a first message from the remote terminal by using the receiving module 1803, where the first message includes the information about the first relay mode.

In a possible implementation, the information about the first relay mode includes: an RSC corresponding to the first relay mode; or first indication information indicating the first relay mode.

In a possible implementation, the sending module 1801 is configured to send a first response message to the remote terminal, where the first response message is a response to the first message, the first response message includes second indication information, and the second indication information indicates that the relay terminal supports the first relay mode.

In a possible implementation, the first relay mode is the layer-2 relay mode, and the receiving module 1803 is further configured to receive a second message from the remote terminal, where the second message includes no RSC, and the second message is a discovery message or a DCR message.

In a possible implementation, the receiving module 1803 is further configured to receive second policy information from a policy control function network element, where the second policy information includes a relay mode of the relay terminal. The relay mode of the relay terminal includes the first relay mode.

In a possible implementation, the processing module 1802 is configured to determine, based on a relay mode supported by the relay terminal, that the relay terminal supports the first relay mode.

In a possible implementation, before the obtaining module 1804 obtains the information about the first relay mode, the receiving module 1803 is further configured to: receive the second policy information from the policy control function network element, and receive a second discovery message of the remote terminal, where the second policy information includes the relay mode of the relay terminal, and the second discovery message carries information about a second relay mode. The processing module 1802 is configured to send, by using the sending module 1801, information about a third relay mode to the remote terminal based on the second policy information and the information about the second relay mode, where the third relay mode includes at least one relay mode in the second relay mode, and the relay terminal supports the third relay mode.

In a possible implementation, before the processing module 1802 sends, by using the sending module 1801, the information about the third relay mode to the remote terminal based on the second policy information and the information about the second relay mode, the processing module 1802 is further configured to: determine, based on the information about the second relay mode, the second policy information, and a capability of the relay terminal, that the third relay mode is supported.

In a possible implementation, the second relay mode includes: at least one of the layer-2 relay mode or the layer-3 relay mode; or at least one of the layer-2 relay mode, the first layer-3 relay mode, or the second layer-3 relay mode.

In a possible implementation, the information about the second relay mode includes at least one of the following: an RSC corresponding to the second relay mode; or third indication information indicating the second relay mode.

In a possible implementation, the processing module 1802 is further configured to: when the second relay mode includes the layer-3 relay mode, and the relay device supports the layer-3 relay mode, send trust information of the relay terminal to the remote terminal by using the sending module 1801, where the trust information of the relay terminal indicates whether the relay terminal is trusted to the remote terminal.

In a possible implementation, the relay mode of the relay terminal is a relay mode allowed to be used by the relay terminal, or a relay mode authorized to be used by the relay terminal.

In a possible implementation, before sending the second policy information to the relay terminal, the sending module 1801 is further configured to send, to the policy control function network element, the relay mode supported by the relay terminal.

In a possible implementation, a relay mode corresponding to a first application of the remote terminal may further include: a correspondence between the relay mode and an RSC and a correspondence between an RSC and the first application.

In a possible implementation, the relay mode of the relay terminal may further include: a correspondence between the relay mode and an RSC.

The apparatus 1800 may be a relay terminal in the foregoing U2U relay scenario, or may be a chip disposed in the relay terminal. The processing module 1802 may support the apparatus 1800 in performing actions of the relay terminal in the foregoing method examples. Alternatively, the processing module 1802 mainly performs an internal action of the relay terminal in the method example, and the sending module 1801 and the receiving module 1803 may support the apparatus 1800 in communicating with another device.

In a possible implementation, the obtaining module 1804 is configured to obtain information about a first relay mode, where the first relay mode is used by a source terminal to transmit data of a first application. The processing module 1802 is configured to transmit the data of the first application to the source terminal in the first relay mode.

In a possible implementation, the first relay mode is: a layer-2 relay mode or a layer-3 relay mode.

In a possible implementation, the obtaining module 1804 is configured to receive a first message from the source terminal by using the receiving module 1803, where the first message includes the information about the first relay mode.

In a possible implementation, the information about the first relay mode includes: an RSC corresponding to the first relay mode; or first indication information indicating the first relay mode.

In a possible implementation, the sending module 1801 is configured to send a third response message to the source terminal, where the third response message is a response to the first message, and the third response message indicates that the relay terminal supports the source terminal in communicating with a target terminal in the first relay mode.

In a possible implementation, the sending module 1801 is further configured to send a fourth message when the relay terminal supports the first relay mode, where the fourth message includes the information about the first relay mode. The receiving module 1803 is configured to receive a response message for the fourth message from the target terminal. The processing module 1802 determines, based on the response message for the fourth message, that the target terminal supports the first relay mode.

In a possible implementation, before the processing module 1802 transmits the data of the first application for the source terminal in the first relay mode, the receiving module 1803 is further configured to receive a third message from the source terminal, where the third message includes information about a seventh relay mode. When the relay terminal does not support the seventh relay mode, the sending module 1801 is further configured to send a fifth response message to the source terminal, where the fifth response message is a response to the third message, and the fifth response message indicates that the relay terminal or the target terminal does not support the seventh relay mode.

In a possible implementation, when the relay terminal supports the seventh relay mode, the sending module 1801 is further configured to send a fifth message, where the fifth message includes the information about the seventh relay mode. The receiving module 1803 is further configured to receive a response message for the fifth message from the target terminal. The processing module 1802 is further configured to: determine, based on the response message for the fifth message, that the target terminal does not support the seventh relay mode, and send the fifth response message to the source terminal by using the sending module 1801.

In a possible implementation, the receiving module 1803 is further configured to receive second policy information from a policy control function network element, where the second policy information includes a relay mode of the relay terminal. The relay mode of the relay terminal includes the first relay mode.

In a possible implementation, the processing module 1802 is further configured to determine, based on a relay mode supported by the relay terminal, that the relay terminal supports the first relay mode.

In a possible implementation, before the obtaining module 1804 obtains the information about the first relay mode, the receiving module 1803 is further configured to receive the second policy information from the policy control function network element, where the second policy information includes the relay mode of the relay terminal. The receiving module 1803 is further configured to receive a second discovery message of the source terminal, where the second discovery message carries information about a second relay mode. The processing module 1802 is further configured to send a third discovery message Based on the second policy information and the information about the second relay mode by using the sending module 1801, where the third discovery message includes information about a third relay mode, the third relay mode includes at least one relay mode in the second relay mode, and the relay terminal supports the third relay mode.

In a possible implementation, the receiving module 1803 is further configured to receive information about an eighth relay mode from the target terminal, where the eighth relay mode includes one or more relay mode in the third relay mode, and the target terminal supports the eighth relay mode. The sending module 1801 is further configured to send the information about the eighth relay mode to the source terminal.

In a possible implementation, the second relay mode includes: at least one of a layer-2 relay mode or a layer-3 relay mode.

In a possible implementation, the information about the second relay mode includes at least one of the following: an RSC corresponding to the second relay mode; or third indication information indicating the second relay mode.

In a possible implementation, the relay mode of the relay terminal is a relay mode allowed to be used by the relay terminal, or a relay mode authorized to be used by the relay terminal.

In a possible implementation, the sending module 1801 is further configured to: before the receiving module 1803 receives the second policy information from the policy control function network element, send, to the policy control function network element, the relay mode supported by the relay terminal.

Figure 19:
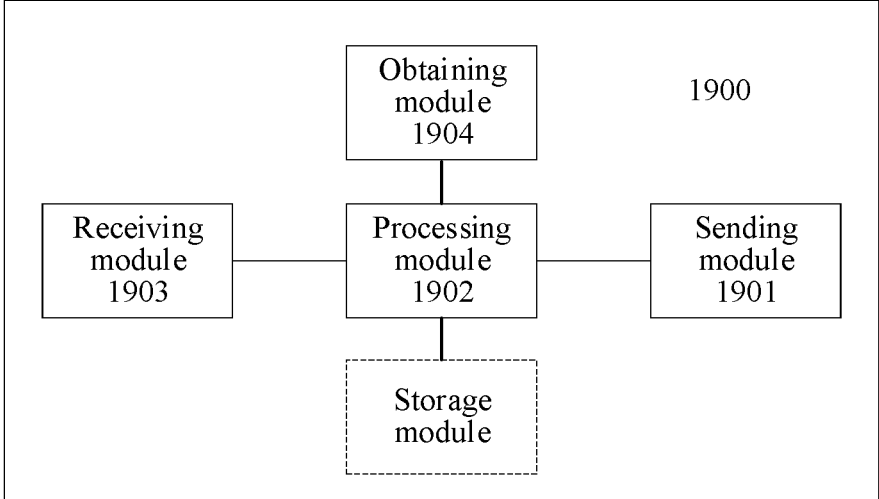
FIG. 19 is a schematic diagram of a structure of a communication apparatus according to an embodiment of this application.

When an integrated unit is used, FIG. 19 is a block diagram of a possible example of an apparatus according to an embodiment of this application. As shown in FIG. 19, the apparatus 1900 may include: an obtaining module 1904, a sending module 1901, a processing module 1902, and a receiving module 1903. The processing module 1902 is configured to: control and manage an action of the apparatus 1900. The receiving module 1903 and the sending module 1901 are configured to support the apparatus 1900 in communicating with another device.

Optionally, the receiving module 1903 and the sending module 1901 may alternatively be one module (for example, a transceiver module), and the module may be configured to perform receiving and sending operations. Optionally, the obtaining module 1904 may alternatively be integrated with the transceiver module, or may be separately disposed with the transceiver module, and is configured to perform receiving and sending operations. Optionally, the obtaining module 1904 may be further configured to obtain data of the processing module 1902. Optionally, the apparatus 1900 may further include a storage module, configured to store program code and/or data of the apparatus 1900.

The apparatus 1900 may be a core network device (for example, a policy control function network element) in the foregoing U2N relay scenario, or may be a chip disposed in the core network device (for example, the policy control function network element).

In a possible implementation, the obtaining module 1904 is configured to obtain a fourth relay mode, where the fourth relay mode includes at least one of the following: a relay mode corresponding to a first application, a relay mode supported by a remote terminal, or a relay mode authorized by the remote terminal. The processing module 1902 is configured to send first policy information to the remote terminal based on the fourth relay mode by using the sending module 1901, where the first policy information includes a relay mode corresponding to a first application of the remote terminal, and the relay mode corresponding to the first application of the remote terminal is used by the remote terminal to transmit data of the first application.

In a possible implementation, before the sending module 1901 sends the first policy information to the remote terminal, the obtaining module 1904 is further configured to: receive, from the remote terminal by using the receiving module 1903, the relay mode supported by the remote terminal; and/or receive, from a unified data repository network element by using the receiving module 1903, the relay mode authorized by the remote terminal.

In a possible implementation, the processing module 1902 is configured to: determine, based on the relay mode supported by the remote terminal and/or the relay mode authorized by the remote terminal, the relay mode corresponding to the first application of the remote terminal.

In a possible implementation, the first policy information further includes: a priority of the relay mode corresponding to the first application of the remote terminal.

In a possible implementation, the relay mode corresponding to the first application of the remote terminal includes:

at least one of a layer-2 relay mode or a layer-3 relay mode; or at least one of a layer-2 relay mode, a first layer-3 relay mode, or a second layer-3 relay mode, where the first layer-3 relay mode is a layer-3 relay mode with an N3IWF, and the second layer-3 relay mode is a layer-3 relay mode without an N3IWF.

In a possible implementation, the obtaining module 1904 is further configured to obtain a fifth relay mode, where the fifth relay mode includes at least one of the following: a relay mode supported by a relay terminal, or a relay mode authorized by the relay terminal. The processing module 1902 is further configured to send second policy information to the relay terminal based on the fifth relay mode by using the sending module 1901, where the second policy information includes a relay mode of the relay terminal.

In a possible implementation, the obtaining module 1904 is configured to receive, from the relay terminal by using the receiving module 1903, the relay mode supported by the relay terminal, and/or the obtaining module 1904 is configured to receive, from a unified data repository network element by using the receiving module 1903, the relay mode authorized by the relay terminal.

In a possible implementation, the processing module 1902 is configured to: determine the relay mode of the relay terminal based on the relay mode supported by the relay terminal and/or the relay mode authorized by the relay terminal.

In a possible implementation, the second policy information further includes: a priority of the relay mode of the relay terminal.

In a possible implementation, the relay mode of the relay terminal includes: at least one of the layer-2 relay mode or the layer-3 relay mode; or at least one of the layer-2 relay mode, the first layer-3 relay mode, or the second layer-3 relay mode.

In a possible implementation, the relay mode corresponding to the first application of the remote terminal may further include: a correspondence between the relay mode and an RSC and a correspondence between an RSC and the first application.

In a possible implementation, the relay mode of the relay terminal may further include: a correspondence between the relay mode and an RSC.

The apparatus 1900 may be a core network device (for example, a policy control function network element) in the foregoing U2U relay scenario, or may be a chip disposed in the core network device (for example, the policy control function network element).

In a possible implementation, the obtaining module 1904 is configured to obtain a fourth relay mode, where the fourth relay mode includes at least one of the following: a relay mode corresponding to a first application, a relay mode supported by a source terminal, or a relay mode authorized by the source terminal. The processing module 1902 sends first policy information to the source terminal based on the fourth relay mode by using the sending module 1901. The first policy information includes a relay mode corresponding to a first application of the source terminal, and the relay mode corresponding to the first application of the source terminal is used by the source terminal to transmit data of the first application with a target terminal.

In a possible implementation, before the sending module 1901 sends the first policy information to the source terminal, the obtaining module 1904 is further configured to: receive, from the source terminal by using the receiving module 1903, the relay mode supported by the source terminal; and/or receive, from a unified data repository network element by using the receiving module 1903, the relay mode authorized by the source terminal.

In a possible implementation, the processing module 1902 is configured to: determine, based on the relay mode supported by the source terminal and/or the relay mode authorized by the source terminal, the relay mode corresponding to the first application of the source terminal.

In a possible implementation, the relay mode corresponding to the first application of the source terminal includes: at least one of a layer-2 relay mode or a layer-3 relay mode.

In a possible implementation, the obtaining module 1904 is further configured to obtain a fifth relay mode, where the fifth relay mode includes at least one of the following: a relay mode supported by a relay terminal, or a relay mode authorized by the relay terminal. The processing module 1902 is further configured to send second policy information to the relay terminal based on the fifth relay mode by using the sending module 1901, where the second policy information includes a relay mode of the relay terminal.

In a possible implementation, before the sending module 1901 sends fifth policy information to the relay terminal, the obtaining module 1904 is further configured to: receive, from the relay terminal by using the receiving module 1903, the relay mode supported by the relay terminal; and/or receive, from a unified data repository network element by using the receiving module 1903, the relay mode authorized by the relay terminal.

In a possible implementation, the processing module 1902 is configured to: determine the relay mode of the relay terminal based on the relay mode supported by the relay terminal and/or the relay mode authorized by the relay terminal.

In a possible implementation, the relay mode of the relay terminal includes: at least one of the layer-2 relay mode or the layer-3 relay mode.

In a possible implementation, the obtaining module 1904 is configured to obtain a sixth relay mode, where the sixth relay mode includes at least one of the following: a relay mode corresponding to a first application, a relay mode supported by the target terminal, or a relay mode authorized by the target terminal. The processing module 1902 is configured to send sixth policy information to the target terminal based on the sixth relay mode by using the sending module 1901. The sixth policy information includes a relay mode corresponding to a first application of the target terminal, and the relay mode corresponding to the first application of the target terminal is used by the source terminal to transmit data of the first application with the target terminal.

In a possible implementation, before the sending module 1901 sends the first policy information to the target terminal, the obtaining module 1904 is further configured to: receive, by using the receiving module 1903, the relay mode that is supported by the target terminal and that is sent by the target terminal; and/or receive, from a unified data repository network element by using the receiving module 1903, the relay mode authorized by the target terminal.

In a possible implementation, the processing module 1902 is configured to: determine, based on the relay mode supported by the target terminal and/or the relay mode authorized by the target terminal, the relay mode corresponding to the first application of the target terminal.

In a possible implementation, the relay mode corresponding to the first application of the target terminal includes: at least one of the layer-2 relay mode or the layer-3 relay mode.

Figure 20:
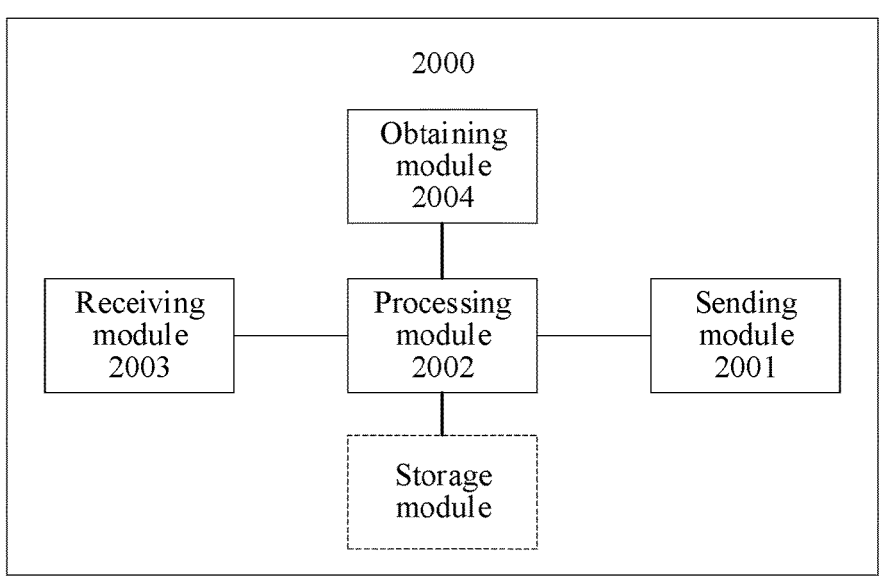
FIG. 20 is a schematic diagram of a structure of a communication apparatus according to an embodiment of this application.

When an integrated unit is used, FIG. 20 is a block diagram of a possible example of an apparatus according to an embodiment of this application. As shown in FIG. 20, the apparatus 2000 may include: an obtaining module 2004, a sending module 2001, a processing module 2002, and a receiving module 2003. The processing module 2002 is configured to: control and manage an action of the apparatus 2000. The receiving module 2003 and the sending module 2001 are configured to support the apparatus 2000 in communicating with another device. Optionally, the receiving module 2003 and the sending module 2001 may alternatively be one module (for example, a transceiver module), and the module may be configured to perform receiving and sending operations. Optionally, the obtaining module 2004 may alternatively be integrated with the transceiver module, or may be separately disposed with the transceiver module, and is configured to perform receiving and sending operations. Optionally, the obtaining module 2004 may be further configured to obtain data of the processing module 2002. Optionally, the apparatus 2000 may further include a storage module, configured to store program code and/or data of the apparatus 2000.

The apparatus 2000 may be a target terminal in the foregoing U2U relay scenario, or may be a chip disposed in the target terminal. The processing module 2002 may support the apparatus 2000 in performing actions of the target terminal in the foregoing method examples. Alternatively, the processing module 2002 mainly performs an internal action of the target terminal in the method example, and the receiving module 2003 and the sending module 2001 may support the apparatus 2000 in communicating with another device.

In a possible implementation, the receiving module 2003 is configured to receive third policy information from a policy control function network element, where the third policy information includes a relay mode corresponding to a first application of the target terminal. The processing module 2002 is configured to transmit data of the first application with a source terminal in a first relay mode based on the third policy information.

In a possible implementation, the receiving module 2003 is further configured to receive a fourth message from a relay terminal, where the fourth message includes information about the first relay mode. The sending module 2001 is further configured to send a response message for the fourth message to the relay terminal based on the third policy information, where the response message for the fourth message indicates that the target terminal supports the first relay mode.

In a possible implementation, before the processing module 2002 transmits the data of the first application with the source terminal in the first relay mode, the receiving module 2003 is further configured to receive a fifth message from the relay terminal, where the fifth message includes information about a seventh relay mode. The processing module 2002 is further configured to send a response message for the fifth message to the relay terminal based on the third policy information by using the sending module 2001, where the response message for the fifth message indicates that the target terminal does not support the seventh relay mode.

In a possible implementation, the receiving module 2003 may be further configured to receive a third discovery message from the relay terminal, where the third discovery message includes information about a third relay mode. The processing module 2002 is further configured to send information about an eighth relay mode to the relay terminal based on the third policy information and the third relay mode by using the sending module 2001, where the eighth relay mode includes one or more relay modes in the third relay mode, and the target terminal supports the eighth relay mode.

In a possible implementation, the processing module 2002 is further configured to determine the eighth relay mode in the third relay mode based on the third policy information and a capability of the target terminal.

It should be understood that division into units in the apparatus is merely logical function division. During actual implementation, all or some of the units may be integrated into one physical entity or may be physically separated. In addition, all units in the apparatus may be implemented in a form of software invoked by a processing element, or may be implemented in a form of hardware. Alternatively, some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be a processor, and may be an integrated circuit having a signal processing capability. In an implementation process, operations in the foregoing methods or the foregoing units may be implemented by using a hardware integrated logic circuit in the processor element, or may be implemented in a form in which the processing element invokes software.

In an example, a unit in any one of the foregoing apparatuses may be one or more integrated circuits configured to implement the foregoing methods, for example, one or more application-specific integrated circuits (ASICs), one or more microprocessors (DSPs), one or more field programmable gate arrays (FPGAs), or a combination of at least two of these forms of integrated circuits. For another example, when the units in the apparatus may be implemented in a form in which a processing element schedules a program, the processing element may be a processor, for example, a general-purpose central processing unit (CPU) or another processor that can invoke the program. For another example, the units may be integrated and implemented in a form of a system-on-a-chip (SOC).

The foregoing unit configured for receiving is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing unit configured for sending is an interface circuit of the apparatus, and is configured to send a signal to another apparatus. For example, when the apparatus is implemented in a manner of a chip, the sending unit is an interface circuit that is of the chip and that is configured to send a signal to another chip or apparatus.

Figure 21:
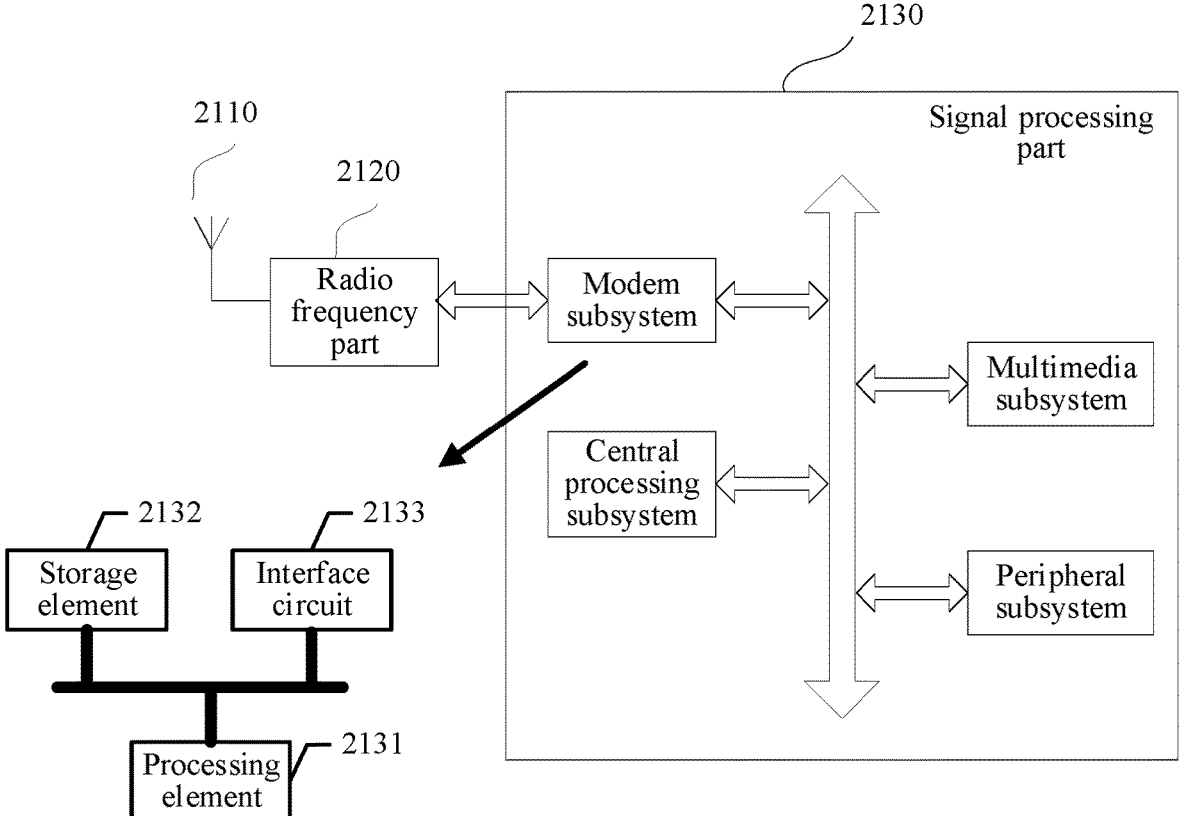
FIG. 21 is a schematic diagram of a structure of a communication apparatus according to an embodiment of this application.

FIG. 21 is a schematic diagram of a structure of a terminal device according to an embodiment of this application. The terminal device may be the remote terminal, the relay terminal, or the like in the foregoing embodiments, and is configured to implement operations of the devices in the foregoing embodiments. As shown in FIG. 21, the terminal device includes an antenna 2110, a radio frequency part 2120, and a signal processing part 2130. The antenna 2110 is connected to the radio frequency part 2120. In a downlink direction, the radio frequency part 2120 receives, by using the antenna 2110, information sent by a network device, and sends, to the signal processing part 2130 for processing, the information sent by the network device. In an uplink direction, the signal processing part 2130 processes information about the terminal device, and sends the information to the radio frequency part 2120. The radio frequency part 2120 processes the information about the terminal device, and then sends the information to a network device by using the antenna 2110.

The signal processing part 2130 may include a modem subsystem, configured to implement processing on each communication protocol layer of data, may further include a central processing subsystem, configured to implement processing on an operating system and an application layer of the terminal device, and may further include another subsystem, for example, a multimedia subsystem and a peripheral subsystem, where the multimedia subsystem is configured to control a camera of the terminal device, a screen display, and the like, and the peripheral subsystem is configured to implement connection to another device. The modem subsystem may be a separately disposed chip.

The modem subsystem may include one or more processing elements 2131, for example, include a main control CPU and another integrated circuit. In addition, the modem subsystem may further include a storage element 2132 and an interface circuit 2133. The storage element 2132 is configured to store data and a program. However, a program used to perform the method performed by the terminal device in the foregoing method may not be stored in the storage element 2132, but is stored in a memory outside the modem subsystem, and is loaded and used by the modem subsystem when to be used. The interface circuit 2133 is configured to communicate with another subsystem.

The modem subsystem may be implemented by using a chip. The chip includes at least one processing element and an interface circuit. The processing element is configured to perform steps of any method performed by the terminal device. The interface circuit is configured to communicate with another apparatus. In an implementation, a module used by the terminal device to implement the steps in the foregoing method may be implemented in a form of scheduling a program by a processing element. For example, an apparatus used for the terminal device includes a processing element and a storage element, and the processing element invokes a program stored in the storage element, to perform the method performed by the terminal device in the foregoing method embodiment. The storage element may be a storage element, namely, an on-chip storage element, on a same chip as the processing element.

In another implementation, a program used to perform the method performed by the terminal device in the foregoing method may be on a storage element, namely, an off-chip storage element, that is located on a different chip from the processing element. In this case, the processing element invokes or loads a program to the on-chip storage element from the off-chip storage element, to invoke and perform the method performed by the terminal device in the foregoing method embodiment.

In still another implementation, a module used by the terminal device to implement the steps in the foregoing method may be configured as one or more processing elements. The processing elements are disposed in a modem subsystem. The processing element herein may be an integrated circuit, for example, one or more ASICs, one or more DSPs, one or more FPGAs, or a combination of the types of integrated circuits. The integrated circuits may be integrated together to form a chip.

Modules used by the terminal device to implement the steps in the foregoing method may be integrated and implemented in a form of an SOC. The SOC chip is configured to implement the foregoing method. At least one processing element and a storage element may be integrated in the chip, and the processing element invokes a program stored in the storage element to implement the method performed by the terminal device. Alternatively, at least one integrated circuit may be integrated into the chip, and is configured to implement the method performed by the terminal device. Alternatively, with reference to the foregoing implementations, functions of some modules are implemented in a form of a program invoked by a processing element, and functions of some modules are implemented in a form of an integrated circuit.

It can be learned that the foregoing apparatus for the terminal device may include at least one processing element and an interface circuit, where the at least one processing element is configured to perform the method performed by any terminal device provided in the foregoing method embodiment. The processing element may perform some or all steps performed by the terminal device, in a first manner, to be specific, by invoking the program stored in the storage element; or may perform some or all steps performed by the terminal device, in a second manner, to be specific, by using a hardware integrated logical circuit in the processing element in combination with instructions; or may certainly perform, by combining the first manner and the second manner, some or all steps performed by the terminal device.

The processing element herein is the same as that described above, and may be implemented by using a processor. A function of the processing element may be the same as a function of the processing module described in FIG. 13 or FIG. 14. For example, the processing element may be a general-purpose processor, for example, a CPU, or may be one or more integrated circuits configured to implement the foregoing method, for example, one or more ASICs, one or more microprocessors DSPs, one or more FPGAs, or a combination of at least two of the integrated circuit forms. The storage element may be implemented by using a memory, and a function of the storage element may be the same as a function of the storage module described in FIG. 13 or FIG. 14. The storage element may be a memory, or may be a collective name of a plurality of memories.

The terminal device shown in FIG. 21 can implement processes of the remote terminal or the relay terminal in the foregoing method embodiment. Operations and/or functions of the modules in the terminal device shown in FIG. 21 are separately used to implement corresponding procedures of the remote terminal or the relay terminal in the foregoing method embodiment. For details, refer to the descriptions in the foregoing method embodiment. To avoid repetition, detailed descriptions are appropriately omitted herein.

Figure 22:
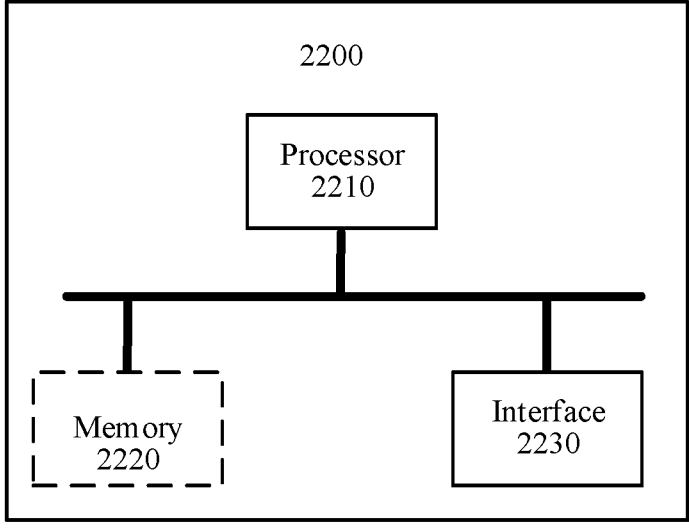
FIG. 22 is a schematic diagram of a structure of a communication apparatus according to an embodiment of this application.

FIG. 22 is a schematic diagram of a communication apparatus according to an embodiment of this application. The communication apparatus is configured to implement an operation of the access network device or the policy control function network element in the foregoing embodiment. The communication apparatus includes: a processor 2210 and an interface 2230. Optionally, the communication apparatus further includes a memory 2220. The interface 2230 is configured to communicate with another device.

In the foregoing embodiment, the method performed by the access network device or the policy control function network element may be implemented by the processor 2210 by invoking the program stored in the memory (which may be a memory 2220 in the access network device or the policy control function network element, or may be an external memory). In other words, an apparatus used for the access network device or the policy control function network element may include a processor 2210. The processor 2210 invokes a program in the memory, to perform the method performed by the access network device or the policy control function network element in the foregoing method embodiment. The processor herein may be an integrated circuit having a signal processing capability, for example, a CPU. The apparatus for the access network device or the policy control function network element may be one or more integrated circuits configured to implement the foregoing method, for example, one or more ASICs, one or more microprocessors DSPs, one or more FPGAs, or a combination of at least two of the integrated circuit forms. Alternatively, the apparatus may be implemented with reference to the foregoing implementations.

For example, a function/implementation process of the processing module 1702 in FIG. 17 may be implemented by the processor 2210 in the communication apparatus 2200 shown in FIG. 22 by invoking the computer-executable instructions stored in the memory 2220. A function/implementation process of the sending module 1701 and/or the receiving module 1703 in FIG. 17 may be implemented by using the interface 2230 in the communication apparatus 2200 shown in FIG. 22.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Various illustrative logic units and circuits described in embodiments of this application may implement or operate the described functions by using a general-purpose processor, a digital signal processor, an application-specific integrated circuit (ASIC), a field programmable gate array (FPGA) or another programmable logic apparatus, a discrete gate or transistor logic, a discrete hardware component, or any implementation of the foregoing combinations. The general-purpose processor may be a microprocessor. Optionally, the general-purpose processor may alternatively be any conventional processor, controller, microcontroller, or state machine. The processor may alternatively be implemented through a combination of computing apparatuses, such as a combination of a digital signal processor and a microprocessor, a combination of a plurality of microprocessors, a combination of one or more microprocessors and one digital signal processor, or any other similar configurations.

Steps of the methods or algorithms described in embodiments of this application may be directly embedded into hardware, a software unit executed by the processor, or a combination thereof. The software unit may be stored in a random access memory (RAM), a flash memory, a read-only memory (ROM), an EPROM memory, an EEPROM memory, a register, a hard disk, a removable disk, a CD-ROM, or any other form of storage medium in the art. For example, storage media may be connected to the processor, so that the processor may read information from the storage media and may save the information in the storage media. Optionally, the storage medium may alternatively be integrated into the processor. The processor and the storage medium may be disposed in an ASIC.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

In one or more example implementations, the foregoing functions described in embodiments of this application may be implemented by using hardware, software, firmware, or any combination of the three. If embodiments are implemented by using the software, the functions may be stored in a computer-readable medium or transmitted to the computer-readable medium in a form of one or more instructions or code. The computer-readable medium includes a computer storage medium or a communication medium that enables a computer program to move from one place to another. The storage medium may be an available medium that may be accessed by any general or special computer. For example, such a computer-readable medium may include but is not limited to a RAM, a ROM, an EEPROM, a CD-ROM or another optical disc storage, a disk storage or another magnetic storage apparatus, or any other medium that may be used to carry or store program code, where the program code is in a form of an instruction or a data structure or in a form that can be read by a general or special computer or a general or special processing unit. In addition, any connection may be appropriately defined as a computer-readable medium. For example, if the software is transmitted from a website, a server, or another remote resource by using a coaxial cable, an optical fiber computer, a twisted pair, a digital subscriber line (DSL) or in a wireless manner, such as infrared, radio, or microwave, the software is also included in a defined computer-readable medium. The disk and disk (disc) include a compressed disk, a laser disk, an optical disc, a digital versatile disc (DVD), a floppy disk, and a Blu-ray disc. The disc usually copies data magnetically. The disk usually optically reproduces data by laser. The foregoing combination may also be included in the computer-readable medium.

A person skilled in the art should be aware that in the foregoing one or more examples, functions described in embodiments of this application may be implemented by using hardware, software, firmware, or any combination thereof. When the functions are implemented by using the software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

In the foregoing specific implementations, the objectives, technical solutions, and advantageous effect of embodiments of this application are further described in detail. It should be understood that the foregoing descriptions are merely specific implementations of embodiments of this application, but are not intended to limit the protection scope of embodiments of this application. Any modification, equivalent replacement, improvement, or the like made based on the technical solutions of embodiments of this application shall fall within the protection scope of embodiments of this application. The foregoing descriptions in the specification of this application may enable any technology in the art to utilize or implement the content of embodiments of this application, and any modification based on the disclosed content shall be considered obvious in this field. The basic principles described in embodiments of this application may be applied to other variations without departing from the essence and scope of the disclosure. Therefore, content disclosed in embodiments of this application is not limited to the described embodiments and implementations, and may be extended to a maximum range consistent with the principles of this application and the disclosed new features.

Although this application is described with reference to specific features and embodiments thereof, it is clear that various modifications and combinations may be made to this application without departing from the spirit and scope of embodiments of this application. Correspondingly, the specification and the accompanying drawings are merely example descriptions of this application defined in the appended claims, and are considered as any of or all modifications, variations, combinations, or equivalents that cover the scope of this application. It is clear that a person skilled in the art can make various modifications and variations to this application without departing from the scope of this application. Therefore, provided that the modifications and variations in embodiments of this application fall within the scope of the claims of this application and their equivalent technologies, embodiments of this application are also intended to include the modifications and variations.

What is claimed is:

1. A communication method, applied to a first terminal, the method comprising:
    receiving first policy information from a policy control function network element, wherein the first policy information indicates a first relay mode corresponding to a first application of the first terminal, and the first relay mode is a layer-3 user equipment (UE)-to-network relay without a non-3GPP interworking function network element (N3IWF);
    determining the first relay mode for the first application based on the first policy information indicating the first relay mode corresponding to the first application of the first terminal; and
    transmitting data of the first application in the first relay mode to a relay device.

2. The method of claim 1, wherein the determining the first relay mode for the first application based on the first policy information comprises:
    determining the first relay mode for the first application based on a capability of the first terminal and the first relay mode indicated by the first policy information, wherein the capability of the first terminal indicates one or more relay modes supported by the first terminal.

3. The method of claim 2, wherein the one or more relay modes supported by the first terminal comprise at least one of: a layer-2 relay mode or a layer-3 relay mode.

4. The method of claim 1, the method further comprising:
    sending a first message to the relay device, wherein the first message comprises information about the first relay mode.

5. The method of claim 4, wherein the information about the first relay mode comprises at least one of the following:
    a relay service code (RSC) corresponding to the first relay mode; or
    first indication information indicating the first relay mode.

6. A communication apparatus, comprising:
    at least one processor; and
    a non-transitory memory configured to store a computer program, the computer program comprising program instructions that, when executed by the at least one processor, cause the communication apparatus to perform:
    receiving first policy information from a policy control function network element, wherein the first policy information indicates a first relay mode corresponding to a first application of a first terminal, and the first relay mode is a layer-3 user equipment (UE)-to-network relay without a non-3GPP interworking function network element (N3IWF);
    determining the first relay mode for the first application based on the first policy information indicating the first relay mode corresponding to the first application of the first terminal; and
    transmitting data of the first application in the first relay mode to a relay device.

7. The communication apparatus of claim 6, wherein the program instructions cause the communication apparatus to perform:
    determining the first relay mode for the first application based on a capability of the first terminal and the first relay mode indicated by the first policy information, wherein the capability of the first terminal indicates one or more relay modes supported by the first terminal.

8. A non-transitory computer readable medium storing a computer program code for execution by a processor of a terminal, the computer program code comprising instructions for:
    receiving first policy information from a policy control function network element, wherein the first policy information indicates a first relay mode corresponding to a first application of the terminal, and the first relay mode is a layer-3 user equipment (UE)-to-network relay without a non-3GPP interworking function network element (N3IWF);
    determining the first relay mode for the first application based on the first policy information indicating the first relay mode corresponding to the first application of the terminal; and
    transmitting data of the first application in the first relay mode to a relay device.

9. The non-transitory computer readable medium of claim 8, wherein the determining the first relay mode for the first application based on the first policy information comprises:
    determining the first relay mode for the application based on a capability of the first terminal and the first relay mode indicated by the first policy information, wherein the capability of the first terminal indicates one or more relay modes supported by the first terminal.

10. The non-transitory computer readable medium of claim 9, wherein the one or more relay modes supported by the first terminal comprise at least one of: a layer-2 relay mode or a layer-3 relay mode.

11. The non-transitory computer readable medium of claim 8, the computer program code comprising instructions for:

sending a first message to the relay device, wherein the first message comprises at least one of the following:

a relay service code (RSC) corresponding to the first relay mode; or first indication information indicating the first relay mode.

* * * * *